US008228889B2

(12) United States Patent
Nishibayashi et al.

(10) Patent No.: US 8,228,889 B2
(45) Date of Patent: Jul. 24, 2012

(54) COMMUNICATION APPARATUS, COMMUNICATION SYSTEM AND COMMUNICATION CONTROL PROGRAM

(75) Inventors: Yasuyuki Nishibayashi, Kawasaki (JP); Masahiro Takagi, Tokyo (JP); Tomoko Adachi, Urayasu (JP); Tetsu Nakajima, Yokohama (JP); Yoriko Utsunomiya, Tokyo (JP); Daisuke Takeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 11/525,994

(22) Filed: Sep. 25, 2006

(65) Prior Publication Data

US 2007/0014237 A1 Jan. 18, 2007

Related U.S. Application Data

(62) Division of application No. 11/110,936, filed on Apr. 21, 2005.

(30) Foreign Application Priority Data

Apr. 23, 2004 (JP) ................................. 2004-129073

(51) Int. Cl.
*H04J 3/16* (2006.01)
(52) U.S. Cl. .................... 370/346; 370/469; 370/338
(58) Field of Classification Search .............. 370/469, 370/338, 346, 463; 709/250, 230
See application file for complete search history.

(56) References Cited

U.S. PATENT DOCUMENTS

| 5,329,531 A | 7/1994 | Diepstraten et al. |
|---|---|---|
| 5,483,676 A | 1/1996 | Mahany et al. |
| 5,648,970 A | 7/1997 | Kapoor |
| 6,301,249 B1 | 10/2001 | Mansfield et al. |
| 6,577,609 B2 | 6/2003 | Sharony |
| 6,972,682 B2 * | 12/2005 | Lareau et al. ............. 340/568.1 |
| 7,197,052 B1 * | 3/2007 | Crocker ..................... 370/474 |
| 7,224,704 B2 * | 5/2007 | Lu et al. .................... 370/476 |
| 7,289,468 B2 * | 10/2007 | Yang et al. ................. 370/329 |
| 7,463,654 B2 * | 12/2008 | Riegel et al. ............... 370/503 |
| 7,600,039 B2 * | 10/2009 | Tang et al. ................. 709/238 |
| 2002/0089959 A1 * | 7/2002 | Fischer et al. .............. 370/338 |

(Continued)

FOREIGN PATENT DOCUMENTS

JP 2002-314546 10/2002

(Continued)

OTHER PUBLICATIONS

U.S. Appl. No. 12/049,031, filed Mar. 14, 2008, Nishibayashi, et al.

(Continued)

*Primary Examiner* — Chandrahas Patel
(74) *Attorney, Agent, or Firm* — Oblon, Spivak, McClelland, Maier & Neustadt, L.L.P.

(57) ABSTRACT

A communication apparatus which generates a single physical frame including a plurality of MAC frames, and which transmits the physical frame. The physical frame has variable-length bitmap information which includes bits corresponding to the plurality of MAC frames, respectively, and length information of the bitmap information. The communication apparatus can include a transmission scheme selecting device configured to select a transmission scheme of the physical frame to be transmitted as a response to the polling frame from a plurality of candidates in such a manner as to adapt to a channel estimate result estimated by the channel estimating device. The transmission scheme in this arrangement includes at least one of a modulation scheme and a coding ratio.

21 Claims, 73 Drawing Sheets

U.S. PATENT DOCUMENTS

| | | |
|---|---|---|
| 2003/0135640 A1 | 7/2003 | Ho et al. |
| 2003/0169769 A1 | 9/2003 | Ho et al. |
| 2003/0214930 A1 | 11/2003 | Fischer |
| 2003/0231715 A1 | 12/2003 | Shoemake et al. |
| 2004/0062276 A1 | 4/2004 | Uhlik et al. |
| 2005/0195858 A1 | 9/2005 | Nishibayashi et al. |
| 2005/0220145 A1 | 10/2005 | Nishibayashi et al. |
| 2005/0265302 A1 | 12/2005 | Nishibayashi et al. |
| 2006/0034174 A1 | 2/2006 | Nishibayashi et al. |
| 2006/0092871 A1 | 5/2006 | Nishibayashi et al. |

FOREIGN PATENT DOCUMENTS

| | | |
|---|---|---|
| JP | 2003-060655 | 2/2003 |
| JP | 2003-324442 | 11/2003 |
| JP | 2003-324445 | 11/2003 |
| JP | 2004-007336 | 1/2004 |
| JP | 2004-88246 | 3/2004 |
| WO | WO 01/76189 A2 | 10/2001 |
| WO | WO 03/007550 A2 | 1/2003 |
| WO | WO 03/024026 A1 | 3/2003 |
| WO | WO 03/039074 A1 | 5/2003 |
| WO | WO 2004/023743 A2 | 3/2004 |
| WO | WO 2005/076536 A1 | 8/2005 |

OTHER PUBLICATIONS

Yang Xiao, "Concatenation and Piggyback Mechanisms for the IEEE 802.11 MAC", WCNC, IEEE Communications Society, XP-010708040, vol. 3, Mar. 21-25, 2004, pp. 1642-1647.

U.S. Appl. No. 11/029,544.

U.S. Appl. No. 12/054,945, filed Mar. 25, 2008, Nishibayashi, et al.

U.S. Appl. No. 11/853,437, filed Sep. 11, 2007, Hirano, et al.

Johanzeb Farooq, et al., "An Overview of Wireless LAN Standards IEEE 802.11 and IEEE 802.11e", Department of Computing Science UMEA University Sweden, 2006, 25 Pages.

* cited by examiner

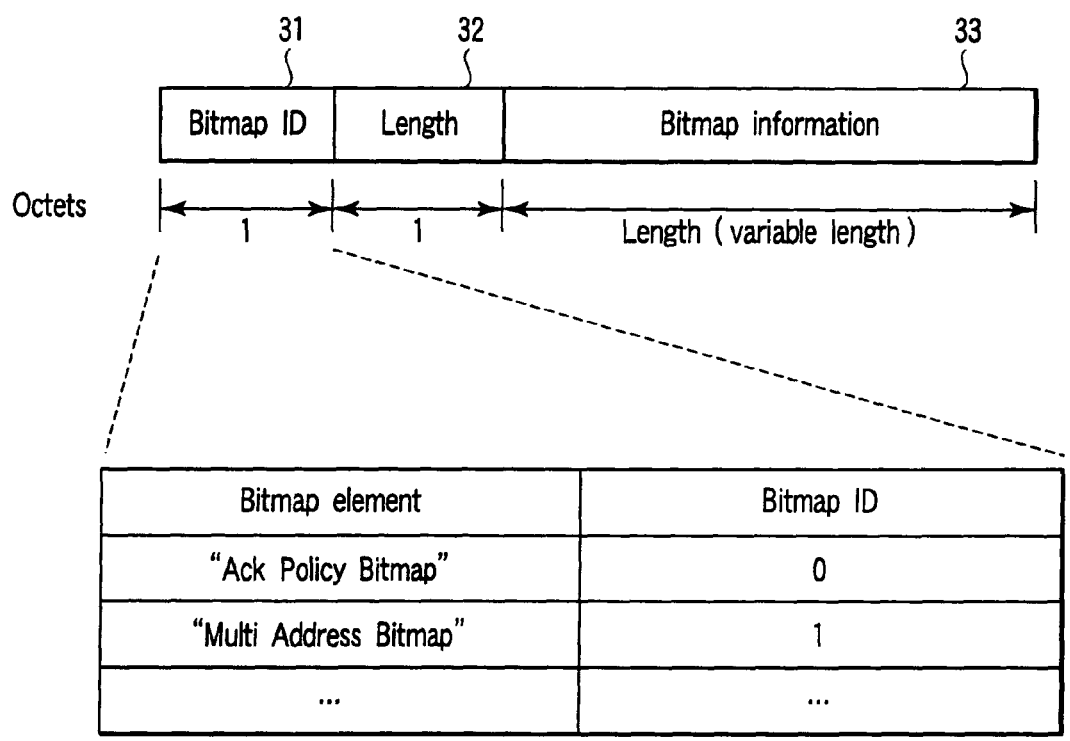
F I G. 3

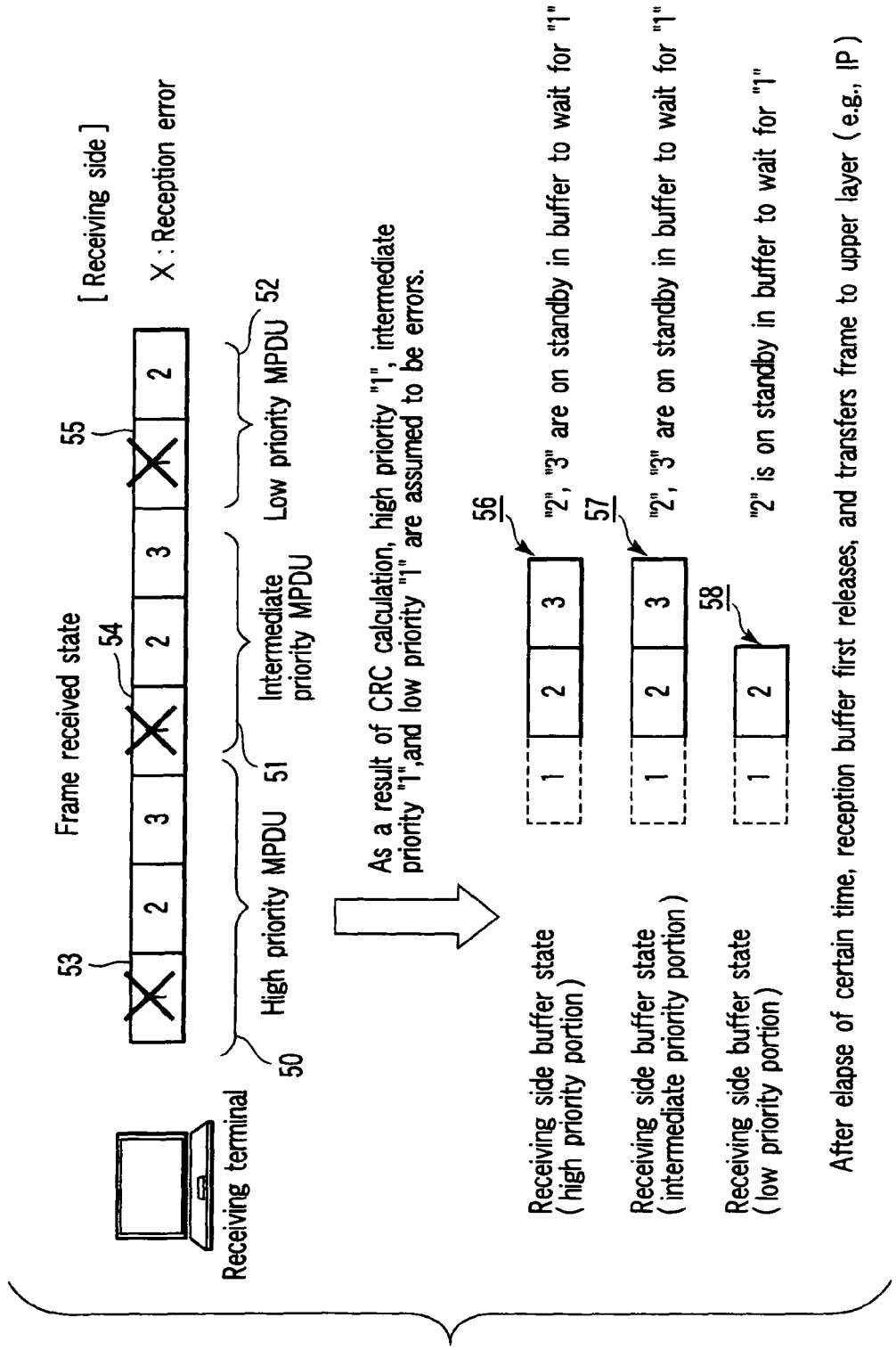
F I G. 5

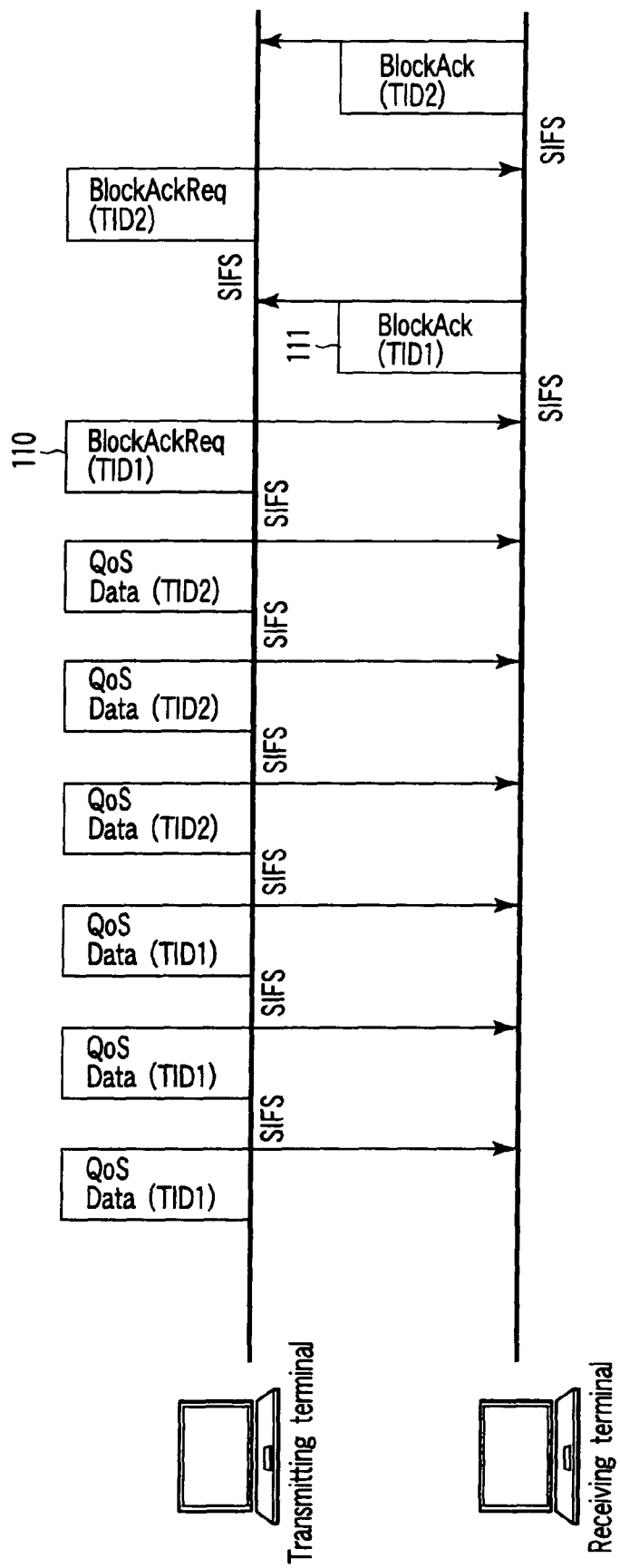
F I G. 11

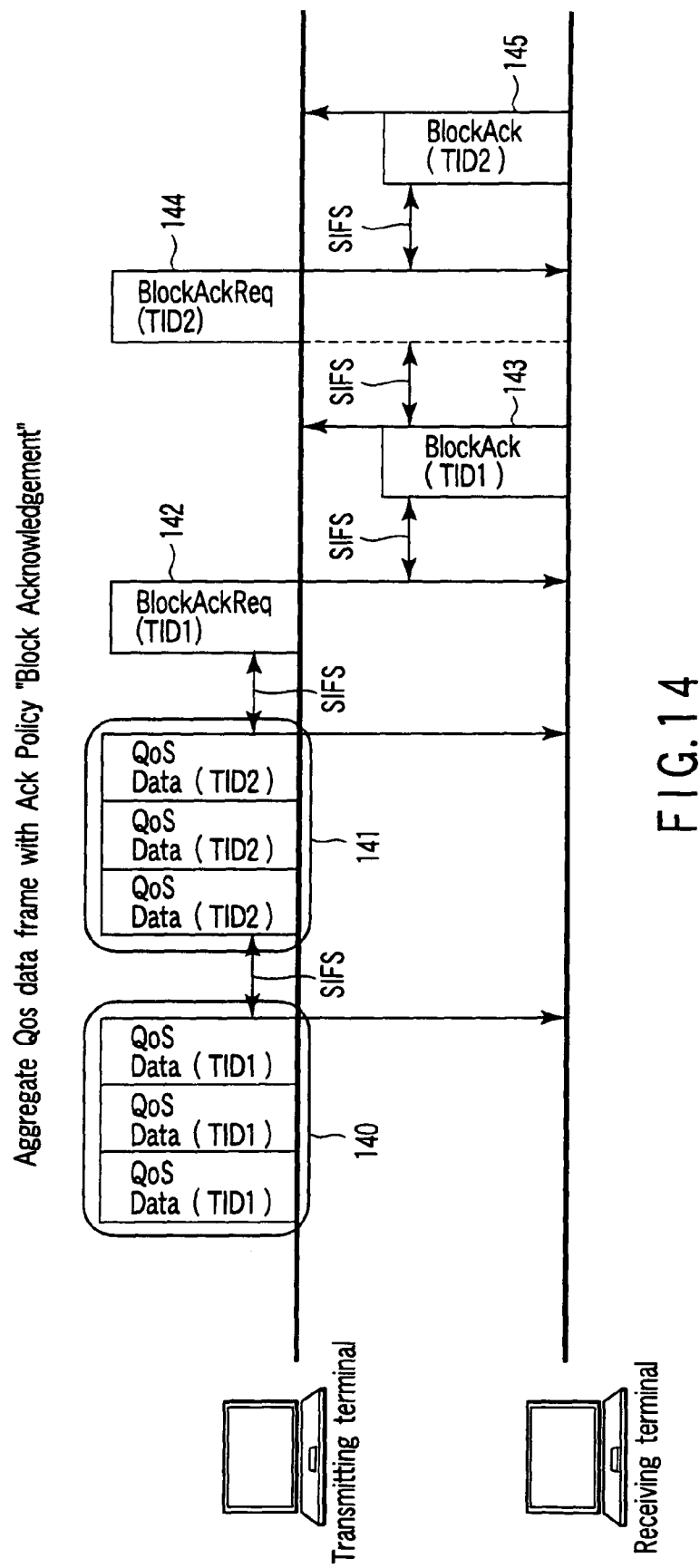
F I G. 14

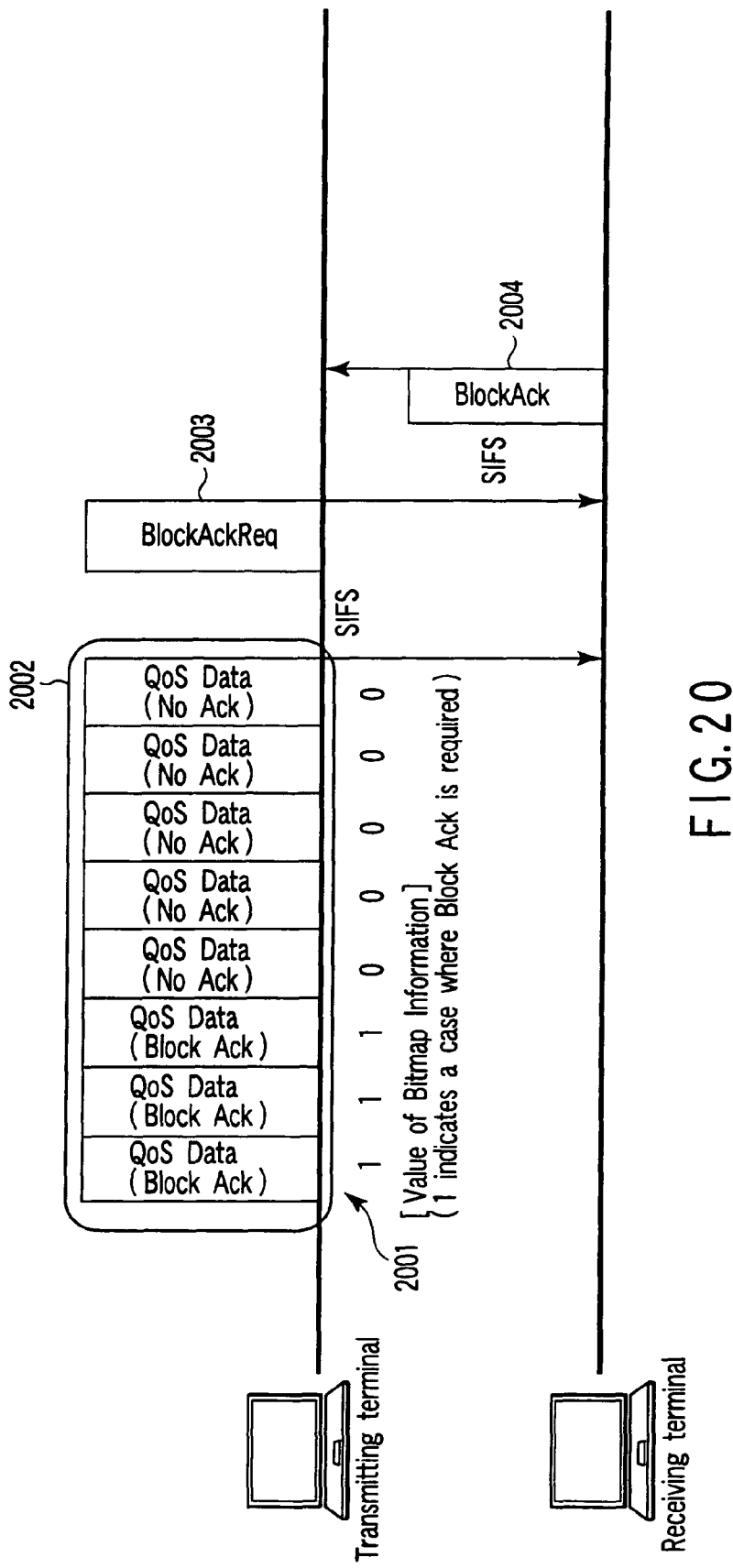
F I G. 20

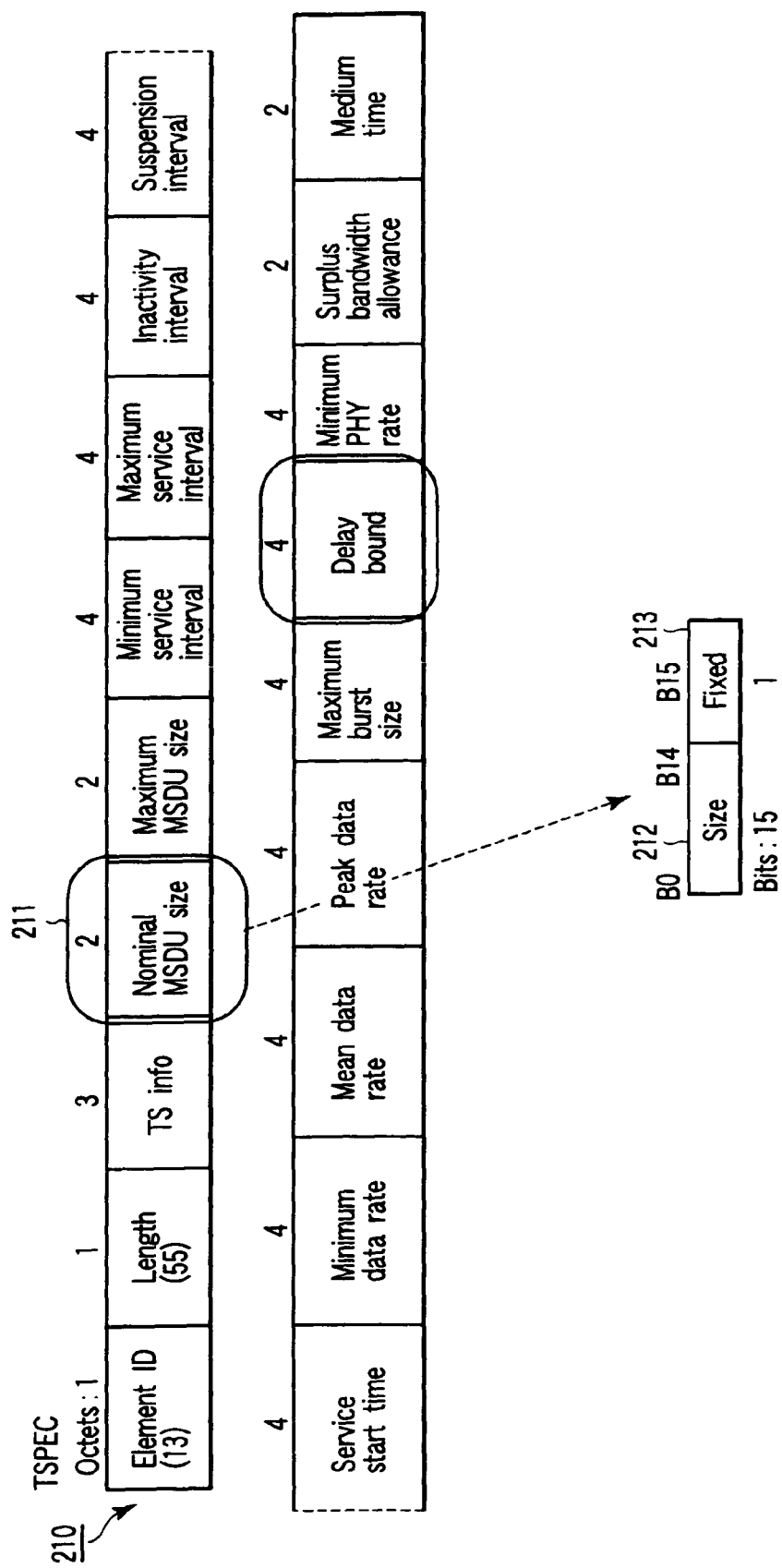
F I G. 21

※ Case where only one type of TSID exists

※ Case where a plurality of types of TSIDs exist

Direct communication between STAs using direct link set-up (DLS) of IEEE802.11e

Ad hoc communication between terminals at independent basic service set (IBSS) time Communication via hybrid coordinator (HC: QoS AP) of IEEE802.11e Communication in infrastructure mode at basic service set (BSS) time

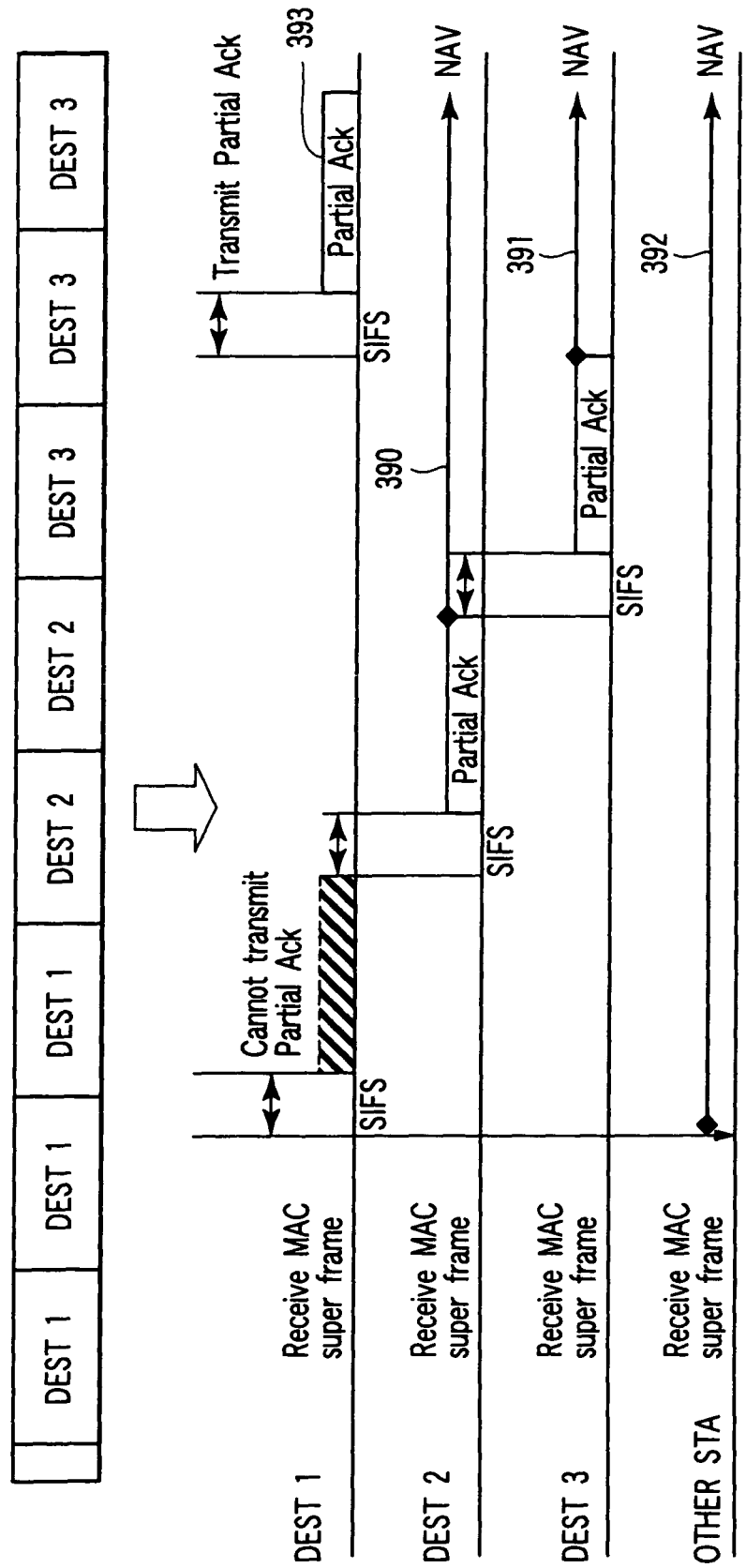
F I G. 39

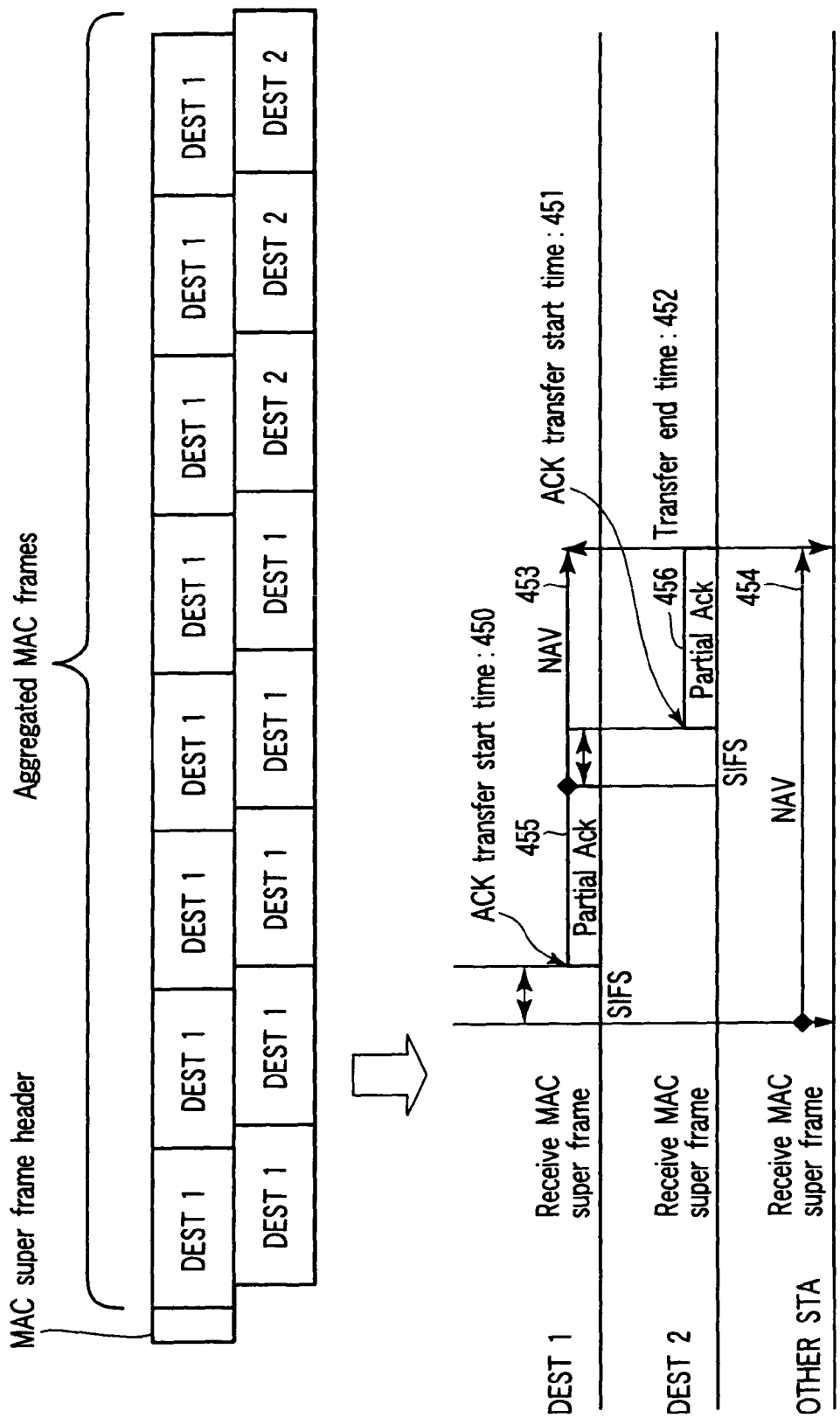
F I G. 45

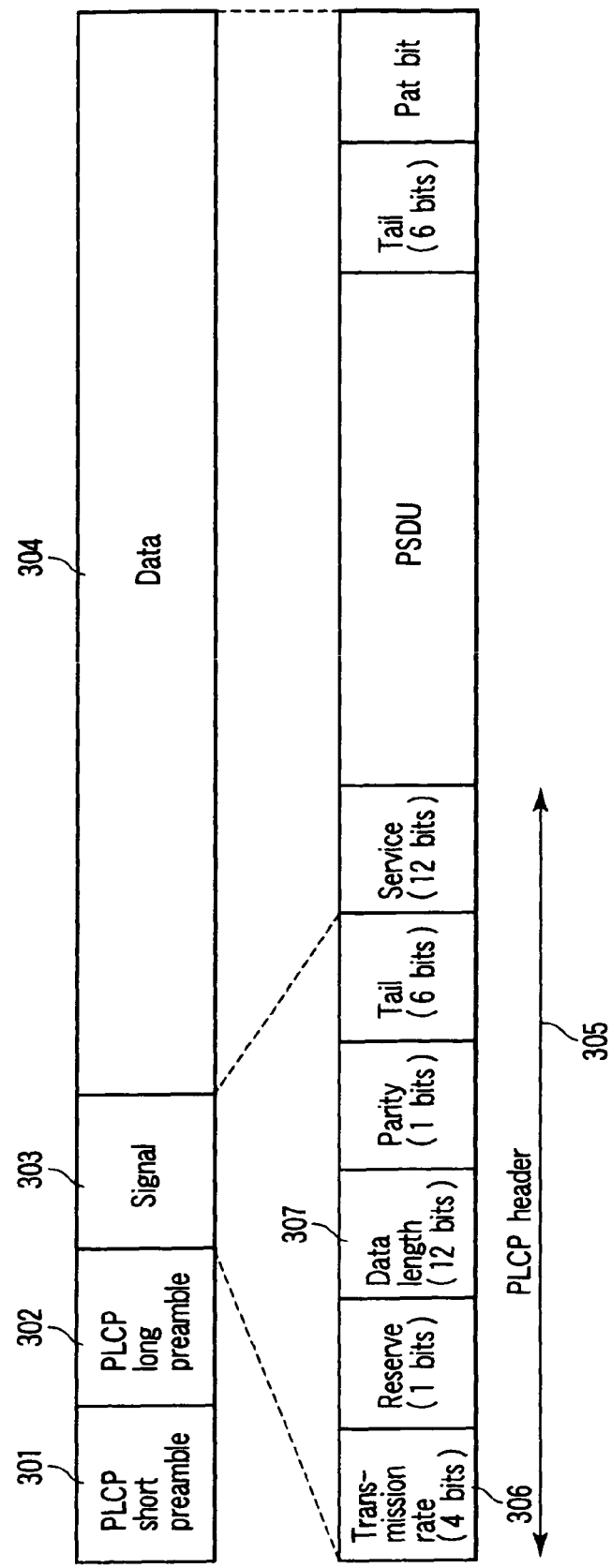
F I G. 51

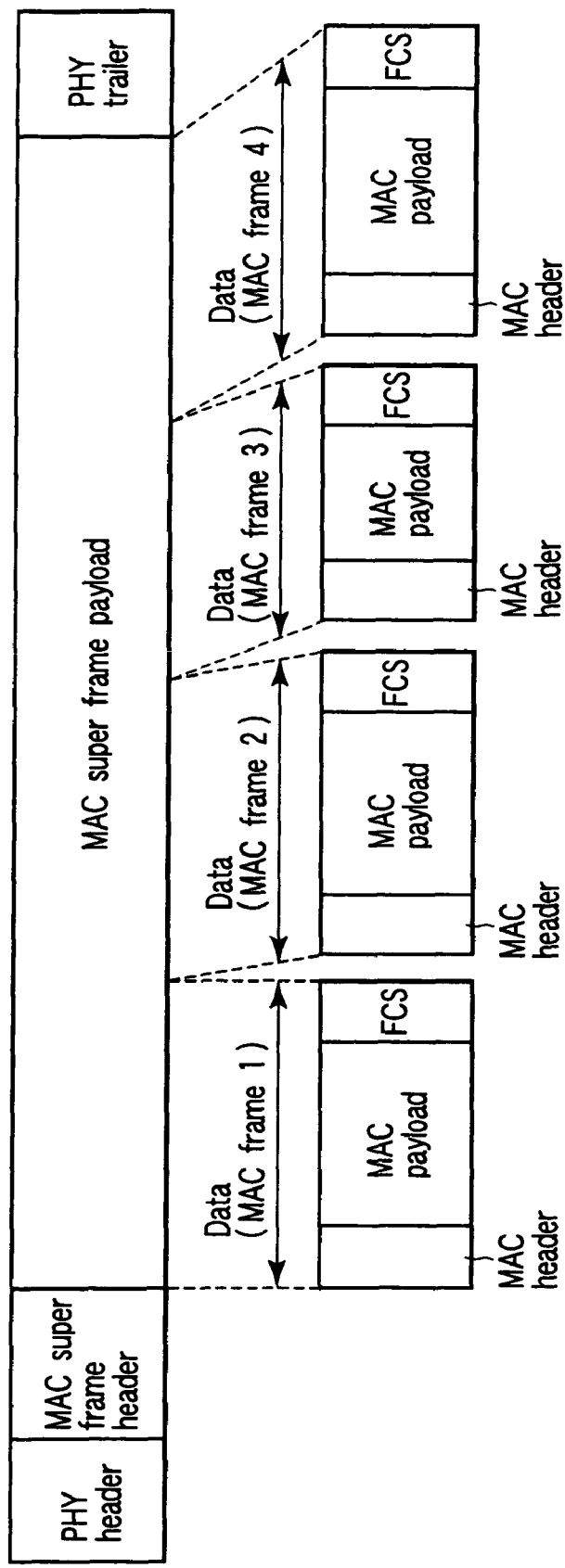
F I G. 57

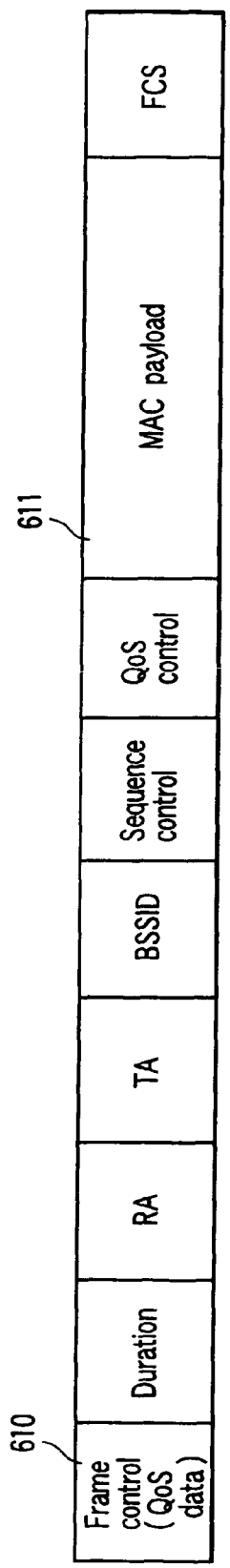
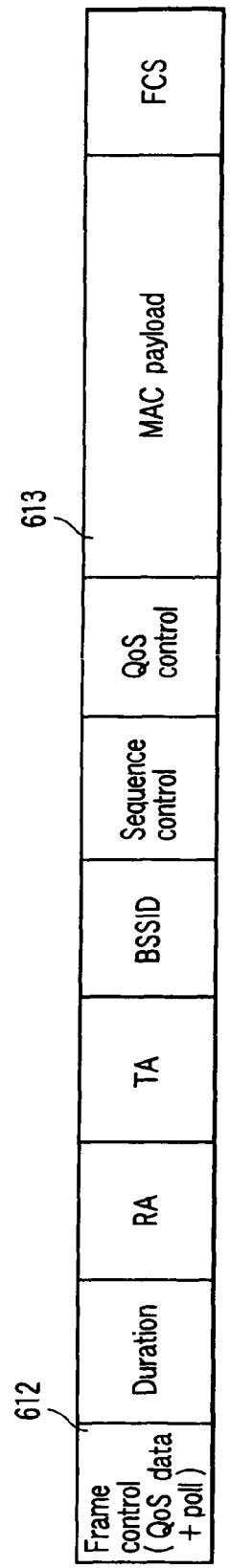
FIG. 61A
FIG. 61B

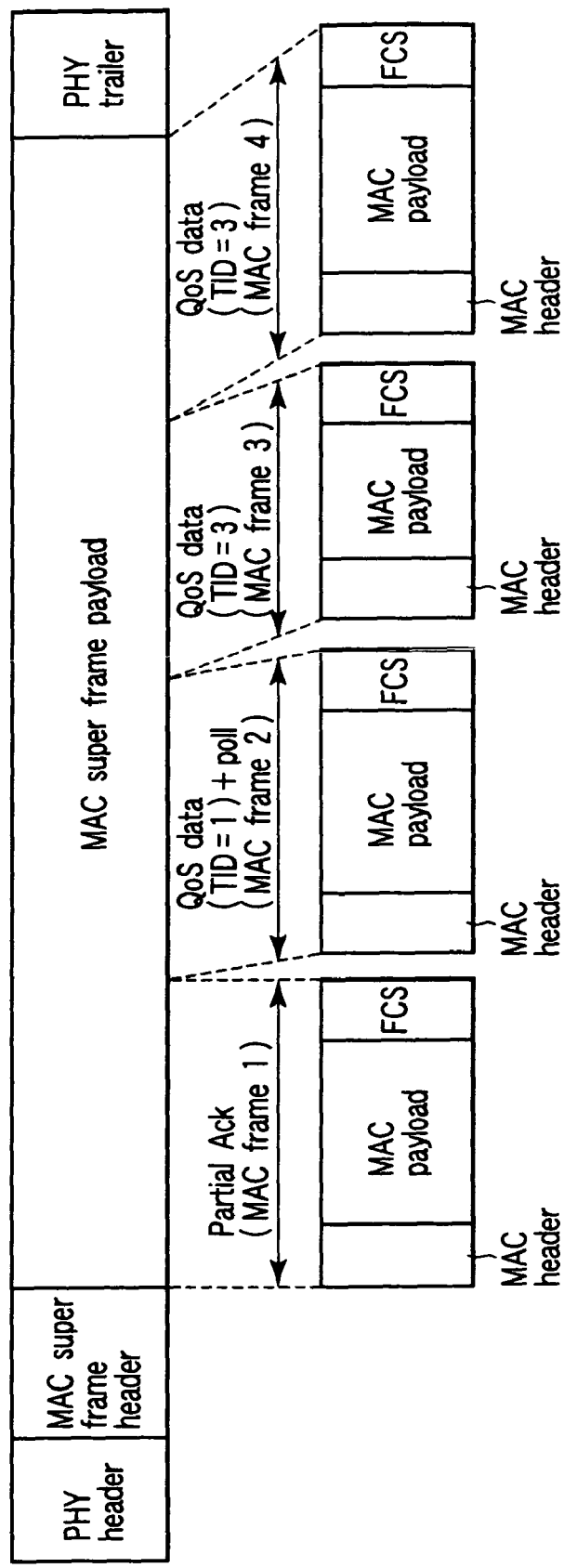
F I G. 62

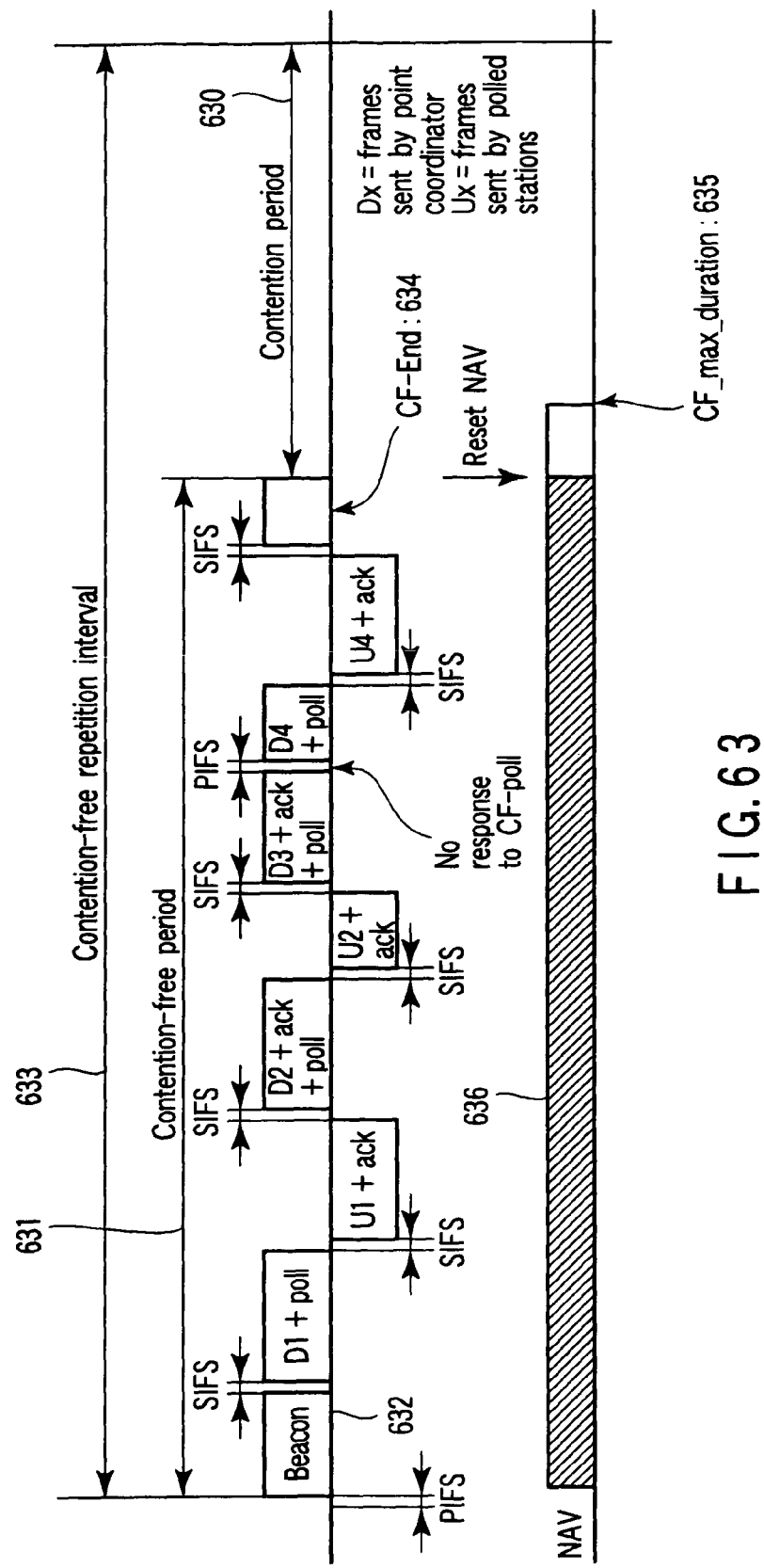
F I G. 63

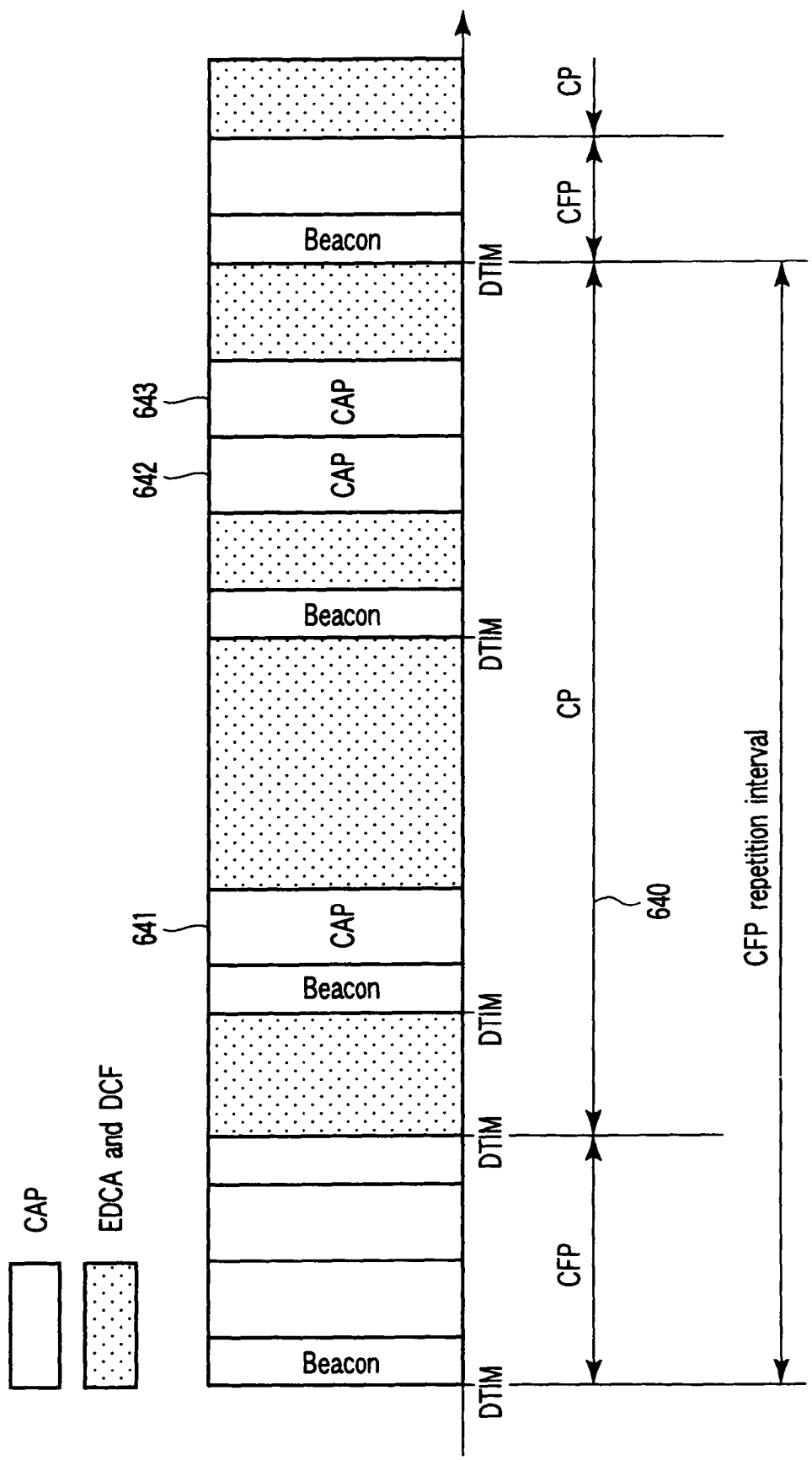
F I G. 64

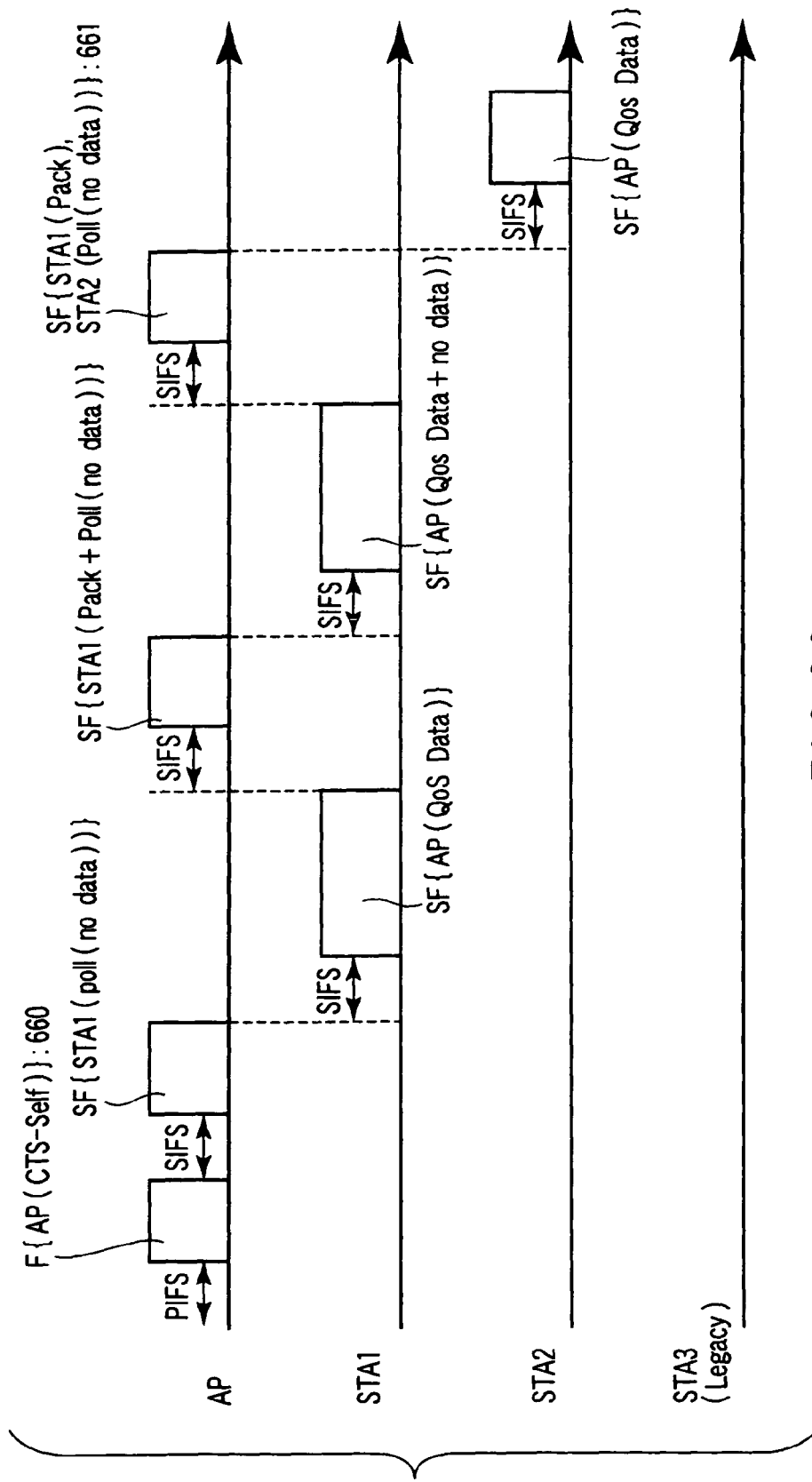
F I G. 66

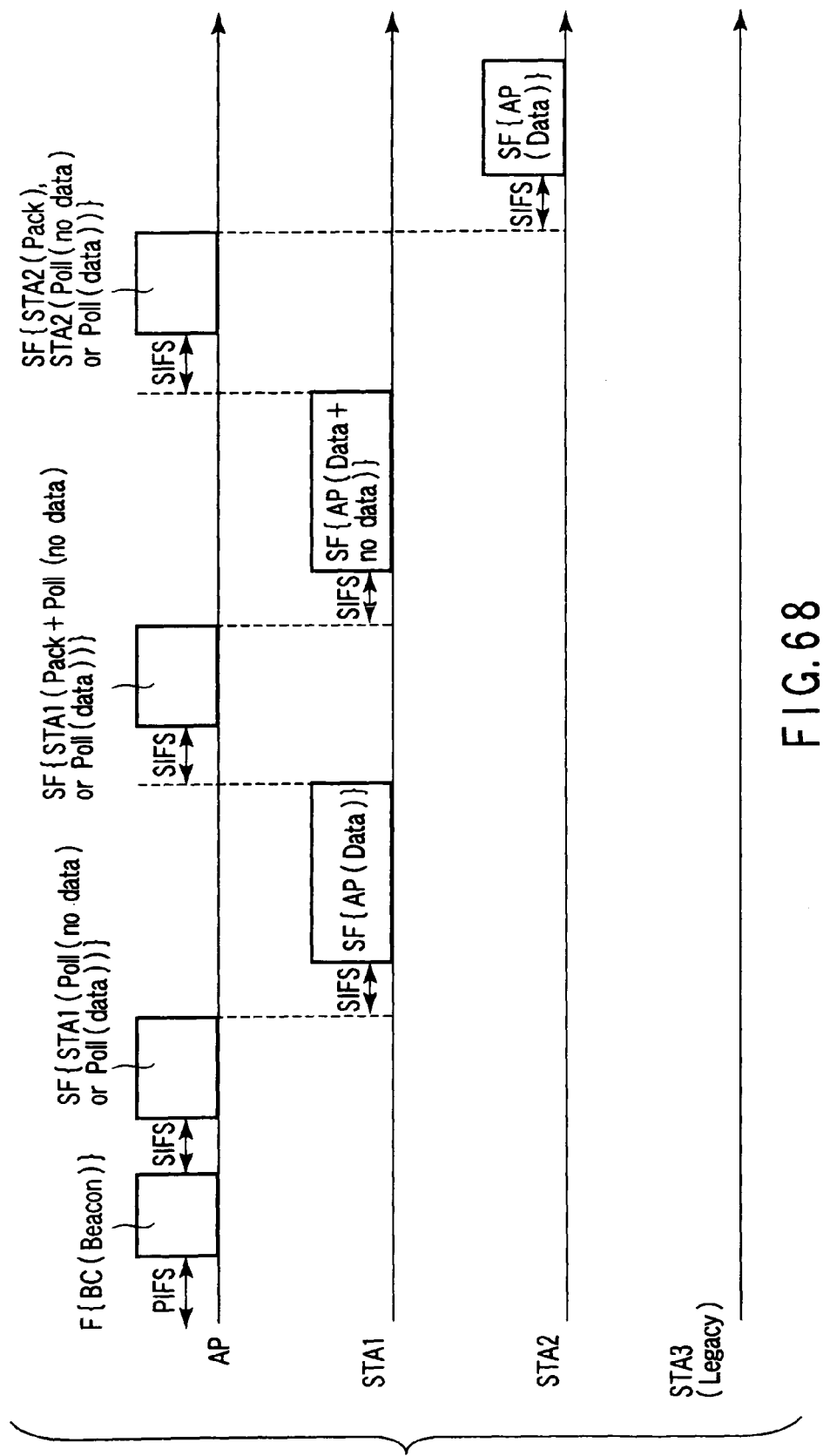
F I G. 68

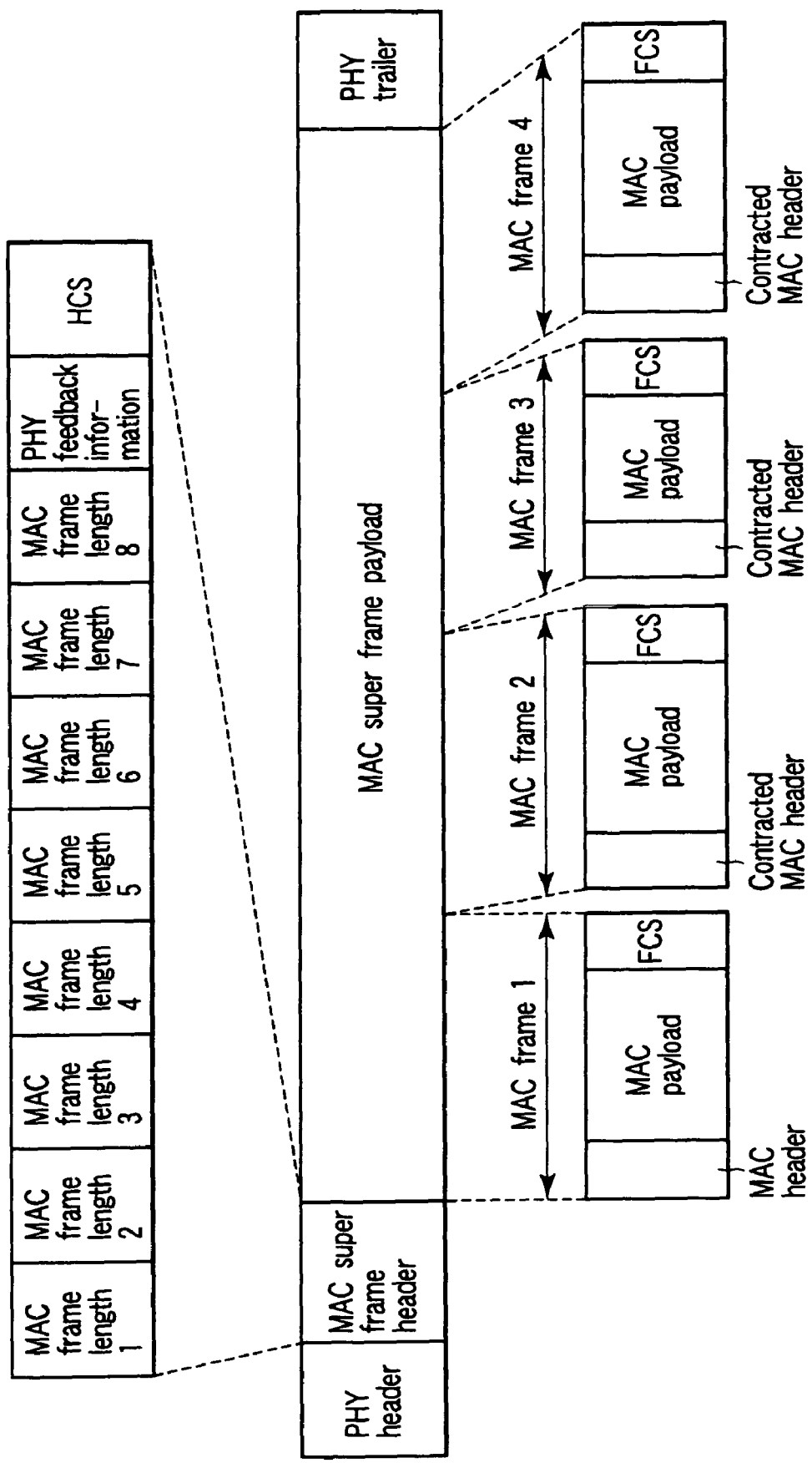
F I G. 70

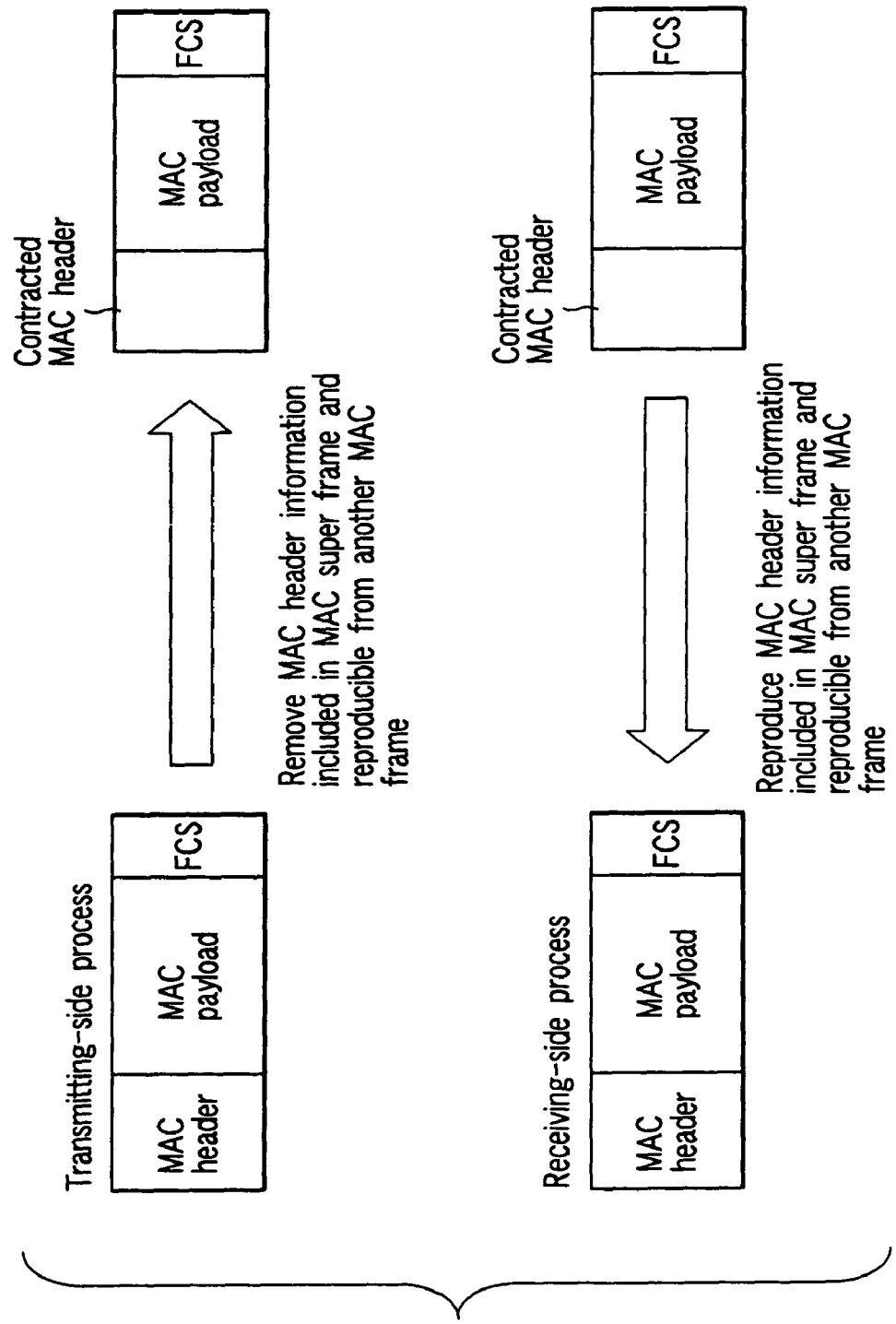
F I G. 71

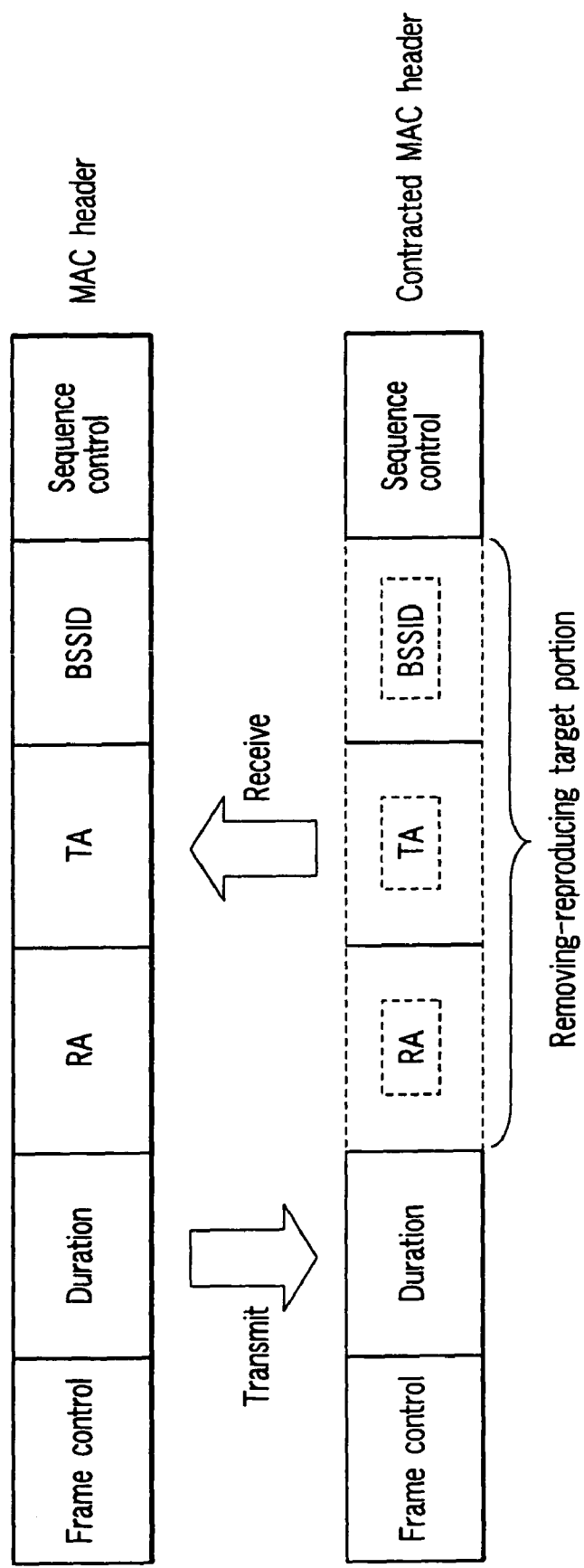
F I G. 72 ns and is used as a QoS technique of guaranteeing parameters such as a designated bandwidth and delay time. According to the HCCA, in order to guarantee parameters such as bandwidth and delay time, scheduling is performed considering a required quality in the polling procedure. Jpn. Pat. Appln. KOKAI Publication No. 2002-314546 discloses a method of assigning priorities to communications between the communication apparatuses in a wireless network, while referring to QoS in the IEEE 802.11e standard.
COMMUNICATION APPARATUS, COMMUNICATION SYSTEM AND COMMUNICATION CONTROL PROGRAM

CROSS-REFERENCE TO RELATED APPLICATIONS

This application is based upon and claims the benefit of priority from prior Japanese Patent Application No. 2004-129073, filed Apr. 23, 2004, the entire contents of which are incorporated herein by reference.

BACKGROUND OF THE INVENTION

1. Field of the Invention

The present invention relates a communication apparatus, communication system, and communication control program which perform media access control (MAC) and, more particularly, to frame aggregation in which a plurality of media access control frame (MAC frame) are included in one physical frame.

2. Description of the Related Art

Media access control (MAC) is control for causing a plurality of communication apparatuses which perform communication while sharing the same medium to decide how to use the medium in transmitting communication data or management frame. Owing to media access control, even if two or more communication apparatuses transmit communication data (or management frame) by using the same medium at the same time, there is less chance of the occurrence of a phenomenon (collision) in which a communication apparatus on the receiving side cannot decode communication data. The fundamental access method of the IEEE802.11 MAC is CSMA/CA (Carrier Sense Multiple Access with Collision Avoidance). The CSMA/CA is designed to reduce the collision probability. Media access control is also a technique for controlling access from communication apparatuses to a medium so as to minimize the chance of the occurrence of a phenomenon in which, despite the presence of communication apparatuses having transmission requests, the medium is not used by any of the communication apparatuses.

However, especially in wireless communication, it is difficult to simultaneously monitor transmission data while the communication apparatus transmits the data, and therefore the media access control (MAC) is required in which collision detection is not assumed. A typical technique standard of wireless LAN IEEE802.11 adopts carrier sense multiple access with collision avoidance (CSMA/CA).

The MAC header has the duration value which is the time, in microseconds, required to transmit the data or management frame (including the time of SIFS interval). A communication apparatus which does not have any transmission rights regardless of the sequence judges a virtual busy state of the medium to thereby wait for the transmission. Therefore, the occurrence of the collision is avoided. In the IEEE802.11, it is defined that the state of the medium is judged by a combination of a virtual carrier sense of a MAC layer and a physical carrier sense of a physical layer to control the media access. The CSMA/CA is designed to reduce the collision probability.

In the IEEE802.11 in which the CSMA/CA is adopted, a communication speed has been increased by changing mainly a physical layer protocol. As to a 2.4 GHz band, IEEE802.11 (2 Mbps in 1997) has changed to IEEE802.11b (11 Mbps in 1999), and to IEEE802.11g (54 Mbps in 2003). As to a 5 GHz band, only IEEE802.11a (54 Mbps in 1999) has existed as a standard at present. Moreover, IEEE802.11 Task Group n (TGn) has been already set in order to establish a standard aiming at further speeding-up both in 2.4 GHz and 5 GHz bands.

In addition, several access control techniques designed to improve Quality of Service (QoS) are also known. For example, there is available HCCA (HCF Controlled Channel Access) which is an extended technique of a conventional polling sequence and is used as a QoS technique of guaranteeing parameters such as a designated bandwidth and delay time. According to the HCCA, in order to guarantee parameters such as bandwidth and delay time, scheduling is performed considering a required quality in the polling procedure. Jpn. Pat. Appln. KOKAI Publication No. 2002-314546 discloses a method of assigning priorities to communications between the communication apparatuses in a wireless network, while referring to QoS in the IEEE 802.11e standard.

Even when the communication speed of the physical layer is increased, there is a problem that substantial throughput of communication cannot be enhanced. That is, when the speeding-up of the physical layer is realized, a format of PHY (physical) frame is not efficient any more, and accordingly caused overhead obstructs the enhancement of the throughput. In the PHY frame, a time parameter concerning the CSMA/CA accompanies the MAC frame in a fixed manner. Moreover, a PHY frame header and PHY preamble are required for each MAC frame.

As a method of solving the problem of overhead and increasing throughput, a block response (Block acknowledgement) mechanism introduced in recently drafted IEEE 802.11e/draft 5.0 (enhancement of QoS in IEEE 802.11) is available. The block response mechanism can consecutively transmit a plurality of MAC frames without any random backoff (with SIFS interval), and hence can reduce the backoff amount to some degree. However, the overhead of a physical layer header and preamble cannot be effectively reduced. In addition, according to the aggregation technique introduced in initially drafted IEEE 802.11e, both the backoff amount and the physical layer overhead can be reduced. However, since the length of a physical layer frame containing MAC frames cannot be increased beyond about 4 kbytes under the conventional limitation on the physical layer, an improvement in efficiency is greatly limited. Even if the length of a PHY layer frame can be increased, another problem arises, i.e., a reduction in error tolerance.

Therefore, it has been necessary to solve the overhead accompanying the transmission of a plurality of frames is solved by an efficient frame format, and enhance the substantial throughput of the communication.

On the other hand, according to the conventional HCCA, quality can be guaranteed for each traffic stream, and data transmission corresponding to priority can be realized. The QoS is preferably utilized in a new communication system in which the throughput has been further enhanced. For example, the QoS is preferably used for frame aggregation designed to improve the transmission efficiency by transmitting a plurality of MAC frames upon containing them in one physical (PHY) frame. If, however, a conventional frame aggregation technique is simply applied to QoS like HCCA, the following problems arise.

That is, in the conventional frame aggregation technique in which no consideration is given to the priorities of frames, when a series of frames in a transmission queue (TxQ) are aggregation target frames, an FTP (File Transfer Protocol) frame with a relatively low priority may be extracted prior to a VoIP (Voice over IP) frame with a high priority and aggregated to a transmission aggregation frame. This may hinder the assurance of QoS in consideration of the priorities of frames.

Moreover, with regard to the procedure of a Partial Ack frame to designate some frames that have caused reception errors and to request retransmission, there is a problem that combined use with the ACK procedure (e.g., No acknowledgement (No Ack) procedure) inherent in QoS should be achieved.

BRIEF SUMMARY OF THE INVENTION

The present invention has been developed in consideration of this situation, and an object thereof is to provide a communication apparatus, communication system, and communication control program capable of increasing throughput by aggregation of a plurality of communication frames.

A communication apparatus according to an aspect of the present invention comprises: a generating device configured to generate a single physical frame including a plurality of MAC frames; and a transmitting device configured to transmit the physical frame generated by the generating device, the physical frame comprising variable-length bitmap information comprising bits corresponding to the plurality of MAC frames, and length information of the bitmap information.

BRIEF DESCRIPTION OF THE SEVERAL VIEWS OF THE DRAWING

FIG. 3 is a diagram showing a Bitmap Information field according to a first embodiment of the present invention;

FIG. 5 is an explanatory view of a reception buffer management;

FIG. 11 is a diagram showing a sequence (immediate Block Ack) of a standard Block Ack;

FIG. 14 is a diagram showing a Block Ack sequence (immediate Block Ack) of aggregated QoS data according to the fourth embodiment of the present invention;

FIG. 20 is a diagram showing a sequence example by aggregation of a MAC frame of Ack Policy "No Acknowledgement" and Ack Policy "Block Acknowledgement";

FIG. 21 is a diagram showing Traffic Specification (TSPEC) for use at a setup time of a traffic stream according to a fifth embodiment of the present invention;

FIG. 39 is a diagram showing ACK retransmission at the time of aggregation of a plurality of destinations according to the ninth embodiment of the present invention;

FIG. 45 is a diagram showing designation of an ACK transmission time for a plurality of destinations according to the tenth embodiment of the present invention;

FIG. 51 is a diagram showing one example of a format of a first type of PHY frame;

FIG. 57 is a diagram showing one example of a MAC super frame;

FIG. 61A is a diagram showing an example of a QoS Data frame, and FIG. 61B is a diagram showing one example of a QoS Data+Poll frame;

FIG. 62 is a diagram showing one example of a MAC super frame including Partial Ack+[QoS Data+Poll]+QoS Data;

FIG. 63 is a sequence diagram showing one example of PCF frame exchange;

FIG. 64 is an explanatory view of a CAP/CFP/CP example (CAP generation);

FIG. 66 is a diagram showing a polling sequence example (CAP generation by CTS-self, riding together of pack to STA1 and Poll to STA2);

FIG. 68 is a diagram showing a modification of a sequence example shown in FIG. 65;

FIG. 70 is a diagram showing one example of a frame format having a contracted MAC header for use by a communication apparatus according to a thirteenth embodiment of the present invention;

FIG. 71 is a diagram showing one example of generation of a MAC frame having a contracted MAC header, and a reproduction process of a MAC header from the contracted MAC header according to the thirteenth embodiment of the present invention;

FIG. 72 is a diagram showing a first example of the contracted MAC header according to the thirteenth embodiment of the present invention;

DETAILED DESCRIPTION OF THE INVENTION

Embodiments of the present invention will be described hereinafter with reference to the views of the accompanying drawing.

Figure 1:
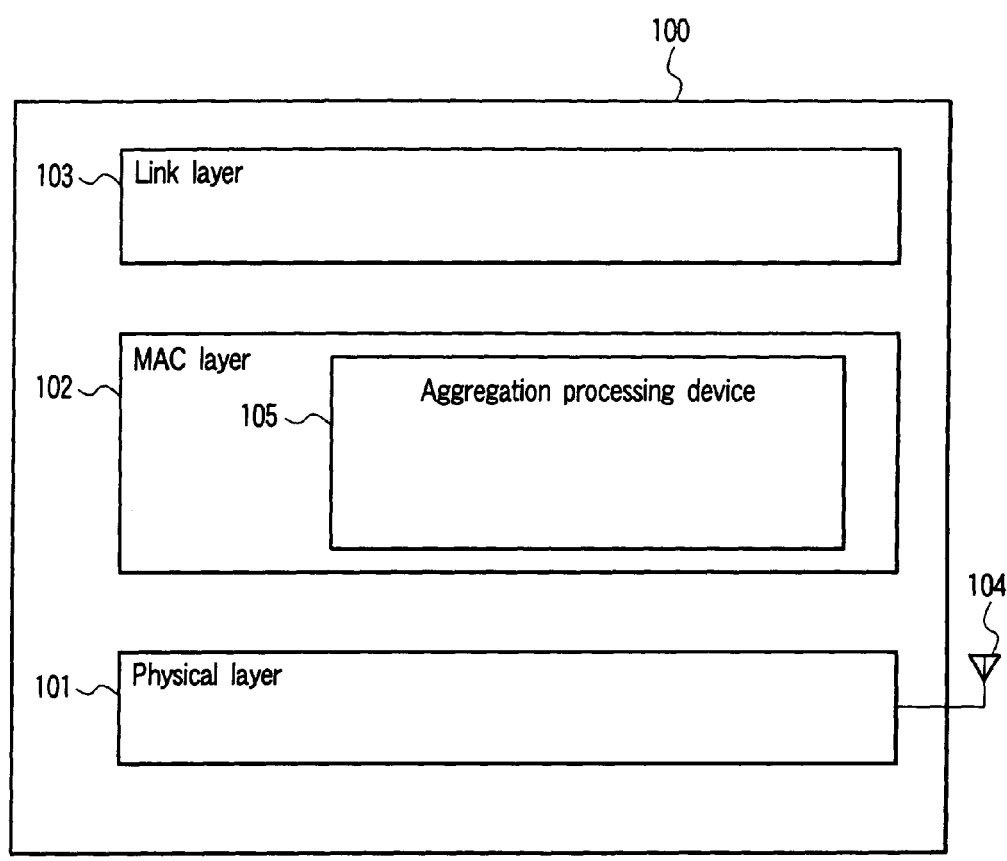
FIG. 1 is a block diagram showing a communication apparatus according to an embodiment of the present invention.

FIG. 1 is a block diagram showing a constitution of a communication apparatus according to a first embodiment of the present invention. A communication apparatus 100 is an apparatus configured to communicate with another communication apparatus through a wireless link, and includes processing units 101, 102, and 103 respectively corresponding to a physical (PHY) layer, MAC layer, and link layer. These processing units are implemented as analog or digital electronic circuits or as firmware or the like to be executed by a CPU incorporated in an LSI in accordance with implementation requirements. An antenna 104 is connected to the physical layer processing unit 101. The MAC layer 102 has an aggregation processing device 105 according to the present invention.

The aggregation processing device 105 generates a physical (PHY) frame including a plurality of media access control (MAC) frames. The media access control frame is, for example, a MAC Protocol Data Unit (MPDU), and may be a MAC Service Data Unit (MSDU) which performs apparent modification and which does not include any MAC header. The generated physical frame is processed by the physical layer processing unit 101, and transmitted via the antenna 104. This communication system will be referred to as "frame aggregation" in the present specification. The frame aggregation is suitable for the next-generation high-throughput wireless LAN communication (IEEE 802.11n standard) which is currently being standardized.

A basic frame format of a MAC super frame (MAC aggregation frame) has at least one MAC super frame header and at least one MAC super frame payload subsequent to the MAC super frame header.

A terminal which has received the MAC super frame judges whether or not the frame is self-addressed, and performs cyclic redundancy check (CRC) calculation of each MPDU. Thereafter, an Ack Policy Bitmap field in the MAC super frame header is checked. When a flag of "1" requiring Partial Ack rises, a value of "1" or "0" is set to the corresponding bitmap of the Partial Ack frame (when CRC is calculated and correctly received, "1" is set. When the frame is wrongly received, "0" is set). The MPDU whose Ack Policy Bitmap is "0" desires transmission by Ack Policy "No Acknowledgement", and therefore the value of "0" is set regardless of a calculated result of CRC.

In a case where the data source receives Partial Ack from a destination terminal, Ack Policy Bitmap information cached by itself is collated with Partial Ack Bitmap. Although the ACK is required, the bit information of the Partial Ack Bitmap is "0". Then, the corresponding data frame needs retransmission.

A Partial Ack in the frame aggregation will be described. The MAC layer of a terminal which transmits the MAC super frame determines each Ack Policy with respect to a data frame from an upper layer. In this case, when the Ack Policy is designated in the Partial Ack, it is meant that "the data frame is a target of the frame aggregation, and an ACK response from a receiving side is required".

As to an ACK mechanism for use in transferring the frame, mainly three types of mechanisms "Normal acknowledgement" (Normal ack), "No Acknowledgement" (No Ack), and "Block Acknowledgement" (Block Ack), have already been defined in IEEE 802.11e.

"Normal acknowledgement" is a normal data transmission method supported by IEEE 802.11, in which after one unicast data (or management) frame is transmitted, a terminal waits for a certain period of time until it receives an ACK frame from a destination terminal. When a timeout occurs, random backoff procedure is performed again to retransmit the data frame. The data frame designated in "Normal acknowledgement" should be excluded from a frame aggregation target, and is transmitted in accordance with a procedure in the existing IEEE 802.11 standard.

The "No Acknowledgement" is a data transmission method used when a transmission channel is relatively stable. According to this method, the terminal transmits a new data frame without waiting for the reception of the ACK frame from the destination terminal.

"Block Acknowledgement" is a data transmission method of consecutively transmitting unicast data frames at Short Inter Frame Space (SIFS) intervals in a burst manner. This method is designed to realize selective repeat retransmission with the use of Block Ack frames.

It is to be noted that as to various constitution examples of the MAC super frame, response control (acknowledgment), retransmission control, QoS, and simulcast, descriptions of Jpn. Pat. Appln. Nos. 2004-004847, 2004-063237, 2004-110446 according to prior applications by the same applicant as that of the present application can be referred to.

First Embodiment

A first embodiment relates to a communication apparatus constituted to include variable-length Bitmap Information and data length of a bitmap in a MAC super frame header, when aggregating a plurality of MAC frames (MPDU) in one physical frame. Specifically, the physical frame has variable-length Bitmap Information constituted of bits corresponding to the plurality of MAC frames, and length information of the Bitmap Information.

Figure 2:
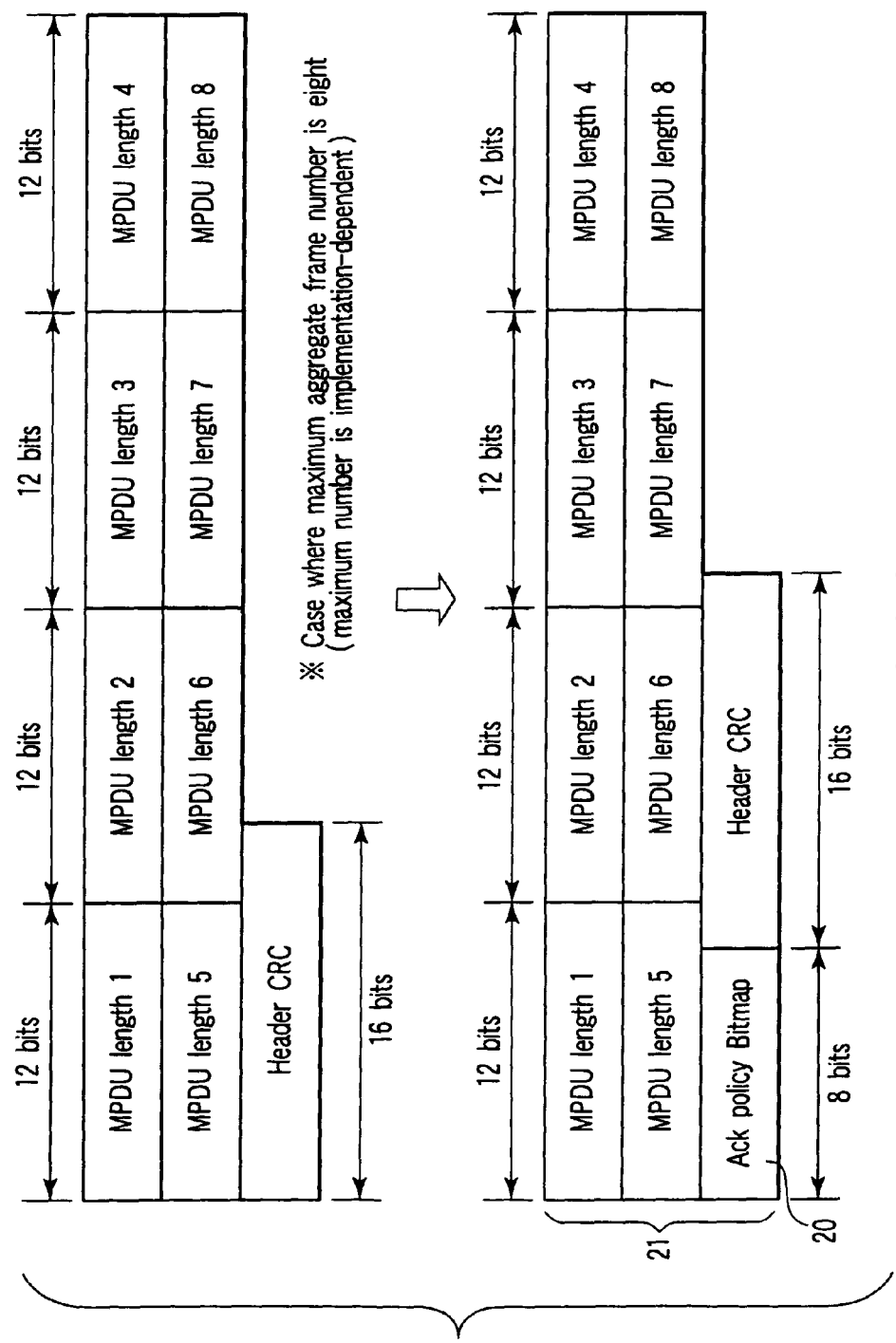
FIG. 2 is a diagram showing an Ack Policy Bitmap having a fixed length.

As shown in FIG. 2, when an Ack Policy Bitmap 20 is included in a MAC super frame header 21, and transmitted to a MAC super frame, negotiation needs to be performed beforehand between transmission/receiving terminals, and a length of the Ack Policy Bitmap 20 needs to be grasped on a receiving side. As a negotiation method, various methods are considered such as a beacon or setup of a traffic stream in HCCA of IEEE802.11e. It is to be noted that the present invention does not limit notification by negotiation of the Ack Policy Bitmap length to a specific method. However, the Ack Policy Bitmap 20 cannot be correctly extracted as long as the size information is not known beforehand on the receiving side of the MAC super frame.

On the other hand, in the first embodiment, it is possible to describe variable-length Bitmap Information, and a Bitmap Information field is defined as shown in FIG. 3. That is, a type of bitmap (Ack Policy Bitmap, etc.) is defined by a Bitmap ID field 31, and a length 32 of actual Bitmap Information (Bitmap Information field 33) is designated, for example, in terms of bytes. Accordingly, the Ack Policy Bitmap can be buried in a variable-length size into one MAC super frame unit without performing any negotiation beforehand.

Examples of a bitmap element shown in FIG. 3 include an "Ack Policy Bitmap", "Multi Address Bitmap" and the like, and they can be identified by the Bitmap ID 31. It is to be noted that, needless to say, the bitmap element (Bitmap ID) is not limited to them.

Figure 4:
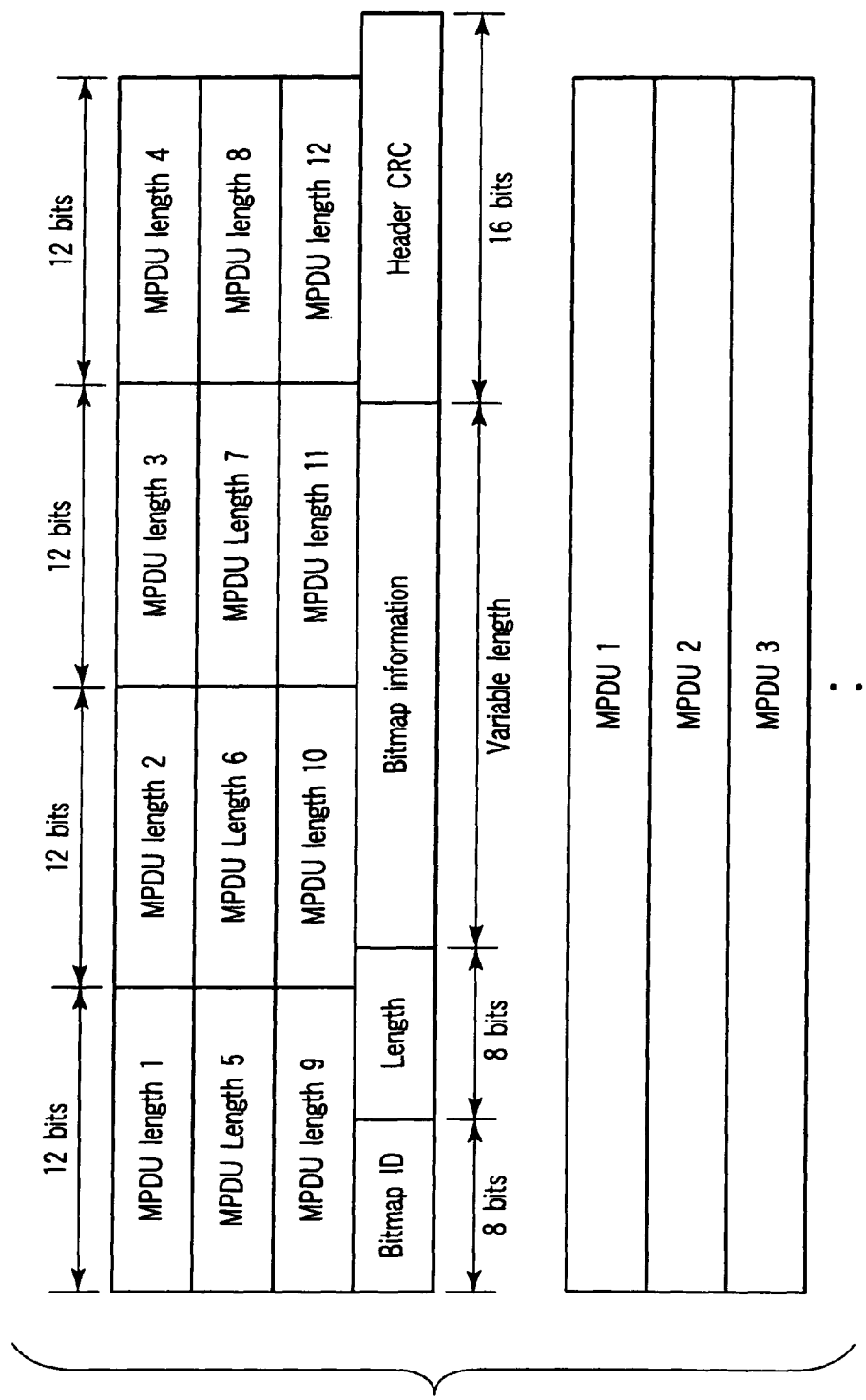
FIG. 4 is a diagram showing one example of a MAC super frame having a variable-length Ack Policy Bitmap.

When 12 MPDUs are aggregated in one MAC super frame 40 as in an example of FIG. 4, a bitmap having a size of two bytes is required as the Ack Policy Bitmap, and therefore "2" is designated in a Length field 32 of the Bitmap Information 33. An ID corresponding to the Ack Policy Bitmap is designated in the Bitmap ID field 31.

Second Embodiment

A communication apparatus according to a second embodiment is one MAC super frame receiving terminal, and a communication apparatus which manages time with a timer for each priority in extracting the frame from a reception buffer and forwarding the frame to an upper layer. The apparatus is also a MAC super frame transmitting terminal, and a communication apparatus which designates timer setting to a receiving side for each priority in extracting the frame from the buffer and forwarding the frame to the upper layer.

When a plurality of MAC frames are aggregated into one physical frame, and transmitted based on an HCCA system of IEEE802.11e, a sequence number is assigned to each traffic stream (TS). The sequence number needs to be consecutive, and the frame is buffered on the receiving side as shown in FIG. 5.

In an example of FIG. 5, there are MAC frames 50, 51, 52 having three priorities "high priority", "intermediate priority", "low priority" in the MAC super frame, and a case where head frames 53, 54, 55 indicate retransmission errors is shown. When a sequence number is continuously received for each traffic stream, a MAC layer can forward the frame to the upper layer (e.g., network layer). However, in FIG. 5, a subsequent frame (of and after sequence number "2") is on standby in the buffer (reception buffer states 56, 57, 58).

In the IEEE802.11, when a frame having a sequence number smaller than the frame on standby in the buffer on the receiving side cannot be received, timeout occurs, and all accumulated frames are forwarded to the upper layer (e.g., IP). When sliding window control is executed for each priority, the sequence number is managed in accordance with the priority on a transmission/receiving side. Therefore, there is a problem that both a traffic stream sensitive to a delay time and a traffic stream having a comparatively large tolerance with respect to the delay time are handled in the same manner.

Figure 6:
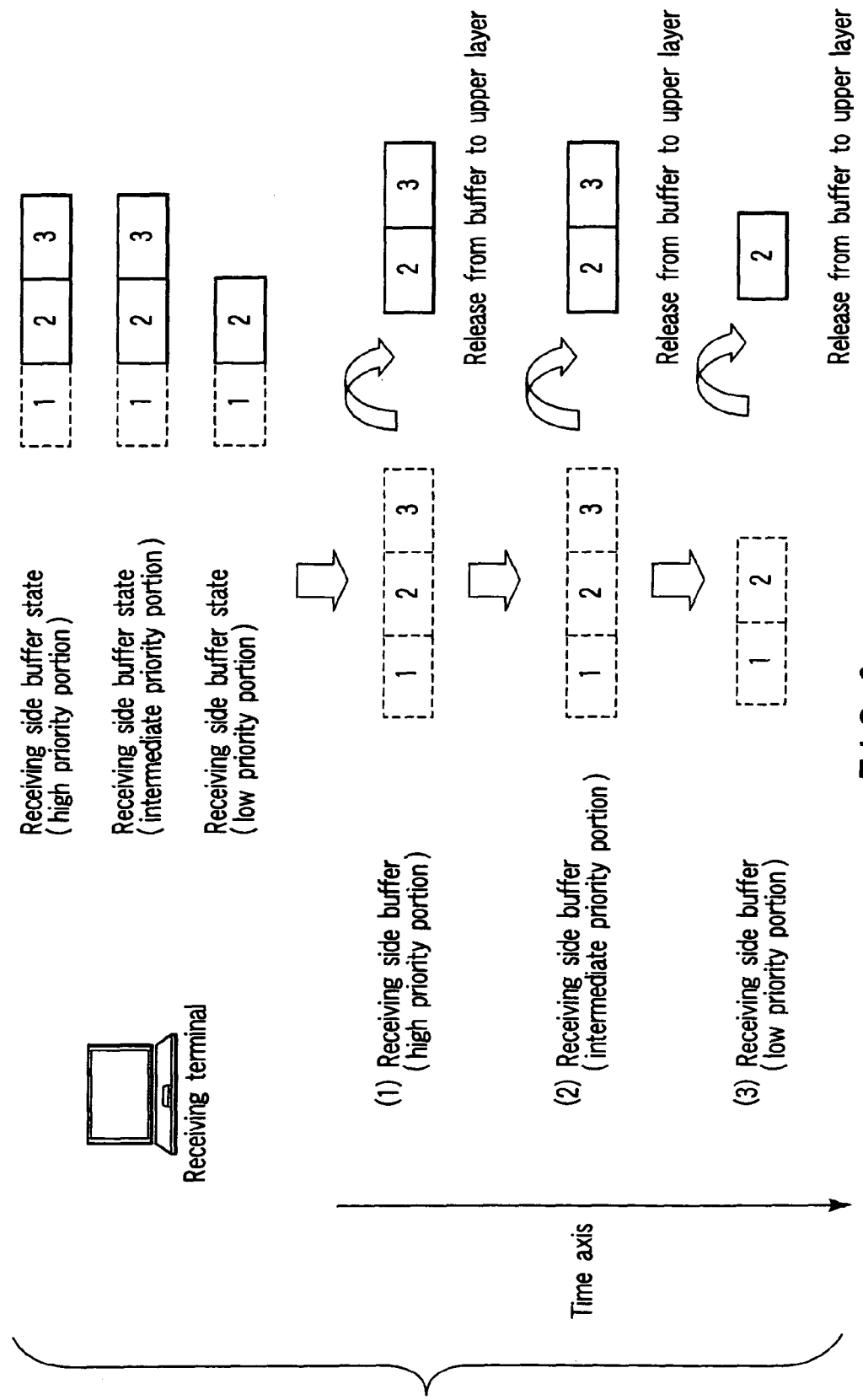
FIG. 6 is an explanatory view of the reception buffer management for each priority according to a second embodiment of the present invention.

To solve the problem, in the second embodiment, as shown in FIG. 6, timers 1, 2, 3 are disposed in buffers 60, 61, 62, respectively, for each traffic stream on a MAC super frame receiving side, and the buffer is managed for each traffic stream in accordance with operations of the timers which independently operate. When the timers 1, 2, 3 time out, the frames stored in the corresponding buffers 60, 61, 62 are released from the buffers, and forwarded to the upper layer.

Figure 7A:
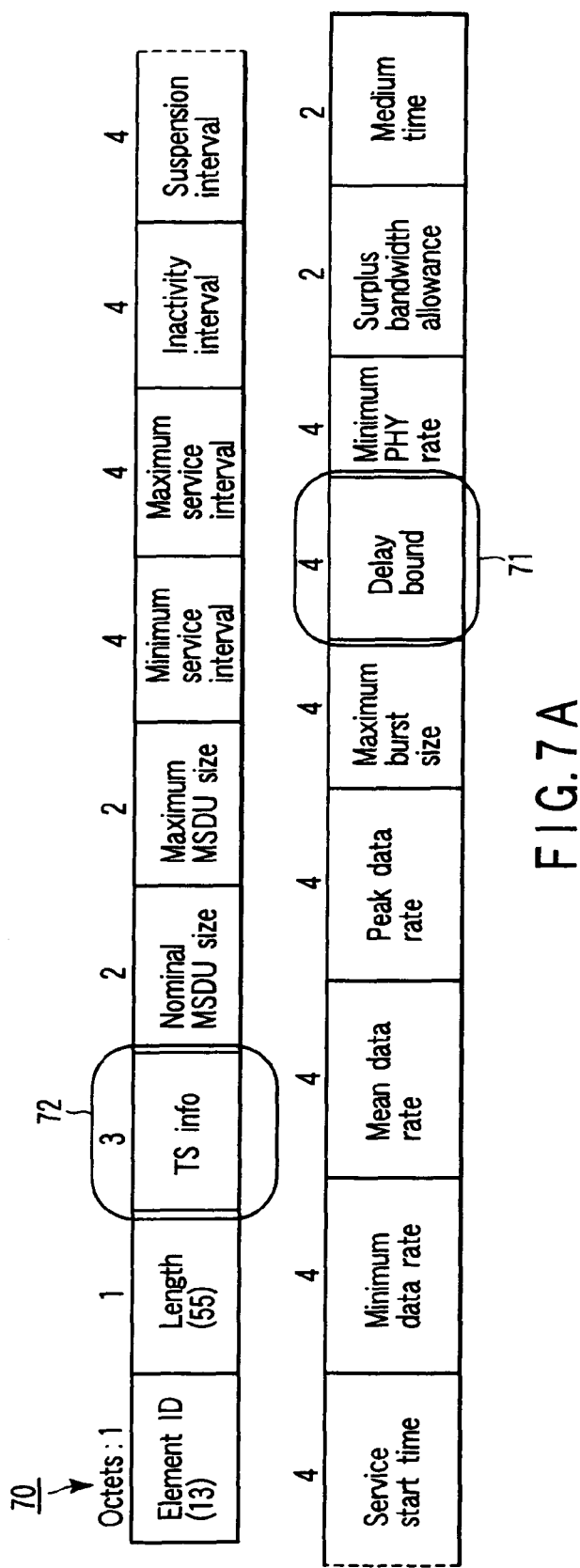
FIGS. 7A and 7B are views showing a format of a TSPEC.

The values (timeout time) set to the respective timers 1, 2, 3 may be determined based on a Delay Bound field 71 of a traffic specification (TSPEC) 70 shown in FIG. 7A. The Delay Bound field 71 specifies the maximum amount of time, in microseconds, allowed to transport an MPDU belonging to the TS in this TSPEC, measured between the time marking the arrival of the MSDU at the local sublayer from the local MAC-SAP and the time completion of the successful transmission or retransmission of the MSDU to the destination. And the frame exceeding Delay Bound is discarded on the transmitting side (or the receiving side) even before reaching retransmission upper times. This Delay Bound is set for each priority of the traffic stream (TS), and is matched with the values to set to the timers 1, 2, 3.

Figure 7B:
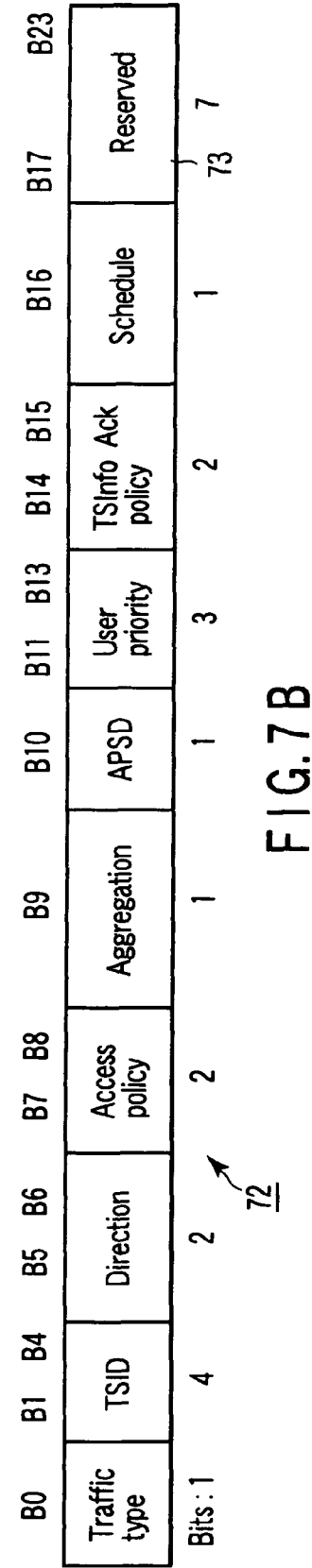

Alternatively, a timeout time of each traffic stream on a MAC super frame receiving side may be designated by a millisecond unit using a Reserved field 73 of a TS Info field 72 of the TSPEC shown in FIG. 7B. Alternatively, a new field is expanded to the TSPEC, and information for designating timeout may be added.

Third Embodiment

A communication apparatus according to a third embodiment is a communication apparatus which aggregates MAC frames having a plurality of priorities into one physical frame to transmit the frame and which thereafter changes a window size (maximum number transmittable at once) for each priority based on partial acknowledgment information from a receiving side to retransmit a MAC super frame.

Figure 8:
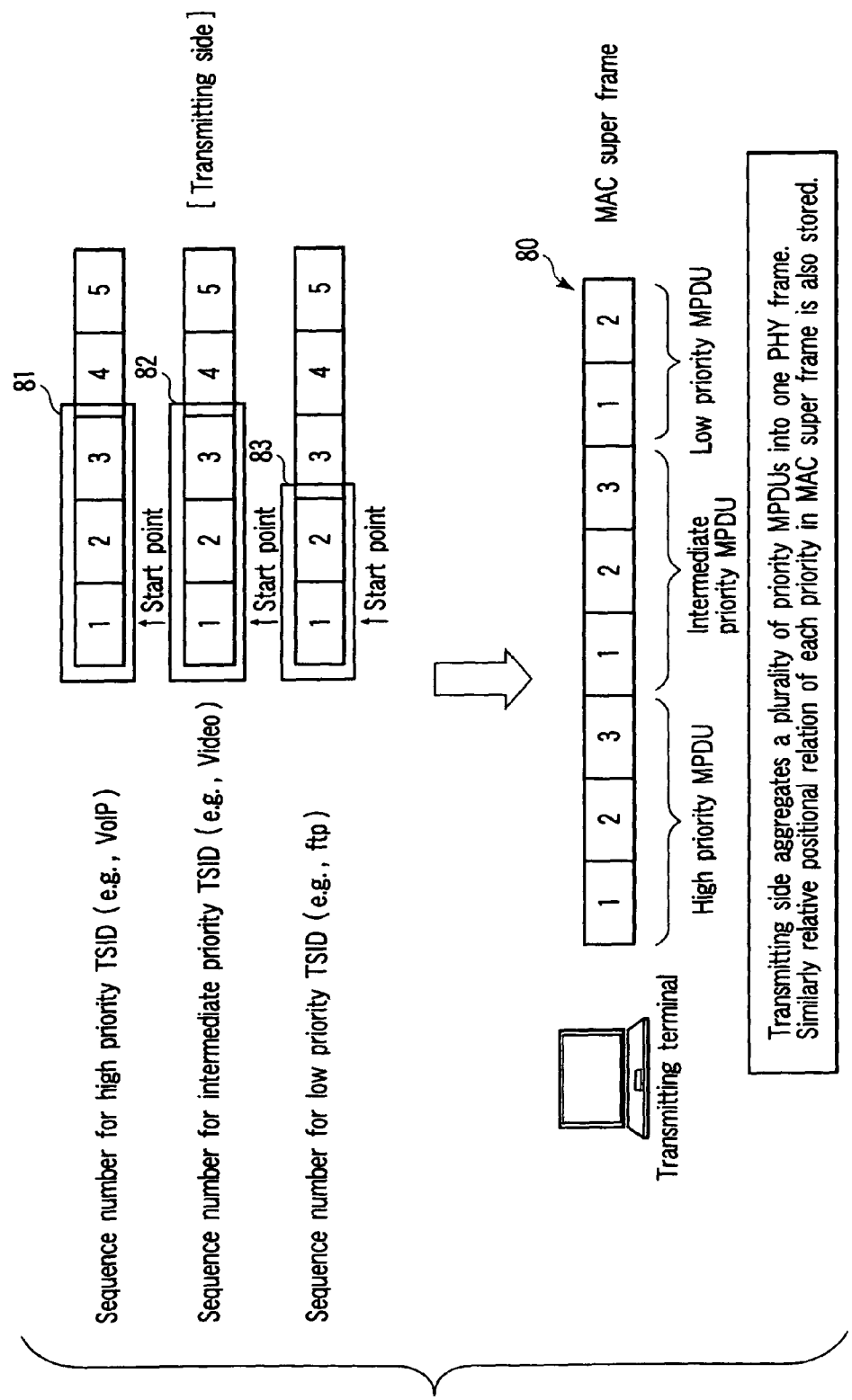
FIG. 8 is an explanatory view showing a first retransmission control example for each priority.
Figure 9:
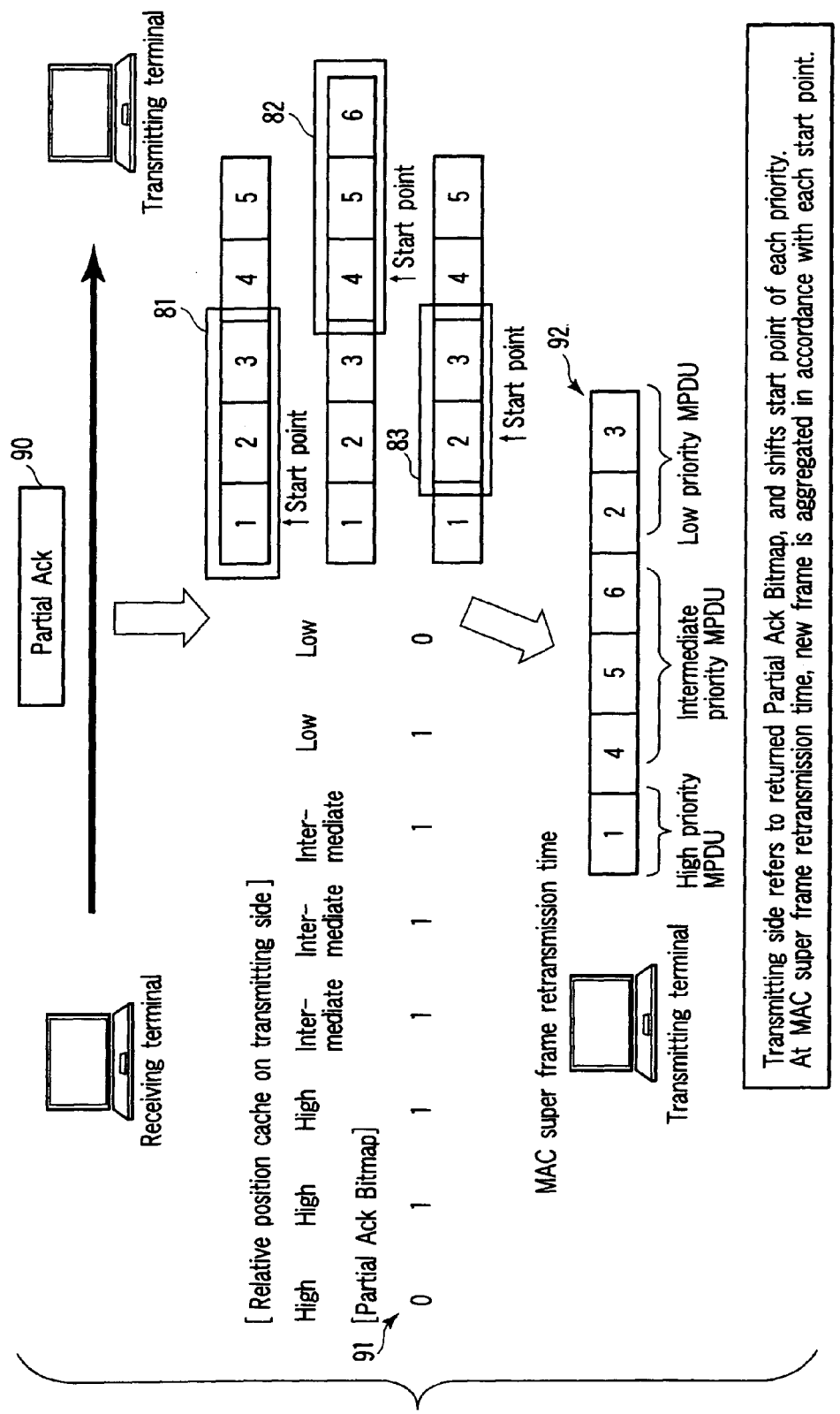
FIG. 9 is an explanatory view showing a second retransmission control example for each priority.

As shown in FIG. 8, it is assumed that a plurality of priority MAC frames (MPDU) are packed in one physical frame, and transmitted as a MAC super frame 80. In an example of FIG. 8, window sizes (the number of frames transmittable at once) of windows 81, 82, 83 are defined for each priority, and it is assumed that high priority (e.g., VoIP) is "3", intermediate priority (e.g., Video) is "3", and low priority (e.g., ftp) is "2". The maximum number of the MAC frames that can be aggregated into the MAC super frame 80 is determined assuming that negotiation is performed beforehand between transmission/receiving terminals. For example, it is assumed that the number is eight (the negotiation may be performed using beacon, or at a setup time of the traffic stream, and a negotiation method is not especially defined). Needless to say, the number is variable in accordance with situations. Moreover, as shown in FIG. 9, a case where a MAC super frame is retransmitted based on Partial Ack 90 is considered. That is, according to a Partial Ack Bitmap 91 in the Partial Ack 90, since a head frame with high priority and a second frame with low priority are not successfully received, the sequence number "1" of high priority and "2" of low priority are retransmission target. On the other hand, frames having intermediate priorities can be successfully received, and any retransmission is not requested. Accordingly, start points of the windows 82, 83 are moved, new frames can be aggregated corresponding to the window size, and a MAC super frame 92 to be retransmitted is generated. Here, the maximum number of MAC frames which can be aggregated is eight as described above. However, the MAC super frame 92 generated as shown in FIG. 9 includes six MAC frames, and there is a waste in the transmission channel. This is because the window size for each priority is constantly fixed.

To solve the problem, in the present embodiment, the start point of the sequence number for each priority is moved, and the window size is appropriately changed.

Figure 10:
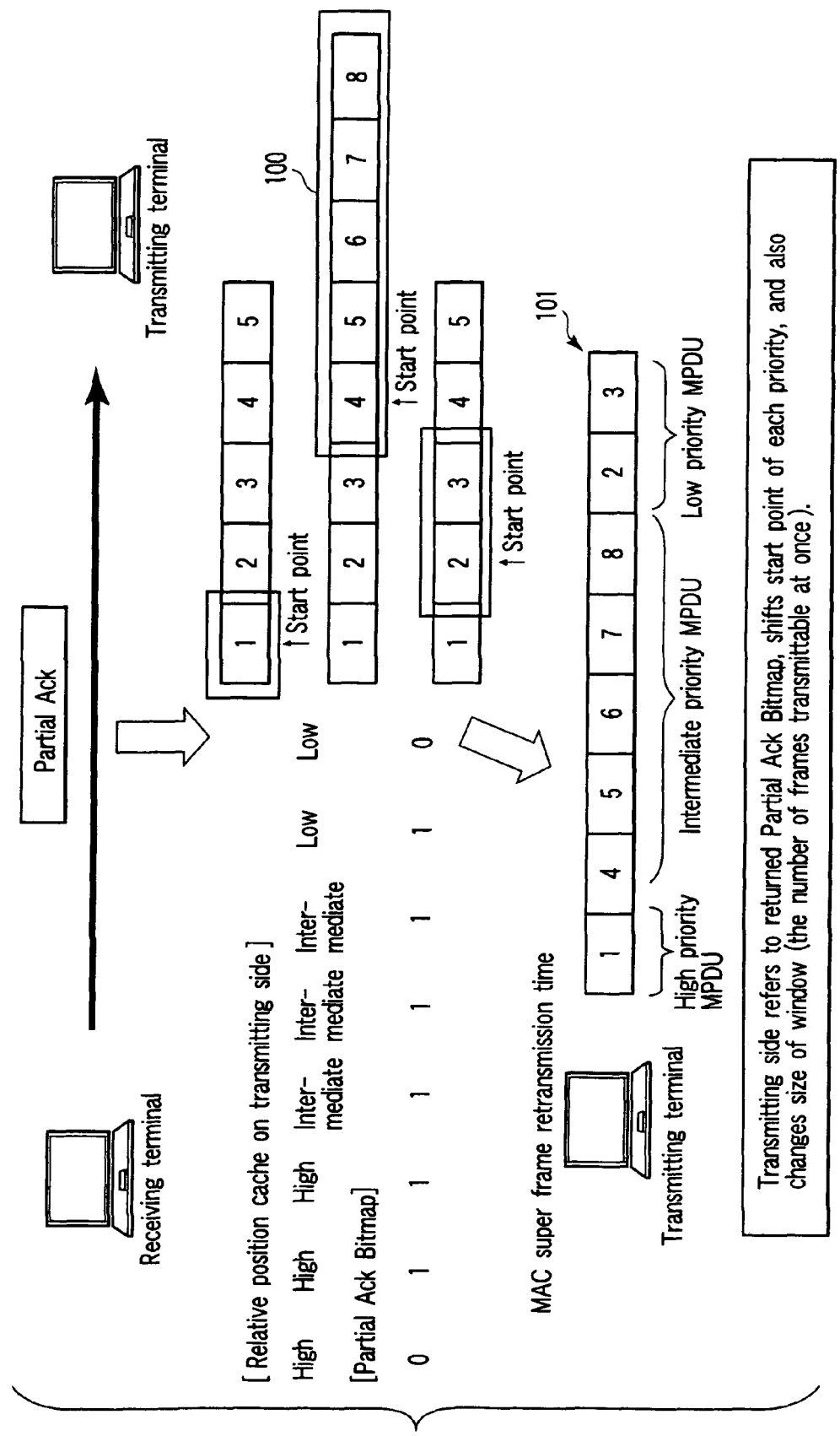
FIG. 10 is an explanatory view of a retransmission control example for each priority according to a third embodiment of the present invention.

For example, as shown in FIG. 10, only one frame having high priority can be packed, but there is an allowance in the number of frames which can be aggregated in a whole MAC super frame. Therefore, the maximum number of the frames that can be aggregated is assumed as an upper limit, and the number of aggregated frames having intermediate priorities is increased as much as possible. In a stage of FIG. 8, an initial value of transmittable frames having the intermediate priority was three frames. However, since only one frame having the high priority is transmitted, the window size of an intermediate-priority window 100 is enlarged from three to five frames.

Therefore, eight frames corresponding the maximum number of the frames that can be aggregated are aggregated in a MAC super frame 101 generated according to the present embodiment, and a transmission efficiency can be increased more than that of the MAC super frame 92 in which six frames are aggregated as shown in FIG. 9.

As a result of a performed retransmission process, more frames having high priorities can be transmitted. Then, the window sizes of the respective priorities are returned to initial values (in this example, the high priority is returned to "3", intermediate priority to "3", low priority to "2") again, and QoS data is aggregated into the MAC super frame.

Fourth Embodiment

Figure 12:
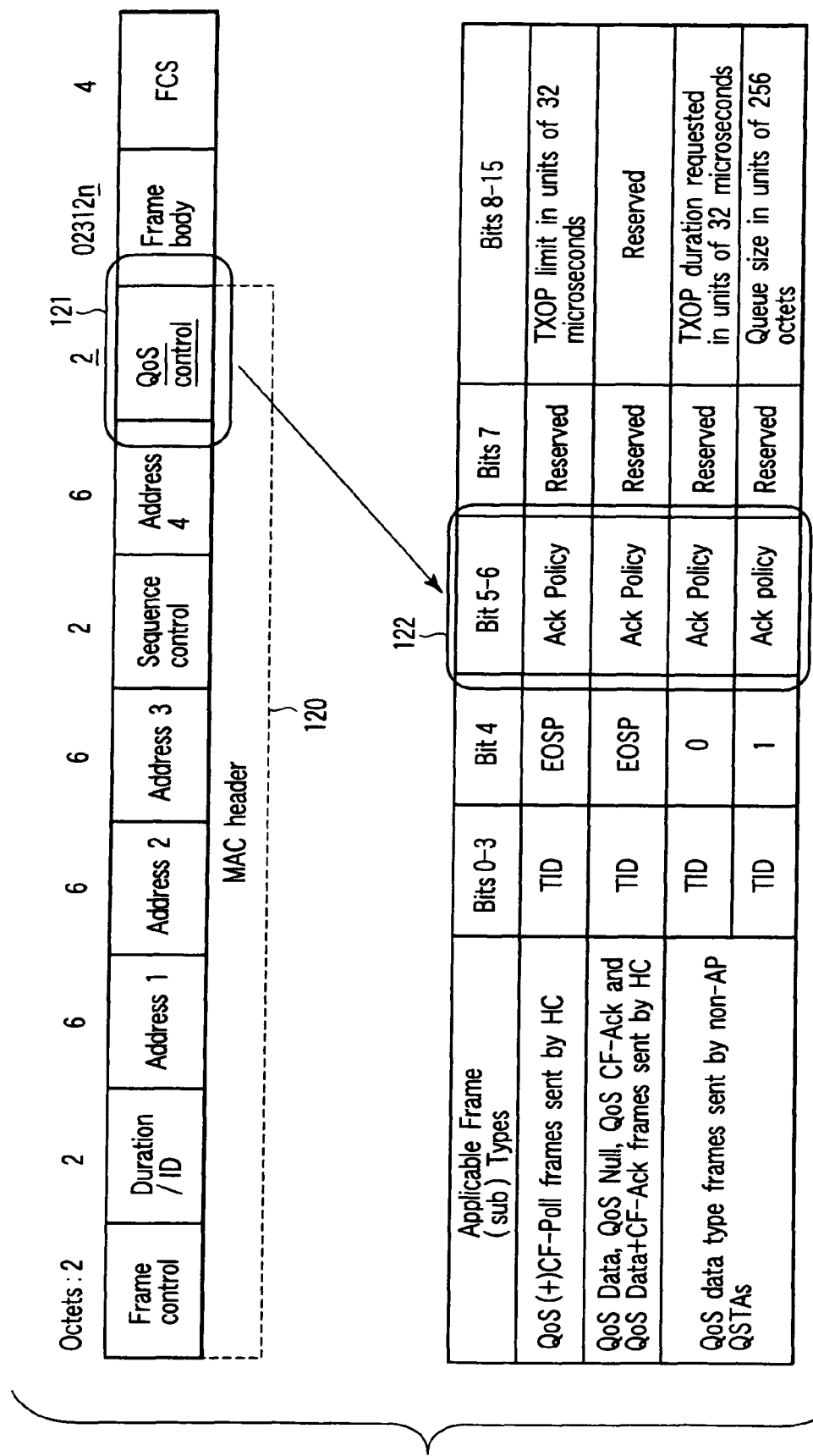
FIG. 12 is a diagram showing a QoS Control field.

A fourth embodiment relates to Block Ack procedure. FIG. 11 shows a sequence (immediate type) of standard Block Ack. On the other hand, in IEEE802.11, as shown in FIG. 12, a QoS Control field 121 is added to a MAC header 120, an ACK policy 122 is designated, and accordingly various acknowledgment patterns can be realized such as "No Ack" (transmission that does not require any ACK) "Block Ack", and "Normal ack". Here, concerning the QoS data designated by the Block Ack, as shown in FIG. 11, after transmitting the data at a Short Inter Frame Space (SIFS) interval, a Block Ack Request 110 is transmitted. A transmitting terminal receives a Block Ack 111 from a destination terminal in response to a Block Ack Request. The Block Ack Request 110 and the Block Ack 111 need to generate the data for each Traffic Identifier (TID) priority.

[Aggregation Example 1 of Block Ack]

In Aggregation Example 1 of Block Ack, a QoS Data frame of a Block Ack target to be transmitted at a SIFS interval is aggregated into one physical frame and transmitted.

Figure 13:
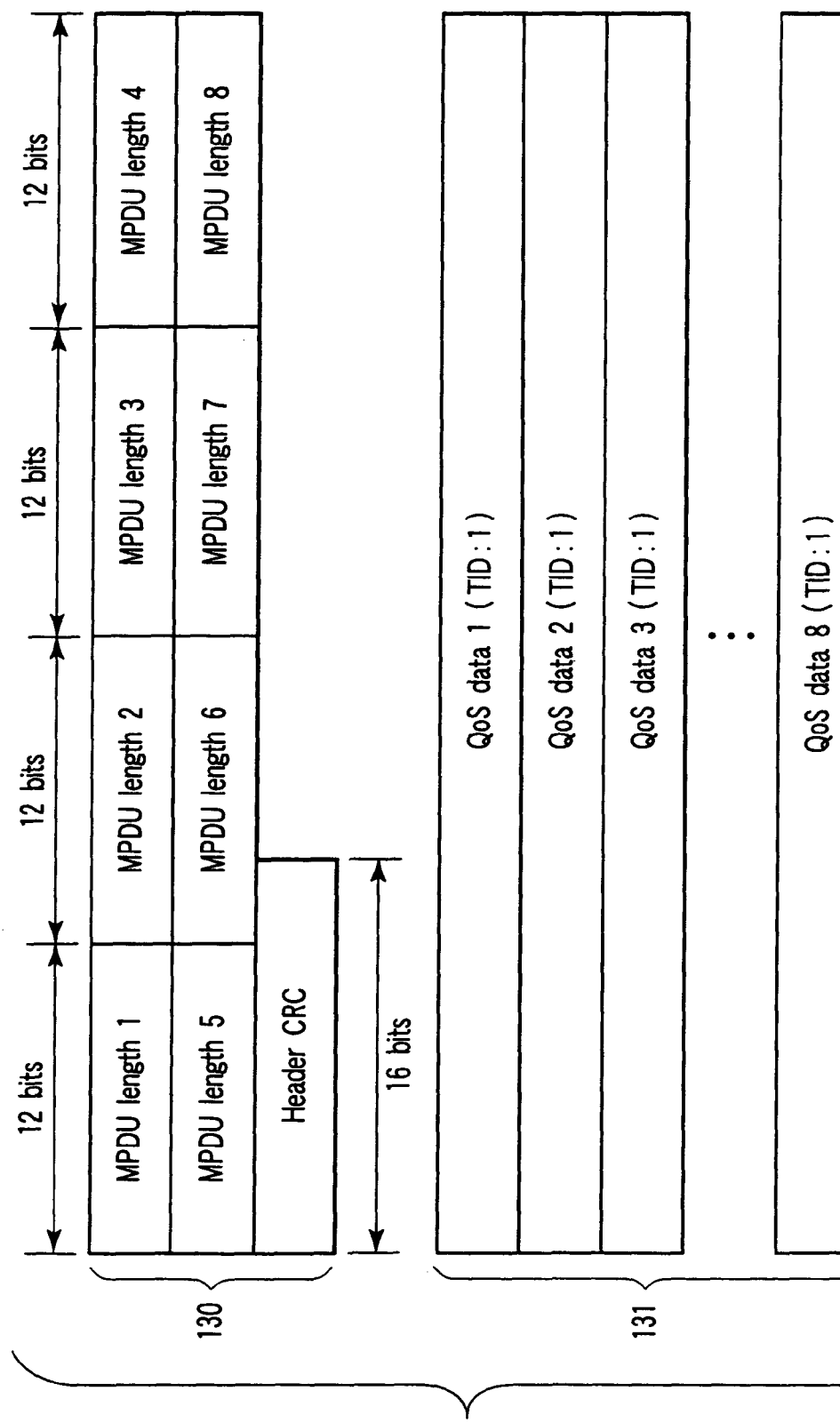
FIG. 13 is a diagram showing one example of a MAC super frame having a variable-length Ack Policy Bitmap according to a fourth embodiment of the present invention.

For example, as shown in FIG. 13, following a MAC super frame header 130, a MAC frame 131 whose ACK policy is Block Ack and which is limited to QoS data having the same destination and TID is aggregated.

As shown in FIG. 14, a MAC super frame 140 in which QoS data on TID1 is aggregated is first transmitted. Subsequently, after SIFS period, a MAC super frame 141 in which QoS data on TID2 is aggregated is transmitted. After the SIFS period, a Block Ack Request 142 concerning TID1 is transmitted. Further after SIFS period, a Block Ack 143 concerning the TID1 is received. After the SIFS of the Block Ack 143 on the TID1, a Block Ack Request 144 on TID2 is transmitted. Further after SIFS period, a Block Ack 145 on the TID2 is received. It is to be noted that a timing to transmit the Block Ack Request does not have to be especially limited after sending the QoS data of the corresponding TID. That is, in FIG. 14, after SIFS period after transmitting the MAC super frame 140, the Block Ack Request 142 can be transmitted.

According to Aggregation Example 1 of the Block Ack, a plurality of QoS Data frames of the Block Ack target are aggregated into one MAC super frame and transmitted so that transmission efficiency can be enhanced.

[Aggregation Example 2 of Block Ack]

Figure 15:
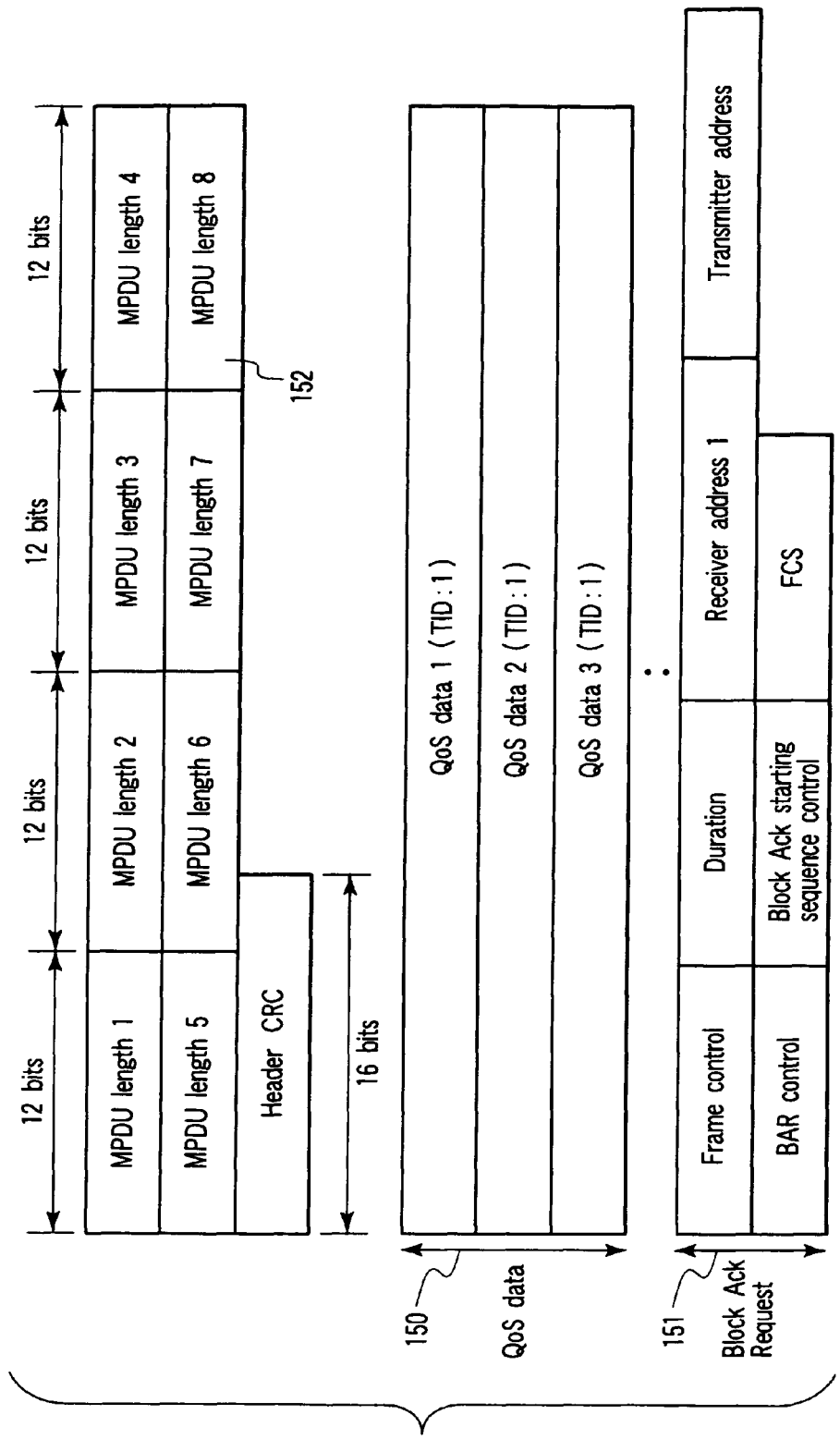
FIG. 15 is a diagram showing an aggregation example of QoS data and Block Ack Request according to the fourth embodiment of the present invention.

In Aggregation Example 2 of Block Ack, as shown in FIG. 15, in addition to the aggregating of a QoS Data frame 150, a Block Ack Request frame 151 is also aggregated into one physical frame (MAC super frame).

In a case where the aggregate maximum number of the MAC super frames is, for example, eight frames (assuming that the maximum aggregate number is recognized beforehand through negotiation), seven QoS data are aggregated, and a Block Ack Request frame is attached to a tail end of the aggregation PSDU (PHY Service Data Unit). The Block Ack Request frame 151 is appropriately processed on a receiving side based on an MPDU Length field 152 of a MAC super frame header. Here, a Block Ack Request cannot be aggregated in front of the QoS data. Because, as shown by the Block Ack Request frame 151, to determine a start sequence number of a reception status target of the QoS data by a Block. Ack Starting Sequence Control field, processing (error calculation) of QoS data needs to be performed in advance.

Figure 16:
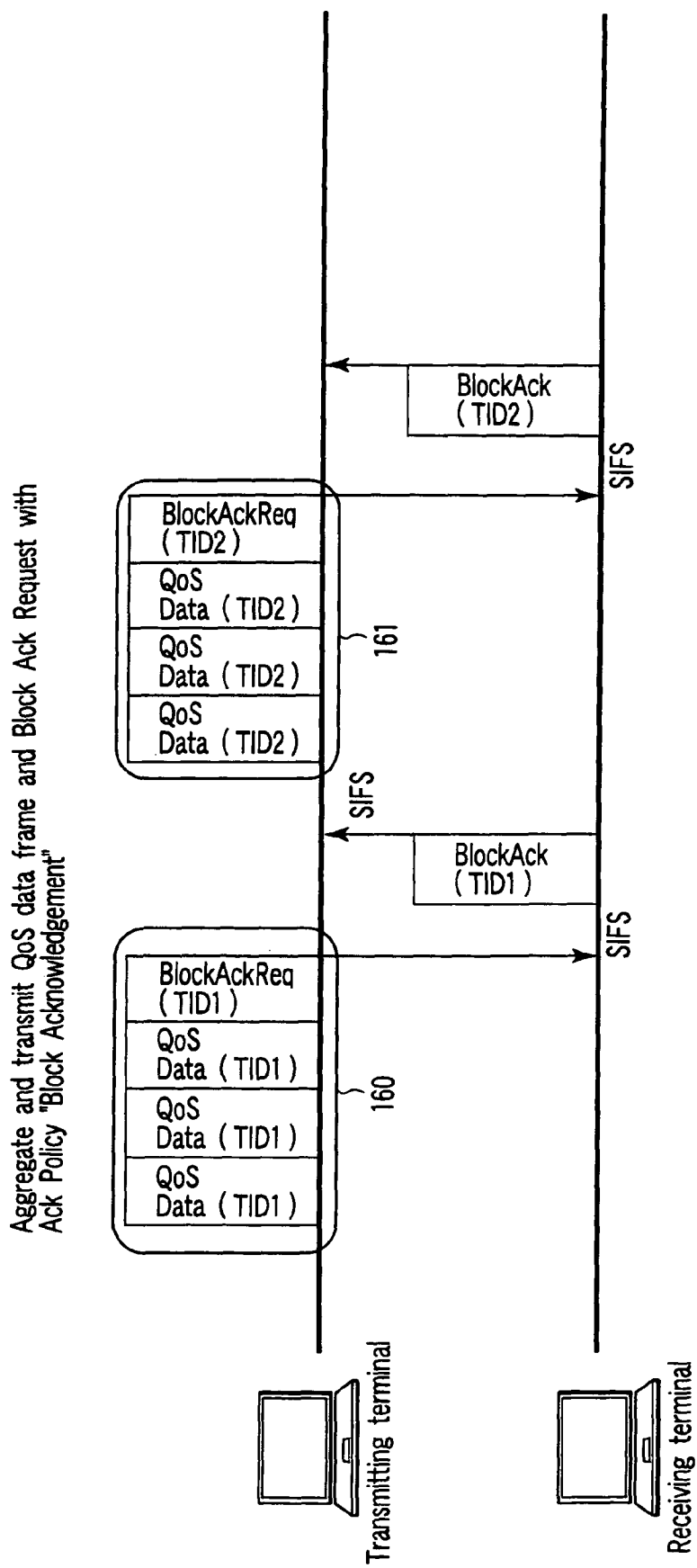
FIG. 16 is a diagram showing a Block Ack sequence (immediate Block Ack) in which the QoS data and Block Ack Request are aggregated according to the fourth embodiment of the present invention.

A Block Ack sequence of the present example is shown in FIG. 16. In addition to a plurality of QoS data frames, Block Ack Requests are further aggregated into MAC super frames 160, 161, so that transmission efficiency can be enhanced.

[Aggregation Example 3 of Block Ack]

In Aggregation Example 3 of Block Ack, QoS Data frames and corresponding Block Ack Requests present for a plurality of TIDs are integrated, aggregated into one physical frame, and transmitted.

Figure 17:
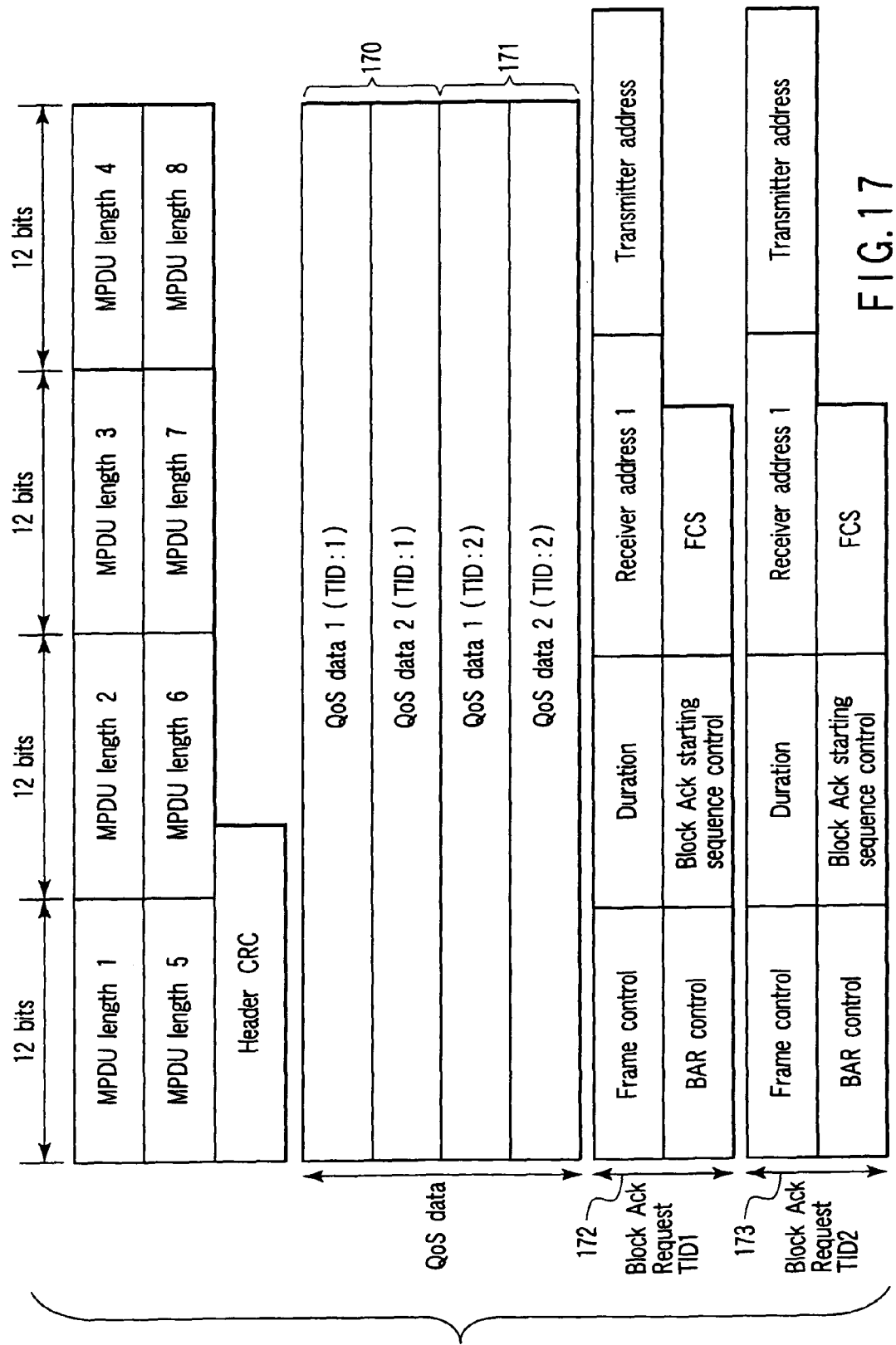
FIG. 17 is a diagram showing an aggregation example of QoS data and Block Ack Request for a plurality of TIDs according to the fourth embodiment of the present invention.
Figure 18:
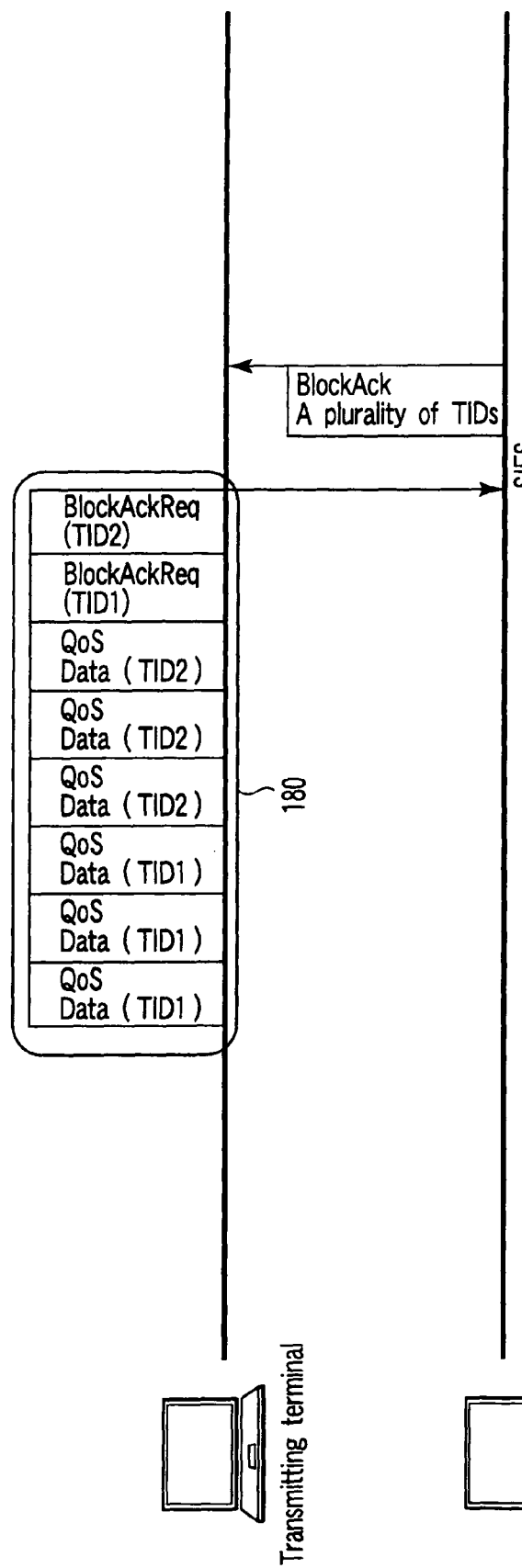
FIG. 18 is a diagram showing a Block Ack sequence in which the QoS data and Block Ack Request for the plurality of TIDs are aggregated according to the fourth embodiment of the present invention.

As shown in FIG. 17, QoS data with Ack Policy "Block acknowledgement" 170, 171 on different TIDs, and corresponding Block Ack Requests 172, 173 are aggregated into one physical frame to generate a MAC super frame. As shown in FIG. 18, when a generated MAC super frame 180 is transmitted, transmission efficiency can be further improved.

[Aggregation Example 4 of Block Ack]

A communication apparatus according to Aggregation Example 4 of Block Ack aggregates MAC frames in a case where an Ack Policy "No acknowledgement" MAC frame which does not require any ACK, and an Ack Policy "Block Acknowledgement" MAC frame requiring acknowledgment corresponding to a MAC frame transmitted in a burst manner are mixed.

Figure 19:
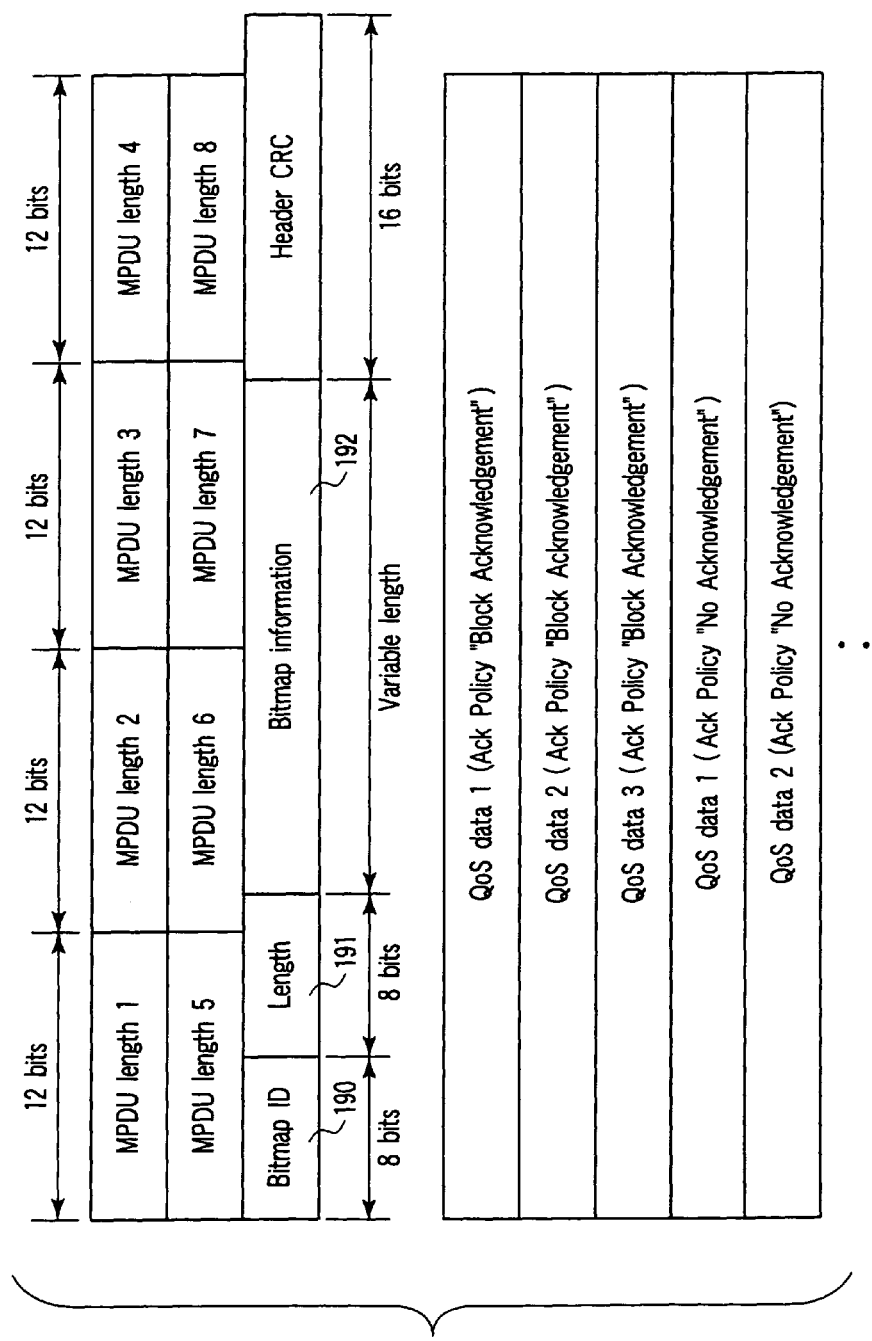
FIG. 19 is a diagram showing aggregation of Ack Policy "No Acknowledgement" and Ack Policy "Block Acknowledgement" frame according to the fourth embodiment of the present invention.

As shown in FIG. 19, a MAC super frame of the present example has a Bitmap ID field 190, a Length (bitmap length) field 191, and a variable-length bitmap (Bitmap Information) 192. In the Bitmap ID 190, an identifier (ID) is described indicating that a bitmap type (Bitmap Element) is a combined policy of an Ack Policy "No Acknowledgement" and an Ack Policy "Block Acknowledgement". In the Length field 191, a length of the Bitmap Information 192 is described, for example, by a byte unit.

In the Bitmap Information 192, information for identifying a MAC frame which is "No Acknowledgement", and a MAC frame which is "Block Acknowledgement" is described in a plurality of MAC frames aggregated into the MAC super frame. In the frame aggregation example shown in FIG. 19, for example, eight MAC frames in total are aggregated, three frames (QoS data 1 to 3) require acknowledgement using Block Ack among them, and five frames (FIG. 19 show the QoS data 1, 2 only) do not require any ACK.

In this case, for example, when a bit for requiring the Block Ack is for example, 1, the Bitmap Information 192 indicates "11100000", and is set on a transmitting side (it is to be noted that, needless to say, the bit may be a negative logic). A receiving terminal generates Block Ack based on the Bitmap Information 192, and returns the ACK to a transmitting terminal.

For example, as shown in FIG. 20, it is assumed that a MAC super frame 2002 is transmitted from a transmitting terminal, and following the MAC super frame 2002, a Block Ack Request 2003 is transmitted from the transmitting terminal. A receiving terminal judges from Bitmap Information 2001 included in the MAC super frame 2002 that first three MAC frames in the MAC super frame 2002 require the Block Ack in the MAC super frame 2002, and the remaining five MAC frames do not require any ACK. A receiving-side terminal returns the information to Block Ack 2004 in response to the Block Ack Request 2003 from the transmitting terminal.

According to Aggregation Example 4 of the Block Ack, transmission efficiency can be enhanced by aggregation of MAC frames having different Ack Policies. It is to be noted that the Bitmap Information does not have to necessarily have a variable length as in the present example, and may have a fixed length. In this case, any Length Information is not required.

It is to be noted that Aggregation Example 4 of the Block Ack can be implemented by combination of frame aggregation of QoS data and Block Ack Request, or frame aggregation of QoS data and Block Ack Request for each of a plurality of TIDs. In this case, it is possible to realize transmission which supports Ack Policies of both "No Acknowledgement" and "Block Acknowledgement".

Fifth Embodiment

A communication apparatus according to a fifth embodiment is constituted to include information indicating the number of MPDUs in a MAC super frame header, when fixing an MSDU size of a traffic stream to aggregate a plurality of MPDUs into one physical frame.

In IEEE802.11e, when communication is performed using HCCA, QoS station (QSTA) sets up the traffic stream in QoS access point (which is also called hybrid coordinator: HC). FIG. 21 shows a TSPEC 210 for use at the time of setup of the traffic stream. The TSPEC has a Nominal MSDU Size field 211. The Nominal MSDU Size field 211 is 2 bytes long and contains an unsigned integer that specifies the nominal size, in bytes, of MSDUs belonging to the TS under this traffic specification. If the Fixed subfield is set to 1, then the size of the MSDU is fixed and is indicated by the Size subfield 212. If the Fixed subfield is set to 0, then the size of MSDU might not be fixed.

When a size of a MAC Protocol Data Unit (MPDU) aggregated into the MAC super frame has a variable length, an MPDU Length field for identifying each segmentation is essential. When it is notified beforehand that the MSDU has a fixed length at the time of the setup of the traffic stream, the MPDU Length field can be omitted, and the number of MPDUs aggregated instead can be set. Therefore, the size of the MAC super frame header in which the MPDU Length field is stored can be reduced.

Figure 22:
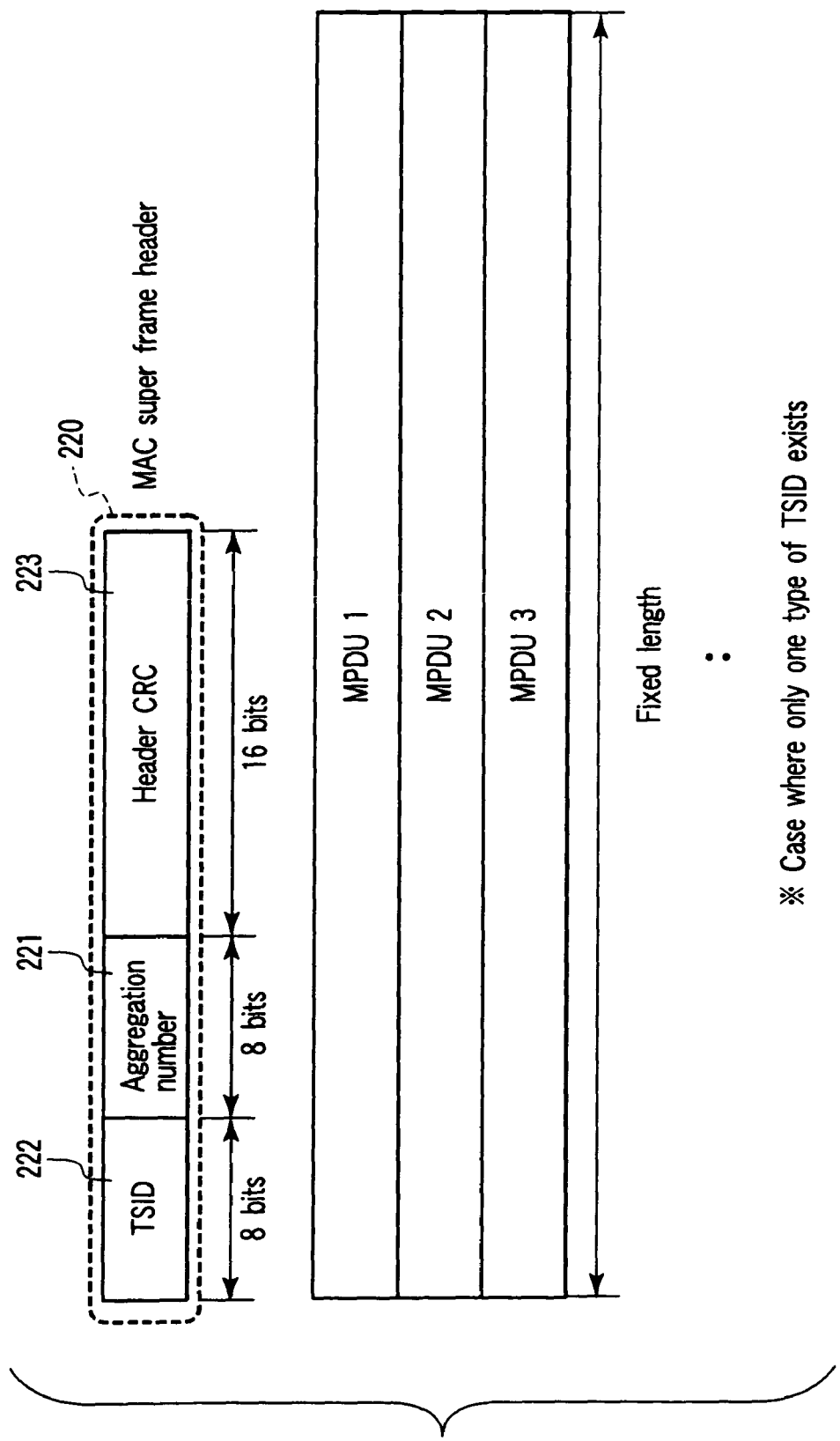
FIG. 22 is a diagram showing a MAC super frame whose MPDU length is assumed as a fixed length according to the fifth embodiment of the present invention.

FIG. 22 shows a MAC super frame in which an MPDU length is a fixed length according to the fifth embodiment. Based on a field (Aggregation Number field in FIG. 22) 221 indicating the number of aggregated MPDUs in a MAC super frame header 220, MPDUs 1, 2, 3 . . . can be extracted. It is to be noted that in an example of FIG. 22, frames having an equal value of a TSID 222 are aggregated into a MAC super frame.

In MPDU, MAC header (including a QoS Control field in IEEE802.11e) and FCS (Frame Check Sequence) are added to MSDU. A receiving terminal of the MAC super frame first calculates an error (utilizing a header CRC 223) of the MAC super frame header. When the frame can be correctly received, TSID of MPDU aggregated in the MAC super frame header is judged from the TSID field 222. When TSID information is acquired, a fixed length of MSDU is detected of the setup of the traffic stream. On the other hand, a length of each MPDU corresponds to a sum of a Nominal MSDU Length (fixed) and a MAC header length including a QoS Control field and FCS length. The receiving terminal judges each receiving state of the MPDU, generates a Partial Ack based on a result, and returns the acknowledgment to a transmitting terminal of the MAC super frame.

For example, Transmission Control Protocol (TCP) used by such as File Transfer Protocol (FTP) application, a length of a data frame sometimes shortens at the end of communication (for example, download of file ends). When a Nominal MSDU Length having a fixed length on the traffic stream is designated, the last frame cannot be transmitted/received in a MAC layer. In this case, when the MSDU is generated, a bit string of "0" is padded to a rear part, and a fixed length MSDU is realized. A receiving side extracts a payload having a correct length using a Length field of an IP header in an upper layer from the MAC. Since the MSDU has a fixed length designated at the time of the setup of the traffic stream, communication in the MAC layer can be correctly performed.

Additionally, when a plurality of traffic streams are set up, and all Nominal MSDU Length fields corresponding to the respective traffic streams are designated at the fixed length, one MAC super frame is constituted by aggregation of a plurality of MPDUs having different traffic stream identifiers (TSIDs), and can be transmitted as one physical frame.

Another communication apparatus according to the present embodiment is a communication apparatus which aggregates MAC frames designated at fixed lengths in a plurality of traffic streams into one physical frame and which includes information indicating traffic stream identifiers and information indicating the number of aggregated MPDUs for each traffic stream in a header to transmit the information.

Figure 23:
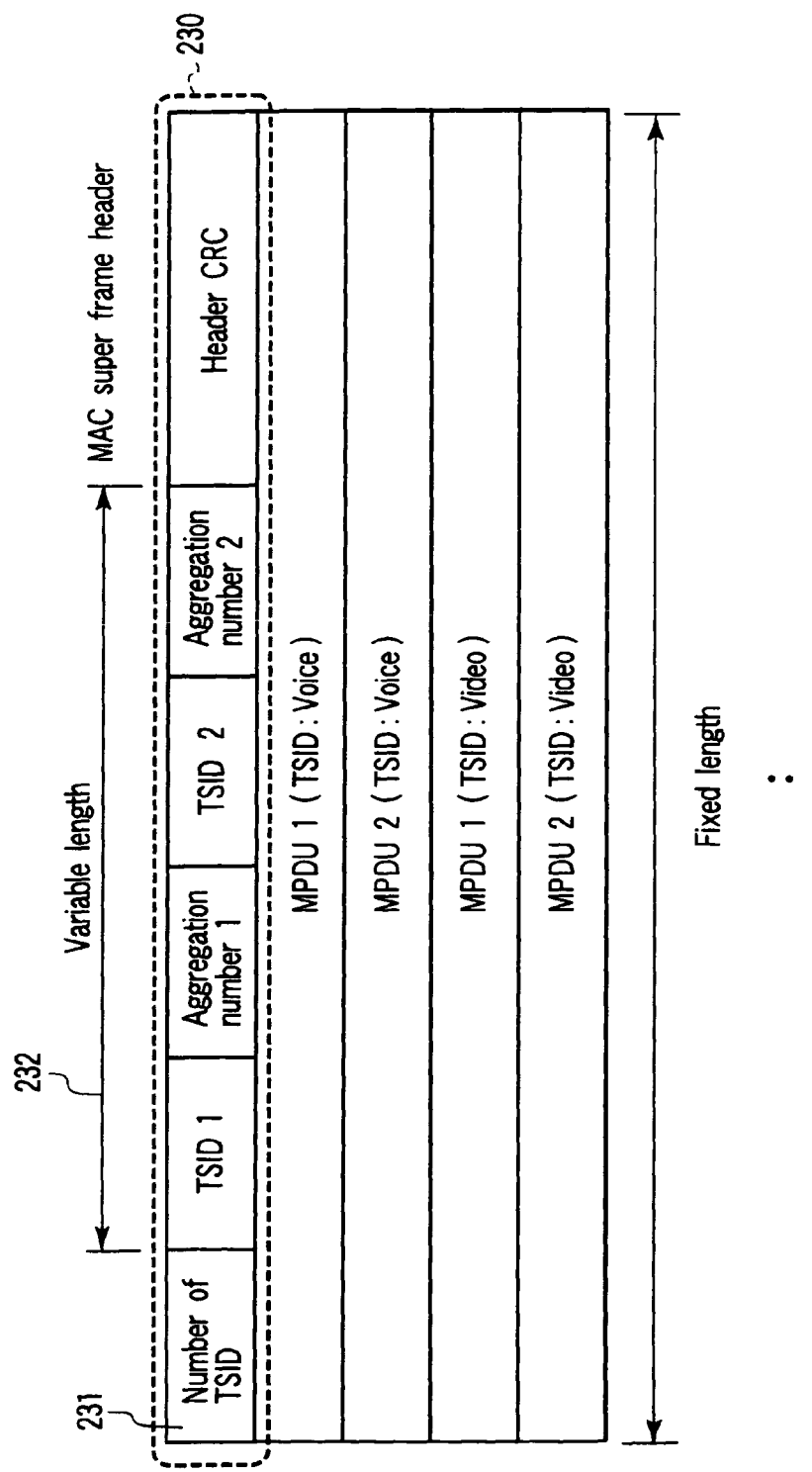
FIG. 23 is a diagram showing aggregation of a fixed-length MAC frame at a time of mixture with a plurality of TSIDs according to the fifth embodiment of the present invention.

FIG. 23 is a diagram showing aggregation of fixed-length MAC frames at the time of mixture of a plurality of TSIDs. In the present example, a field (Number of TSIDs) 231 indicating the number of aggregated TSIDs is added to a MAC super frame header 230. The MAC super frame header 230 has a variable-length field 232 having a pair of TSID, and field indicating the number of aggregated MPDUs with respect to the TSID in accordance with the number of the TSIDs.

A terminal side which has received the MAC super frame detects the number of aggregated TSIDs and that of MPDUs based on the MAC super frame header 230. With regard to the length of the MPDU having the fixed length, a total value of an MPDU length (which is a sum of a fixed MSDU length and a MAC header and a FCS) is calculated for each traffic stream in the same manner as described above. When the length of the data frame from the upper layer shortens as in like the above-described FTP application, "0" is padded to a latter part of the MSDU, and the fixed length may be set. Even in this case, since a field value indicating an IP data gram length of an IP header is not rewritten, a data payload of the upper layer is not influenced. It is to be noted that as to a format of the MAC super frame, MPDUs having different lengths may be aggregated using an MPDU Length field of the MAC super frame header. As in the present embodiment, the MPDUs having the fixed length are aggregated, and information indicating the number of the MPDUs may be added to the MAC super frame header. A format to be taken by the MAC super frame header is based on assumption that negotiation is performed beforehand between transmitters/receivers (a specific negotiation method is other than a target of the present embodiment).

The following sixth to eleventh embodiments relate to aggregation of a plurality of MAC frames in which a plurality of destinations are targets, and simulcast transmission is performed.

In general, transmission of one MAC frame to one destination terminal in a MAC layer of wireless LAN will be referred to as "unicast", and transmission of one MAC frame in which a plurality of destinations are reception targets will be referred to as "multicast". On the other hand, in the description of the embodiment of the present invention, aggregation of a plurality of MAC frames into one physical frame and transmission of a plurality of destinations as a reception target will be referred to as "simulcast".

Here, it is considered that MAC frames having a plurality of destinations are simply aggregated into one physical frame, and simulcast from AP to each STA. In this case, there is a problem that a Partial Ack frame from each receiving terminal with respect to simulcast MAC super frame collides, and communication cannot be correctly performed. According to definition of IEEE802.11, the STA which has received a unicast data frame does not confirm a channel state, and returns an ACK frame immediately after elapse of a SIFS interval. Therefore, there is a high possibility that ACK frames from a plurality of STAs collide.

To solve the problem, in a communication system according to the embodiment of the present invention, MAC super frames including a plurality of destinations are simulcast from AP to STA. When each STA transmits an ACK frame to the AP, transmission timings are preferably shifted in order to avoid collision with the ACK frame from another STA (this will be referred to as time difference ACK).

While the other terminal returns the Partial Ack with a time difference, each terminal appropriately sets NAV, and stops transmission of the data frame and the like. It is to be noted that NAV duration is determined by the number of remaining terminals×(SIFS+ACK transfer time). It is assumed in the embodiment of the present invention that a transfer rate of ACK from each STA is equal. However, if the ACK transfer rate differs with each STA, the corresponding ACK transfer time is preferably calculated.

Sixth Embodiment

A communication apparatus according to a sixth embodiment adds information indicating the ordinal number of a destination corresponding to a MAC frame to a front part of each MAC frame, when aggregating MAC frames for a plurality of destinations into one physical frame to transmit the frame.

Figure 24:
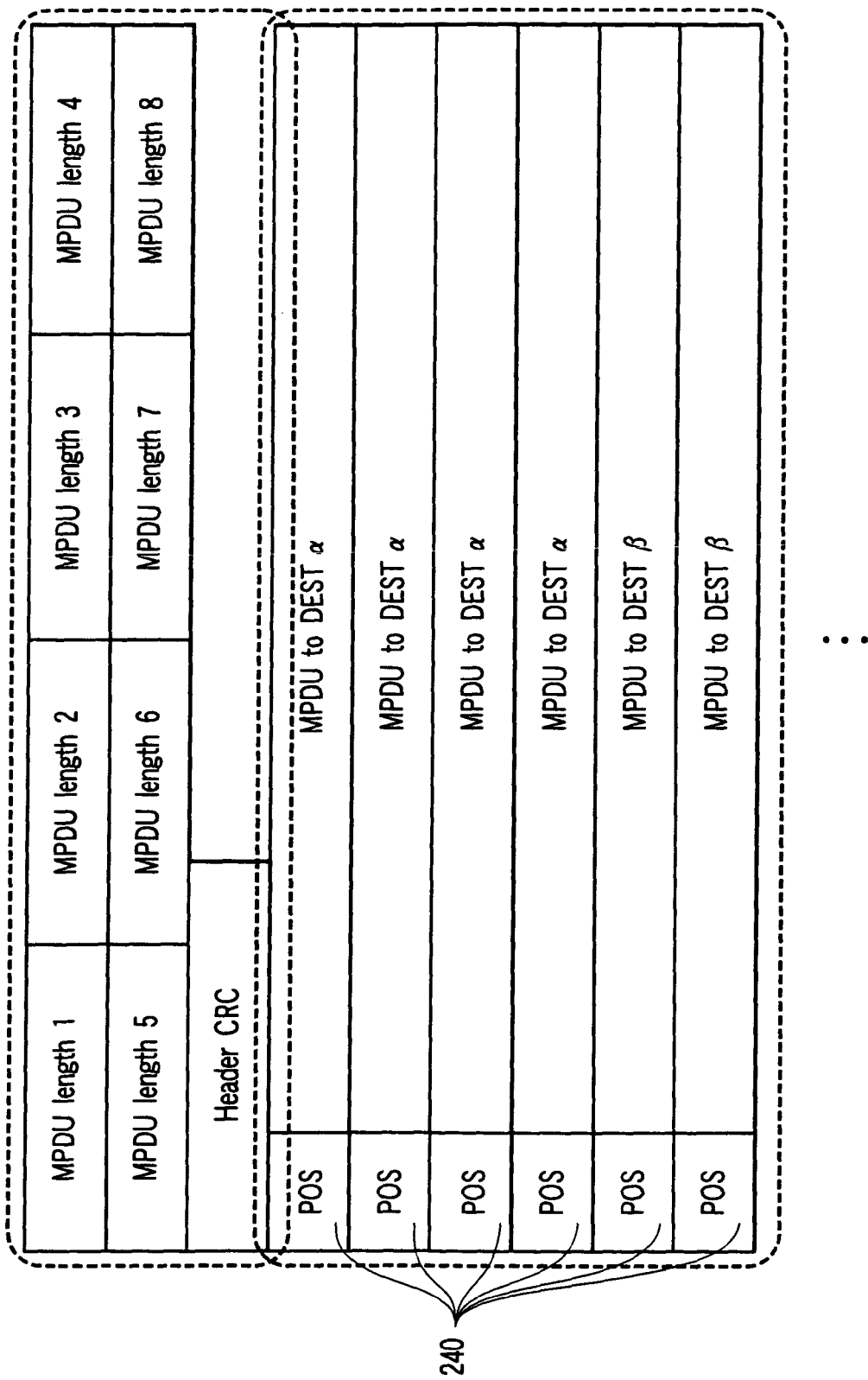
FIG. 24 is a diagram showing one example of a MAC super frame having a plurality of destinations according to a sixth embodiment of the present invention.

When the MAC frames for a plurality of destinations are aggregated into one physical frame, and transmitted, information (Multi Address Bitmap) indicating a division of each destination is considered to be added to a MAC super frame header. However, in the present embodiment, as shown in FIG. 24, an additional field 240 having a size of about one byte is added to the front part of each MAC Protocol Data Unit (MPDU) to replace the Multi Address Bitmap. Each of the added fields 240 describes information (referred to as POS(ition) field) indicating the ordinal number of the destination corresponding to the MPDU.

A Multi Address Bitmap indicates information on a position where a frame whose destination changes is included a compared with the destination of the previous MPDU in a physical frame, when constructing the physical frame including a plurality of media access control frames having different destinations. Specifically, the information comprises bits corresponding to aggregated MAC frames, and indicates divisions of a plurality of destinations.

An example of FIG. 24 shows a case where eight MPDUs are aggregated, but the number is not fixed. For example, in the example of FIG. 24, four MAC frames for a destination (DEST) "α" from the head are aggregated, and information "1" indicating a first destination is added to a POS field added to each front part. Information "2" indicating a second destination is described in a POS field of a front part of the subsequent MAC frame for destination β. Here, if values of all the POS fields are "1", it is meant that only MAC frame to one destination is aggregated in a MAC super frame.

When a MAC super frame header has an MPDU Length field, a length of each MAC frame is described in the field, and a data frame aggregated in a MAC super frame payload can be cut out based on the length. On the other hand, in the present example in which the POS field is added to the front part of the MPDU, a value of (POS field (one byte this time)+MPDU length) is described in the MPDU Length field. And in the present embodiment, the FCS field is calculated over all fields of the POS field and the MAC header and the Frame Body field. So, an error of the POS field to the MAC header or MAC frame body can be detected.

Figure 25:
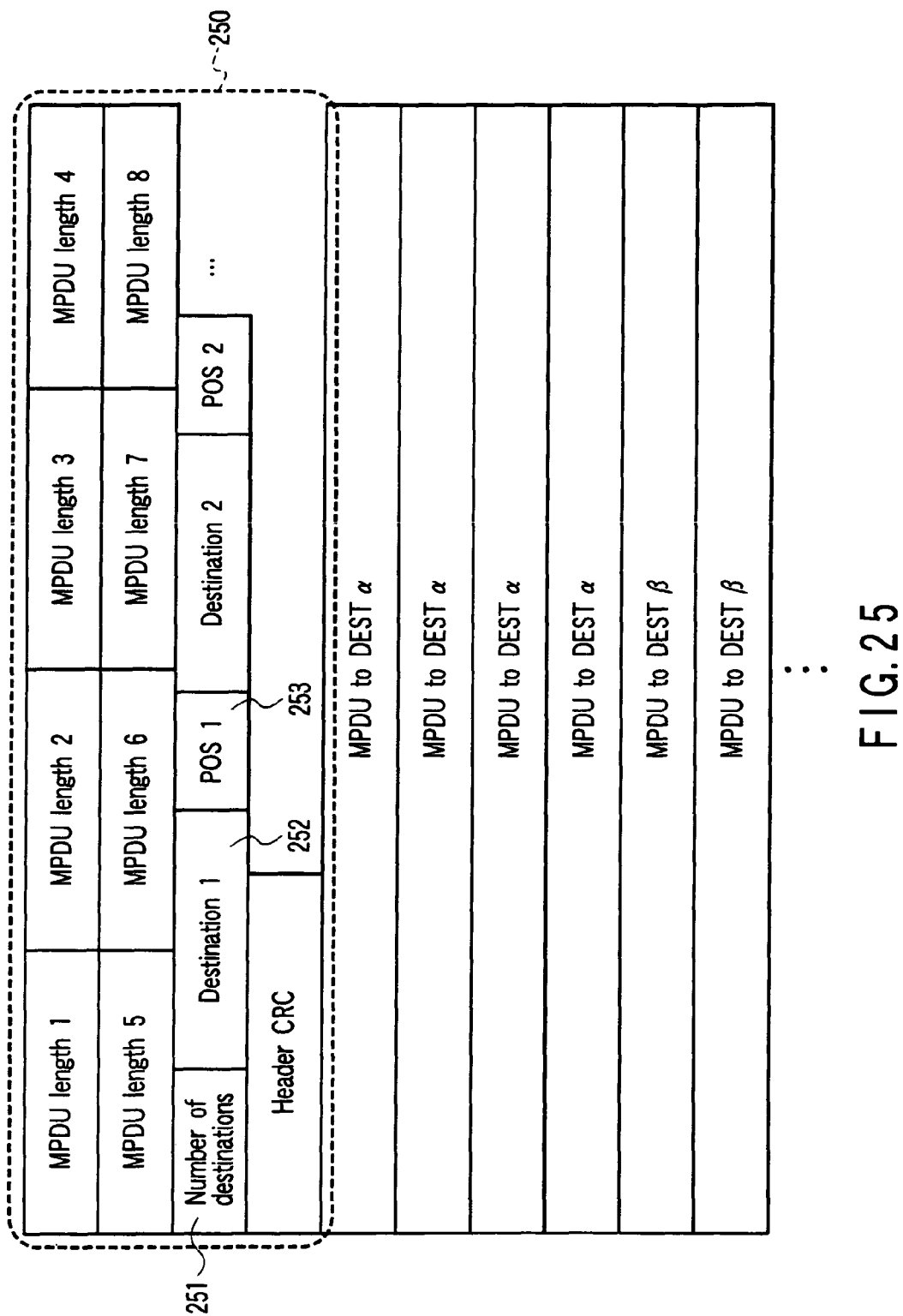
FIG. 25 is a diagram showing another example of a MAC super frame having a plurality of destinations according to the sixth embodiment of the present invention.

According to the Multi Address Bitmap in the MAC super frame header, presence of MPDUs to a plurality of destination can be judged, but a format can be set regardless of the Multi Address Bitmap. For example, as shown in FIG. 25, a Number of Destinations field 251 indicating the number of aggregated destinations is added into a MAC super frame header 250. When a value of this field 251 is 1, only one type of address exists in the MAC super frame. The subsequent Destination field 252 and POS field 253 indicate a destination address and the ordinal number of the destination. For example, in FIG. 25, it is assumed that MPDUs to destination "α", and MPDUs to destination "β" are aggregated. A value "2" is described in the Number of Destinations field 251 in order to indicate that there are two destinations. The Destination field 252 and the POS field 253 have fixed lengths six bytes (for MAC address), and one byte, respectively. In the example of FIG. 25, the MAC address of the destination α is described in a Destination 1 field, and information indicating the ordinal number of the destination α is described in a POS 1 field. The MAC address of the destination β is described in a Destination 2 field, and information indicating the ordinal number (second in the present example) of the destination β is described in a POS 2 field.

It is to be noted that in a case where it is assumed that the Destination field 252 in the MAC super frame header 250 is described in accordance with the order of aggregated MAC frames, the POS field 253 is not required.

Seventh Embodiment

A communication apparatus according to a seventh embodiment includes a channel use duration for a plurality of destinations in a MAC super frame header, when aggregating MAC frames to a plurality of destinations into one physical frame to transmit the frame.

In this embodiment, when simulcasting the MAC super frame for multiple destinations, acknowledgement frame from each destination does not have to be equal to Duration value within the MAC header.

Figure 26:
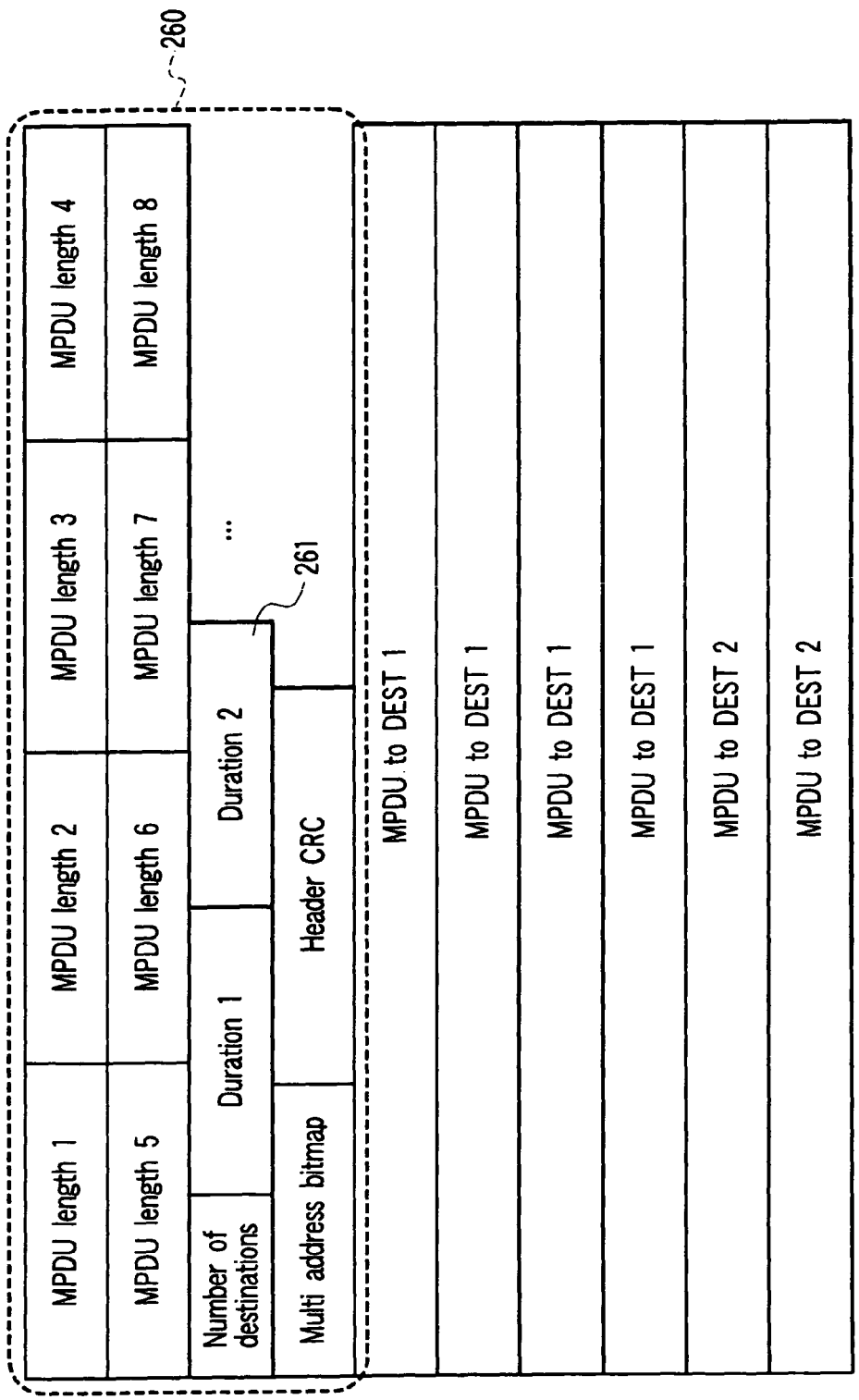
FIG. 26 is a diagram showing one example of a MAC super frame indicating a Duration for each destination according to a seventh embodiment of the present invention.
Figure 27:
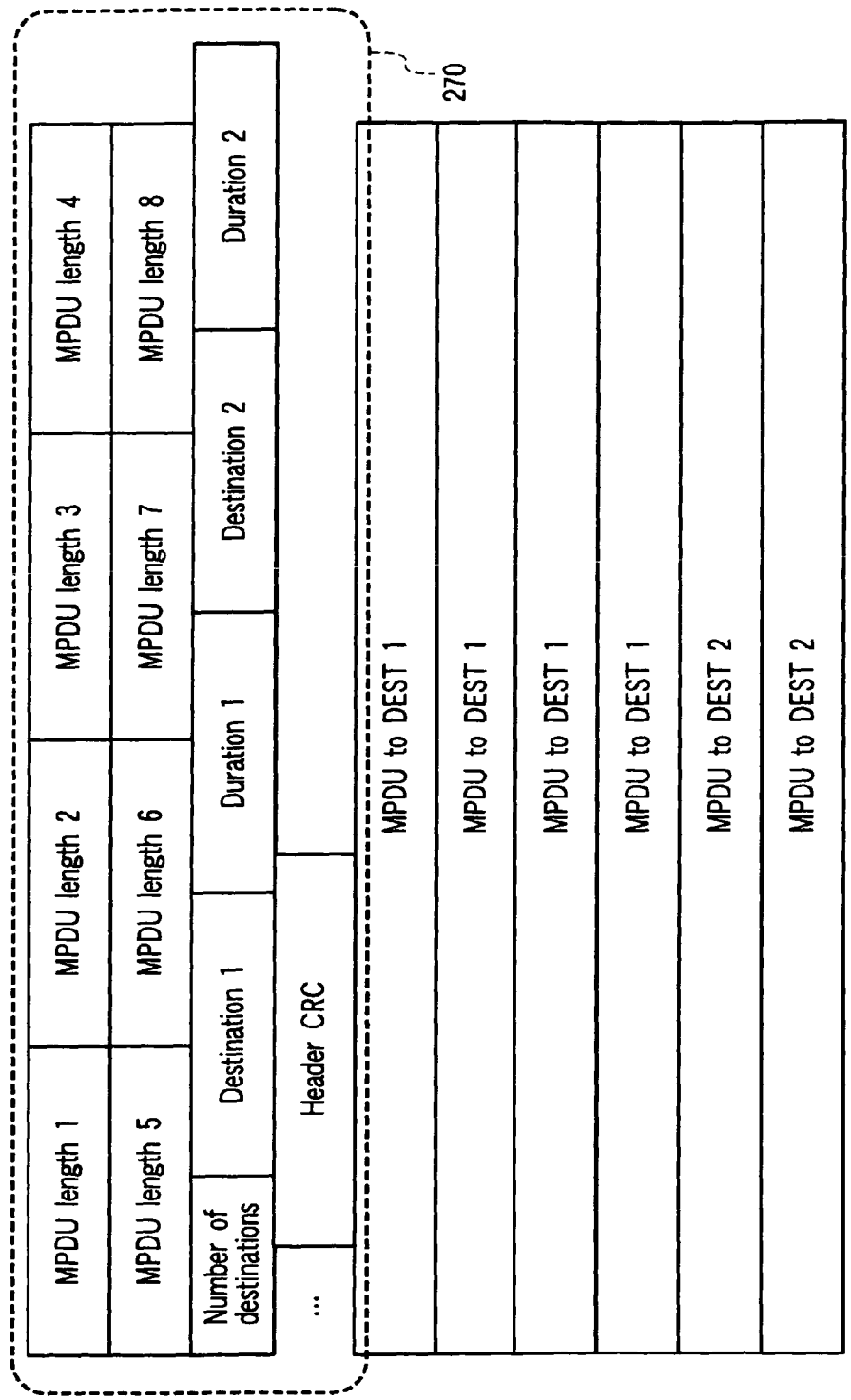
FIG. 27 is a diagram showing a modification of a frame of FIG. 26.

The seventh embodiment relates to a case where each ACK has a variable length. As shown in FIG. 26, a channel use Duration (Duration 1, Duration 2) 261 for each destination is described in a MAC super frame header 260. Usually in standard of IEEE802.11, (short inter frame space (SIFS) time+ACK transfer time) is described in a Duration field of a unicast data MAC frame. The duration value calculation for the data frame is based on the rules that determine the data rate at which the control frames in the frame exchange sequence are transmitted. It is to be noted that, as shown in FIG. 27, a MAC super frame header 270 may be constituted. In this case, any Multi Address Bitmap is not included, and the channel use Duration is described together with the destination. When it is assumed that MPDU is aggregated for each destination in a MAC super frame, a Destination field in the MAC-super frame header 270 is not especially required.

A size of a Partial Ack response to the MAC super frame increases in proportion to the number of aggregated MPDUs. For example, when the number of MPDUs aggregated in the MAC super frame is eight, the Partial Ack Bitmap of the Partial Ack response has a size of one byte. However, when the number of aggregated MPDUs is nine or more (within 16), the Partial Ack Bitmap requires a size of two bytes. That is, a MAC super frame transmitting terminal can estimate each transfer time of a time difference ACK from the destination by information indicating the number of MPDUs to be aggregated and transmitted for each destination.

Figure 28:
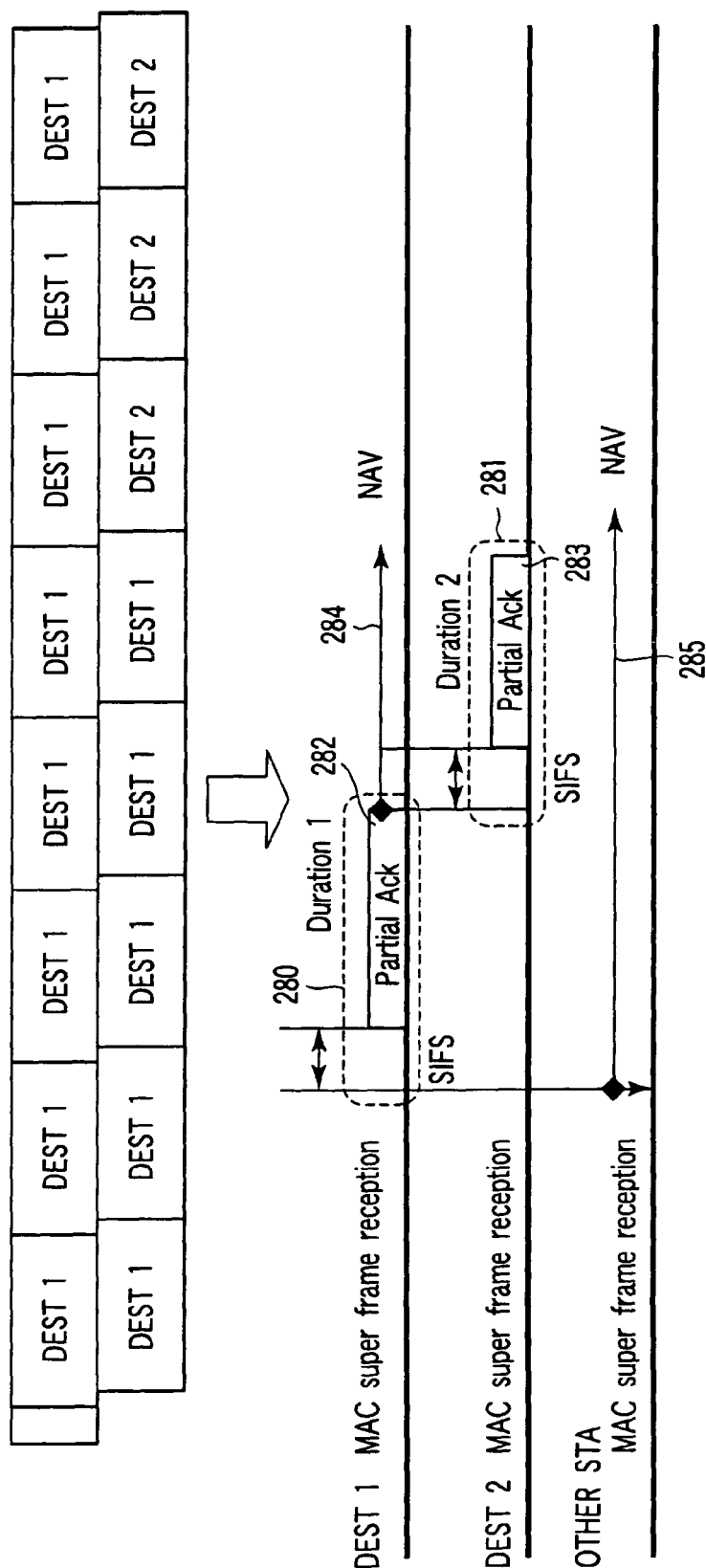
FIG. 28 is an explanatory view showing that different Durations are designated for a plurality of destinations according to the seventh embodiment of the present invention.

For example, as shown in FIG. 28, a case where 16 MPDUs are aggregated and transmitted to two destination DEST1 and DEST2 is considered (13 MPDUs to DEST1, three MPDUs to DEST2). Since a length of a Partial Ack response generated by each destination differs, corresponding Duration values 280, 281 are determined. In a case where 13 MPDUs are aggregated and transmitted to DEST1, a Partial Ack Bitmap has a size of two bytes. When three MPDUs are aggregated and transmitted to DEST2, the size is one byte.

In the example of FIG. 28, after receiving simulcast MAC super frame, a terminal of DEST1 returns a Partial Ack 282 after SIFS interval. An address of a terminal of DEST2 exists second. The terminal transmits its own Partial Ack 283 after waiting for a value of Duration 1 (until transmission of the Partial Ack by DEST1 ends)+SIFS time. After finishing transmitting the Partial Ack 282, DEST1 sets a network allocation vector (NAV) 284 corresponding to a total of remaining Duration values. A terminal whose destination does not exist in the MAC super frame sets NAV for a total value of the Duration field of the MAC super frame header. In the example of FIG. 28, terminals (OTHER STA) other than DEST1, DEST2 set a NAV 285 corresponding to a total (value obtained adding values of Duration 1 and Duration 2) of values of Durations of the MAC super frame header.

Figure 29:
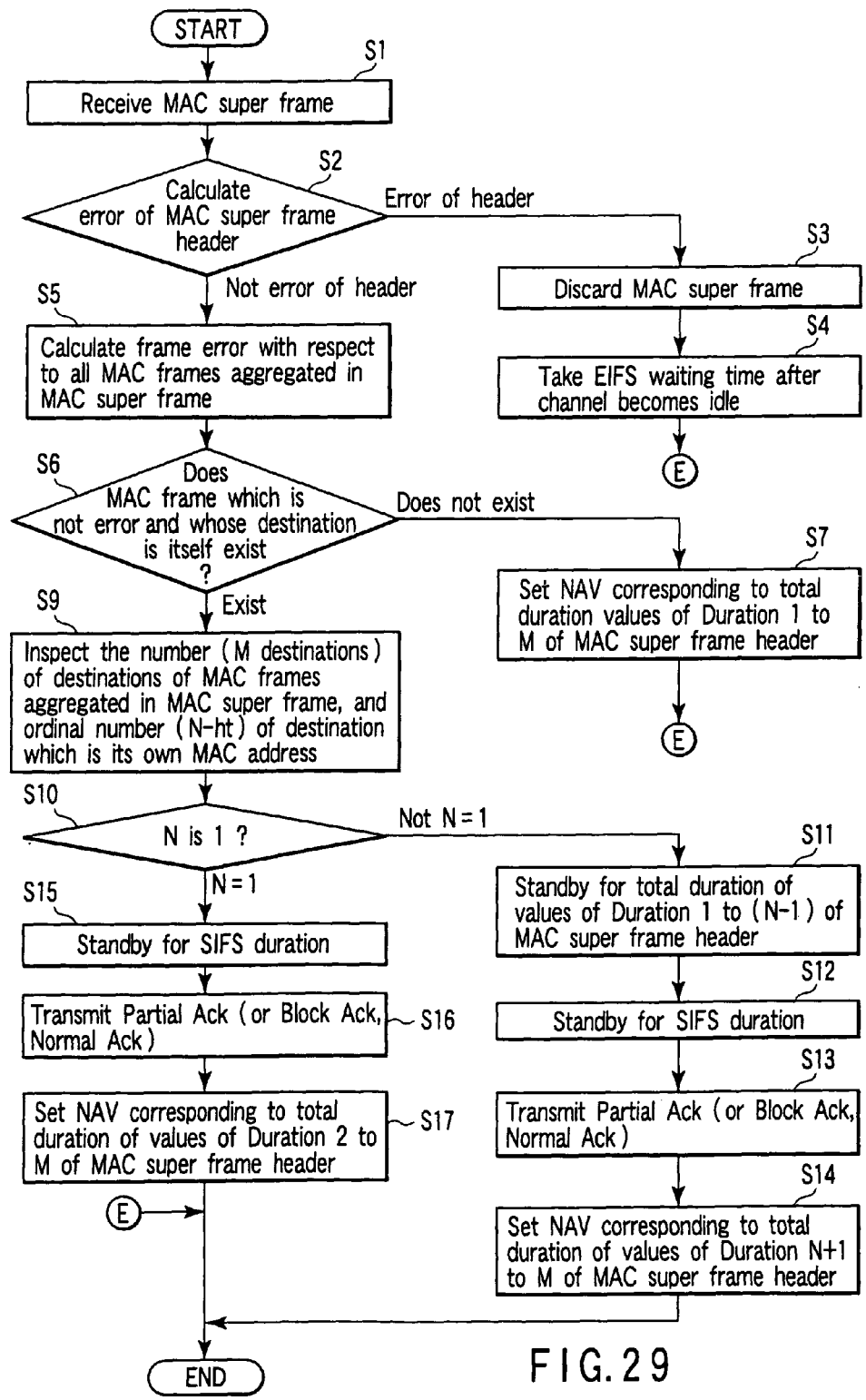
FIG. 29 is a flowchart showing an operation of a receiving terminal according to the seventh embodiment of the present invention.

FIG. 29 is a flowchart showing an operation of a receiving terminal. After receiving a MAC super frame having a plurality of destinations (step S1), a receiving terminal calculates an error with respect to the header of the MAC super frame (step S2). When there is an error as a result of the error calculation, the MAC super frame is discarded (step S3). After a channel becomes idle, a duration carrier sense of an extended inter frame space (EIFS) is performed (step S4).

When the header is not wrong, an error is checked with respect to each MAC frame (step S5). Next, the number (M) of destinations of MAC frames aggregated in the MAC super frame, and the ordinal number (N-th) of the MAC address of its own terminal that exists are inspected (step S9).

For example, a MAC frame to a receiving terminal corresponding to DEST1 is first aggregated (N=1), and the receiving terminal transmits a Partial Ack frame (or Block Ack defined in IEEE802.11e) (step S16) after a SIFS interval (step S15) in a sequence similar to that of usual frame aggregation. Thereafter, the terminal sets NAV corresponding to a total duration of values of Duration 2 to M, and stops transmission of data frames, while the other terminal (DEST2, OTHER STA) returns the Partial Ack with a time difference (step S17).

After elapse of a SIFS interval (step S12) after DEST1 transmits Partial Ack (step S11), secondly aggregated DEST2 transmits the Partial Ack (step S13). Moreover, after its own terminal transmits the Partial Ack, the NAV corresponding to the total duration of the values of Duration N+1 to M is set (step S14).

In a case where the MAC frame whose terminal is a destination does not exist in the MAC super frame, the NAV corresponding to the total duration of the values of Duration 1 to M is set (step S7).

Figure 30B:
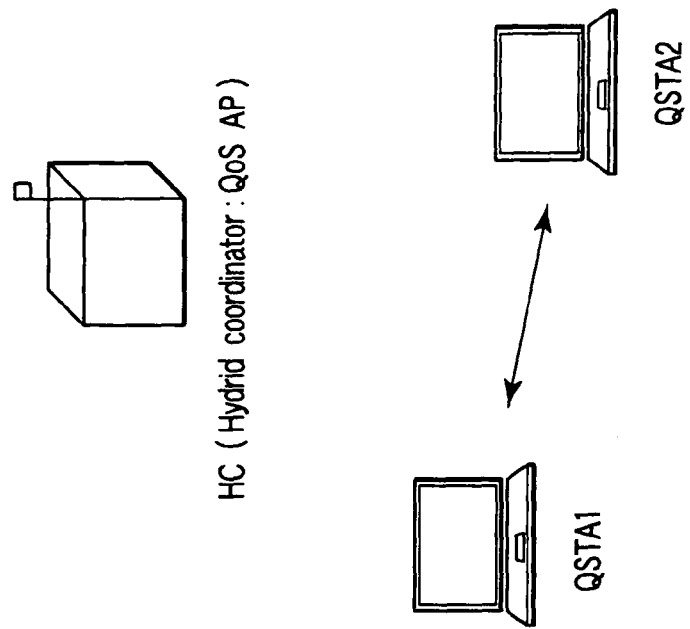
FIGS. 30A and 30B are diagrams showing a constitution example of a wireless communication system to which the present invention is applicable.
Figure 30A:
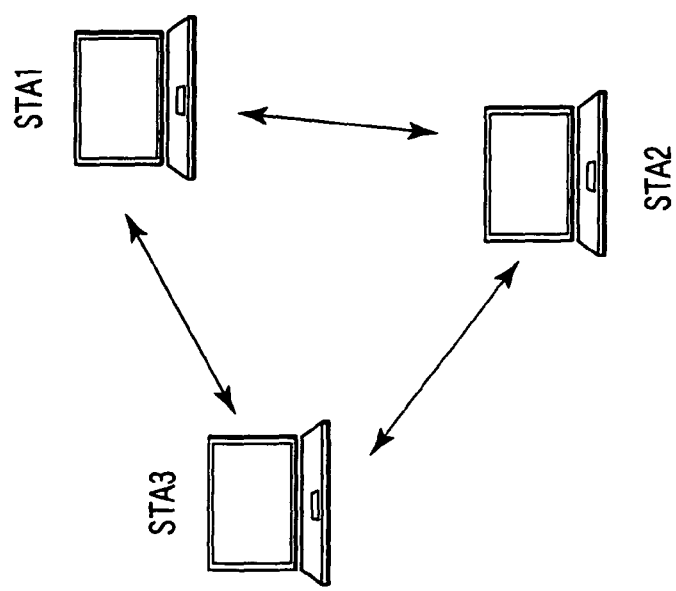
Figure 31B:
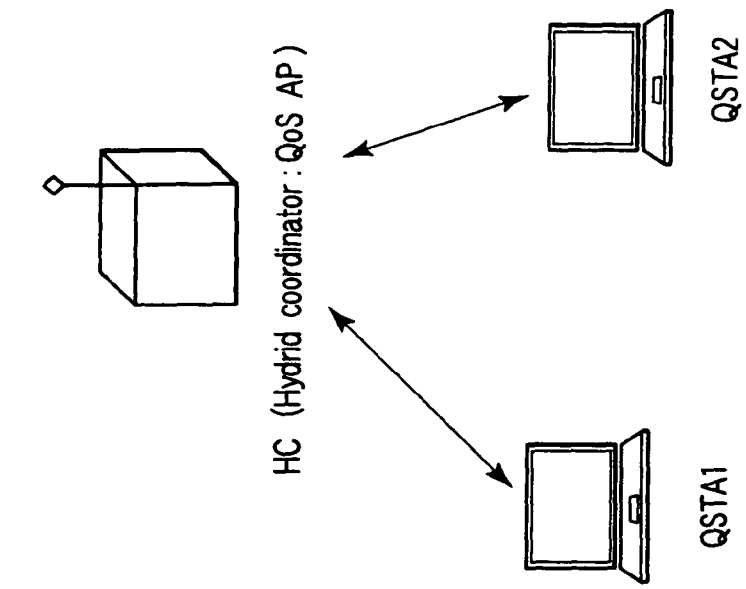
FIGS. 31A and 31B are diagrams showing another constitution example of the wireless communication system to which the present invention is applicable.
Figure 31A:
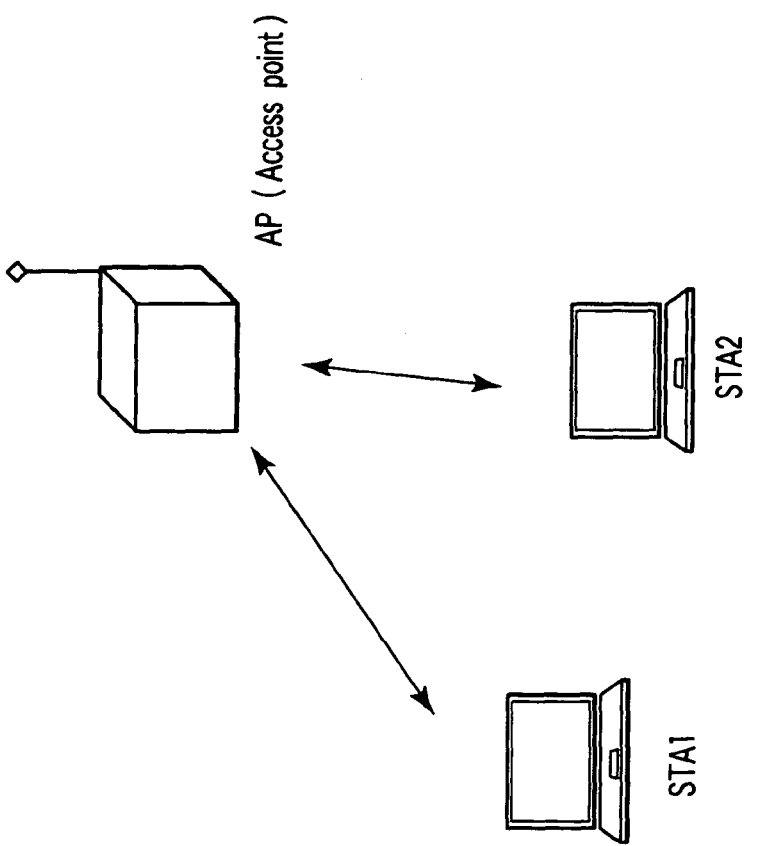

FIGS. 30, 31 show constitution examples of a wireless communication system to which the present invention is applicable. A communication system in which a plurality of MAC frames are aggregated in one physical frame is applicable to downlink and uplink transmission between AP (or hybrid coordinator: HC of IEEE802.11e) and STA, ad hoc communication between STAs by independent basic service set (IBSS), and communication between QSTAs by direct link set-up (DLS) of IEEE802.11e.

Eighth Embodiment

An eighth embodiment relates to Block Ack in a case where simulcast is performed. A communication apparatus according to the eighth embodiment aggregates MAC frames with Ack Policy "Block Acknowledgement" to a plurality of destinations into one physical frame to transmit the frame, transmits a Block Ack Request to each destination, and receives Block Ack. Another communication apparatus according to the present embodiment aggregates MAC frames with Ack Policy "Block Acknowledgement" to a plurality of destinations, and Block Ack Request frames into one physical frame to transmit the frame, and receives Block Ack from the plurality of destinations with a time difference.

Figure 32:
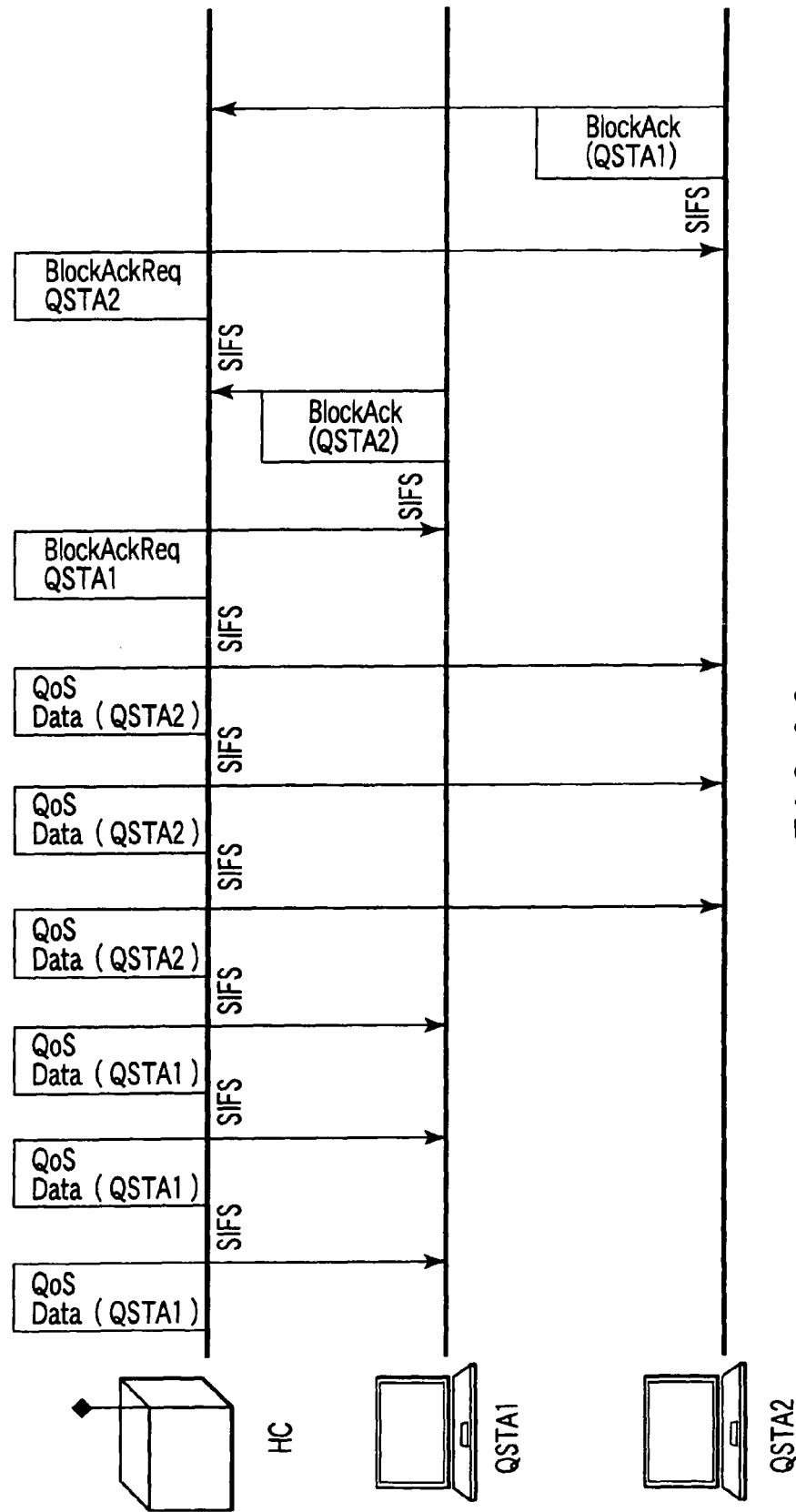
FIG. 32 is a diagram showing a sequence of a QoS Data frame with Ack Policy "Block Acknowledgement" in IEEE802.11e.

As shown in FIG. 32, in IEEE802.11e, QoS Data frames with Ack Policy "Block Acknowledgement" are transmitted at a SIFS interval.

Figure 33:
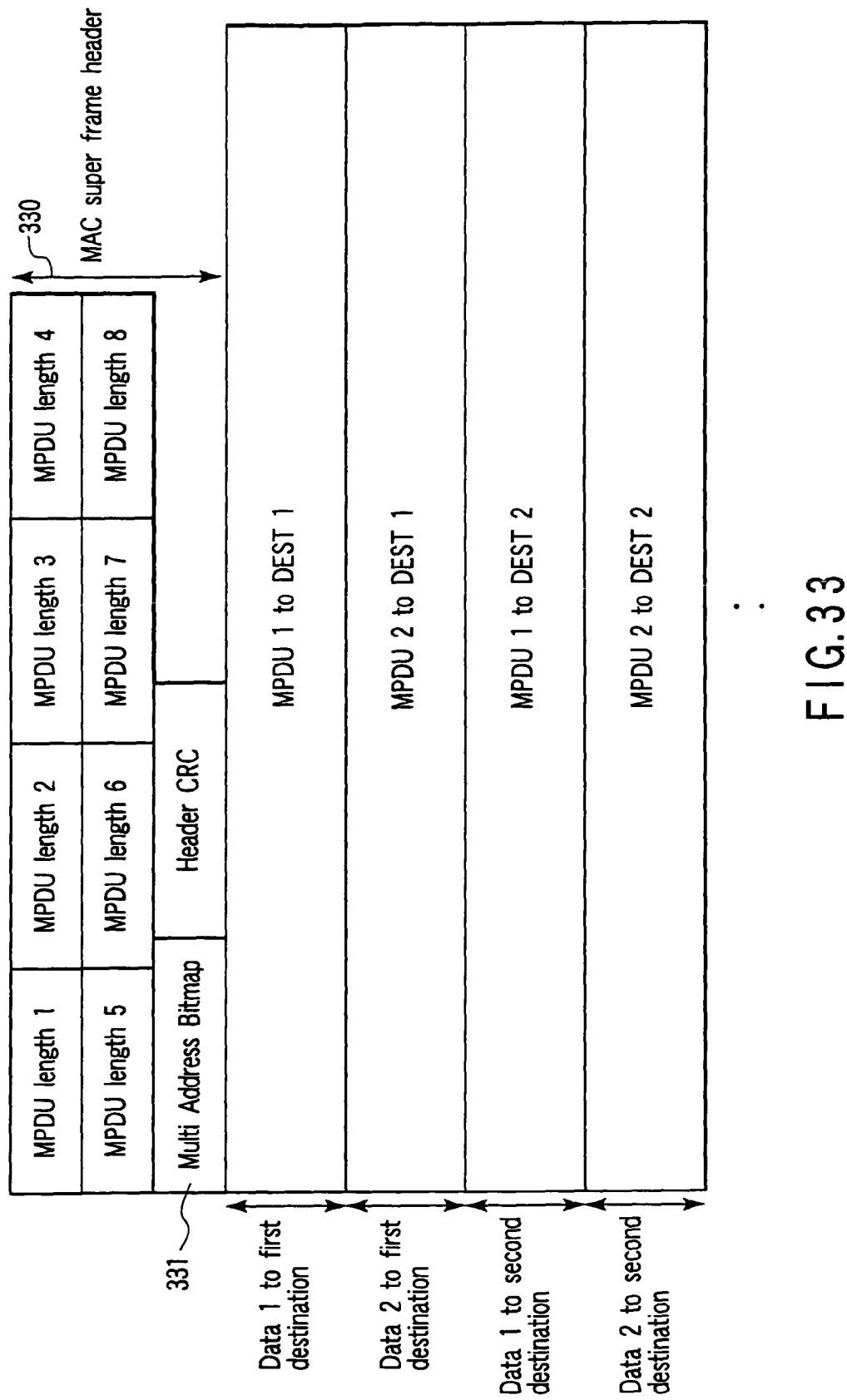
FIG. 33 is a diagram showing an aggregation example of a data frame with Ack Policy "Block Acknowledgement" for a plurality of destinations according to an eighth embodiment of the present invention.

In the present embodiment, QoS Data frames to a plurality of destinations are aggregated into one physical frame, and accordingly transmission efficiency is enhanced. As shown in FIG. 33, information indicating presence of a plurality of destinations is added to a MAC super frame header, and QoS Data frames are divided for each destination, and aggregated in a payload portion. At this time, a MAC super frame may be constituted as shown in FIGS. 24, 25 described above. There is not any special restriction as long as presence of a plurality of destinations, and relative positions can be judged on a MAC super frame receiving terminal side. In an example of FIG. 33, a Multi Address Bitmap 331 is used.

Figure 34:
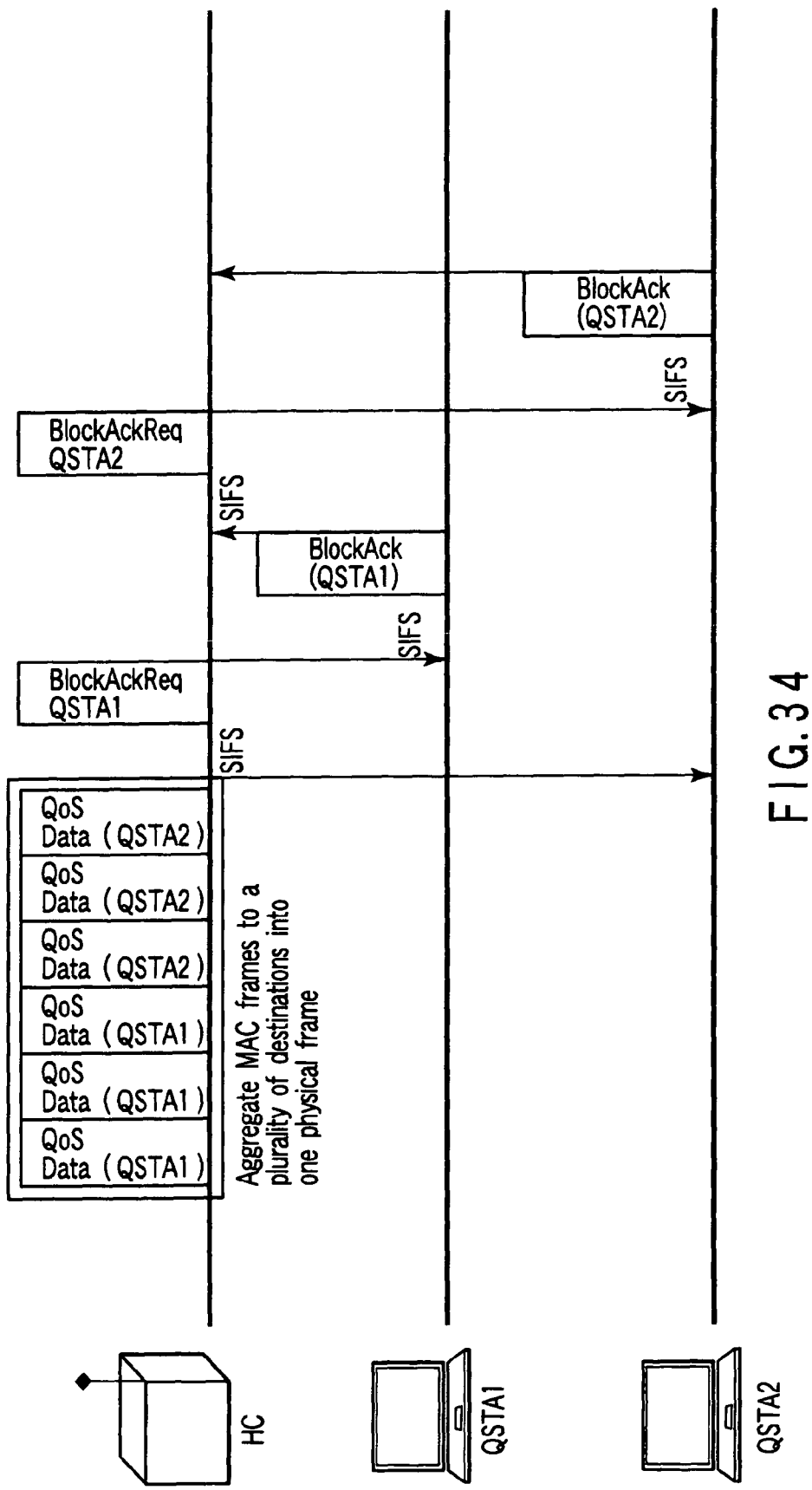
FIG. 34 is a diagram showing a sequence of a data frame with Ack Policy "Block Acknowledgement" for a plurality of aggregated destinations according to the eighth embodiment of the present invention.

Moreover, as shown in FIG. 34, Block Ack target QoS Data frames to a plurality of destinations are aggregated into one physical frame, and transmitted as a MAC super frame 340, and accordingly transmission efficiency can be enhanced. FIG. 34 shows that Block Acks 343, 344 are transmitted from the respective destinations (QSTA1, QSTA2) in response to Block Ack Requests 341, 342 following the MAC super frame 340.

Figure 35:
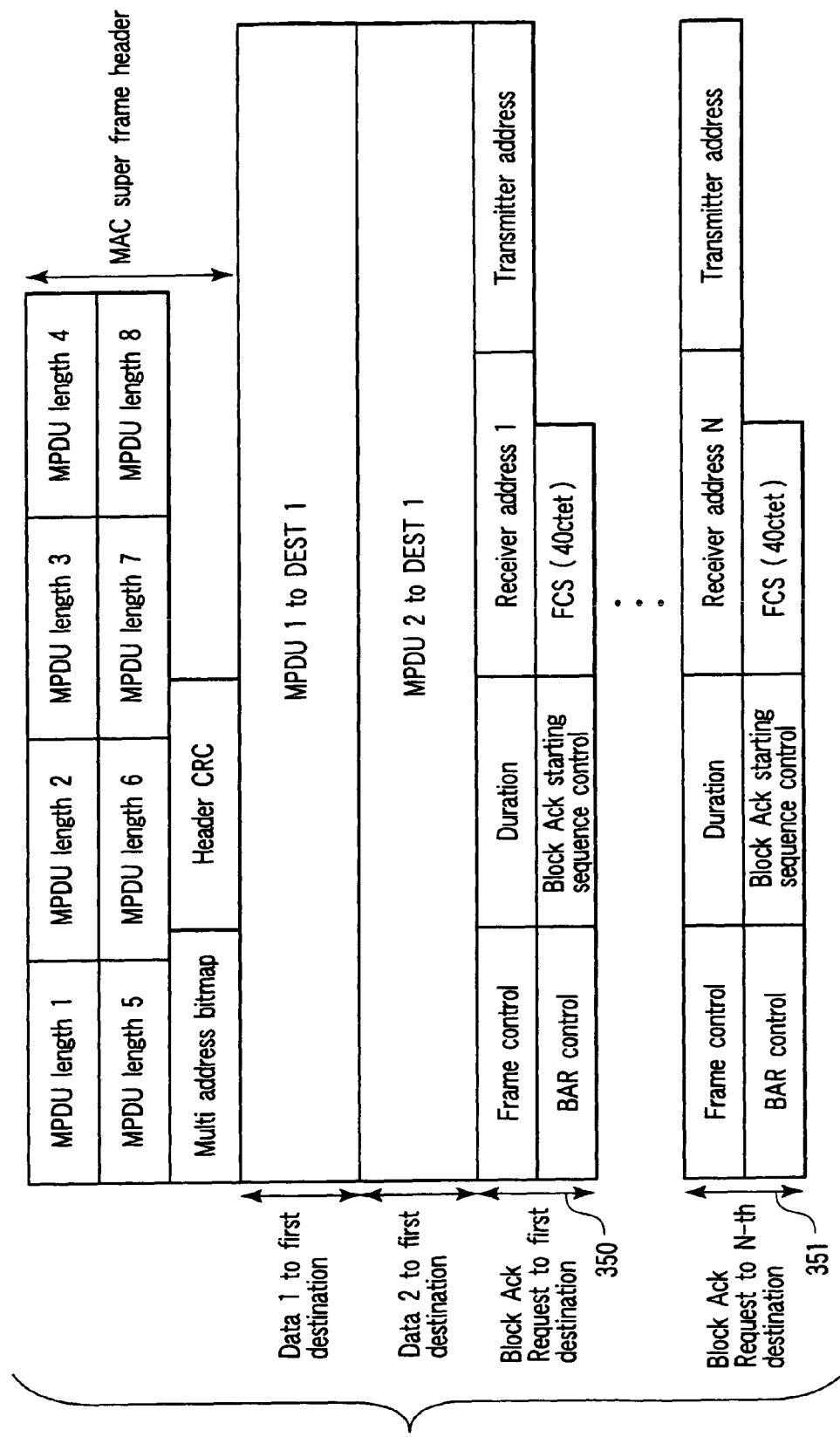
FIG. 35 is a diagram showing an aggregation example of a Data frame for a plurality of destinations, and Block Ack Request frame according to the eighth embodiment of the present invention.
Figure 36:
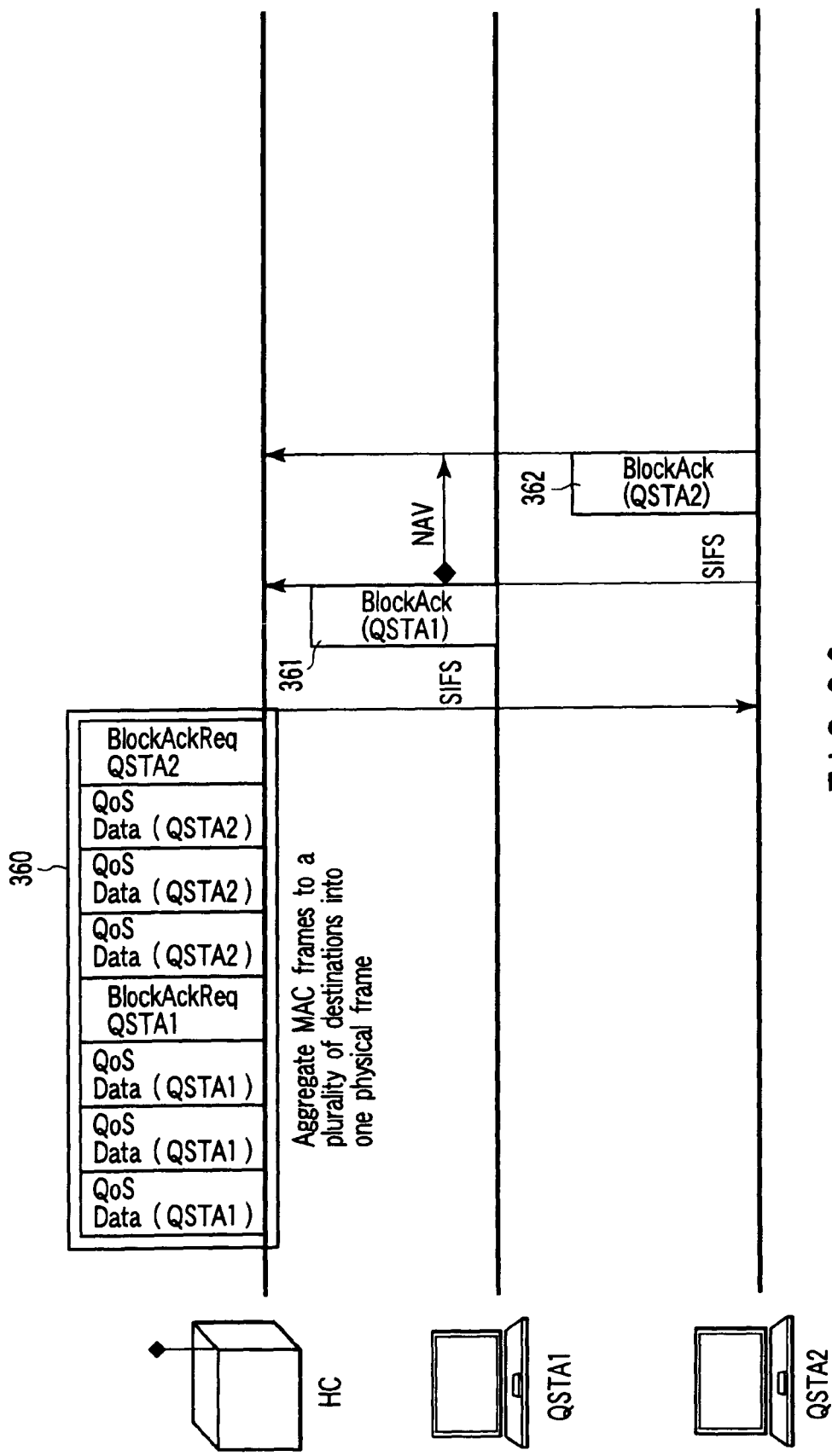
FIG. 36 is a diagram showing a sequence example of data for a plurality of aggregated destinations, and Block Ack Request frame according to the eighth embodiment of the present invention.

Furthermore, as shown in FIG. 35, it is preferable to aggregate not only QoS Data frames but also Block Ack Requests 350, 351. In this case, the frames and requests are divided for each destination, and aggregated, and a frame size of each frame (QoS Data, Block Ack Request) is described. Accordingly, the MPDUs are appropriately cut out, and the Block Ack can be transmitted with a time difference. In an example of FIG. 36, a MAC super frame 360 having three Data frames to QSTA1, Block Ack Request to QSTA1, three Data frames to QSTA2, and Block Ack Request to QSTA2 is generated, and simulcast as one physical frame to QSTA1, 2 from HC. Block Acks 361, 362 from the respective QSTAs are received with a time difference, and accordingly transmission efficiency of a whole system is enhanced.

Ninth Embodiment

A communication apparatus according to a ninth embodiment is capable of transmitting an ACK frame again within a NAV duration set to be slightly longer beforehand, when a plurality of MAC frames to a certain destination are aggregated into one physical frame and transmitted, but when a terminal of the destination cannot transmit ACK after a SIFS interval.

When a plurality of MAC frames to a certain destination are aggregated into one physical frame and transmitted, another communication apparatus according to the present embodiment is capable of aggregating MAC frames to another destination into one physical frame to transmit the frame, and transmitting the ACK frame with a time difference, when a terminal of the destination cannot transmit ACK after a SIFS interval.

Furthermore, when a plurality of MAC frames to a plurality of destinations are aggregated into one physical frame and transmitted, another communication apparatus according to the present embodiment transmits an ACK frame in order from a first destination within a NAV duration set to be longer beforehand, when any ACK cannot be transmitted after a SIFS interval after a first aggregated destination receives a MAC super frame.

In the ninth embodiment, in a case where a turbo code requiring much time in a decoding process, or a low density parity check (LDPC) code is adopted in the communication apparatus, a problem that a process cannot be performed in time during the short inter frame space (SIFS) determined in IEEE802.11 is solved. After a plurality of MAC frames are aggregated into one physical frame, and transmitted to a certain destination, the destination terminal has to return ACK after the SIFS interval, but any ACK cannot be transmitted for a decoding process in some case.

Figure 37:
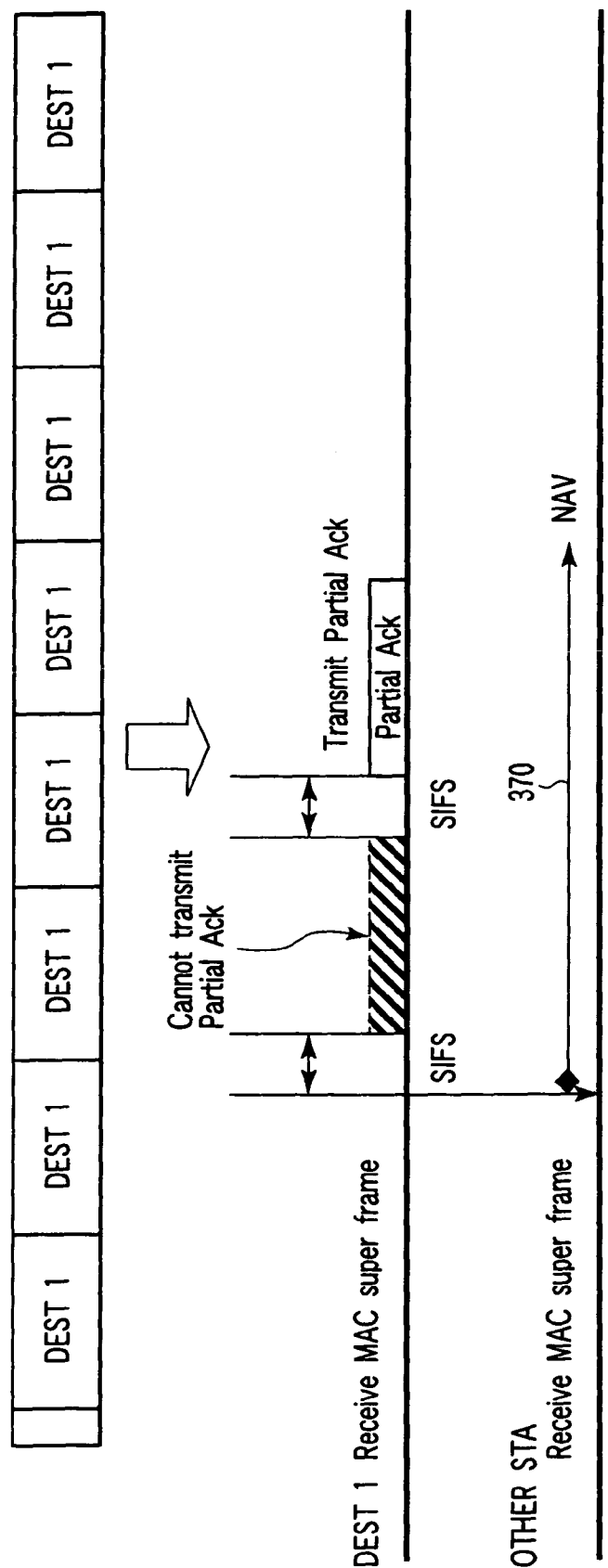
FIG. 37 is an explanatory view of a retransmission of ACK according to a ninth embodiment of the present invention.

In this case, as shown in FIG. 37, a value of a duration to be set with respect to a terminal other than that of the destination is set to be slightly larger, and accordingly a chance to transmit an ACK frame again is imparted to the destination terminal. A terminal other than that of the destination sets a network allocation vector (NAV) 370 of a determined duration, and stops transmission. Therefore, even when the destination terminal transmits the ACK frame, any collision does not occur. In a case where it is supposed that a certain destination performs a coding process generally requiring a long process time, and cannot return ACK after the SIFS interval, this effect is notified to another terminal in a basic service set (BSS) beforehand. In an example of FIG. 37, MAC frames are aggregated only to one destination. A receiving terminal other than the destination sets, for example, duration NAV is twice as the sum of a SIFS interval and ACK transfer time. Here, a numeric value of twice is not especially fixed, and a period of time of the duration may be notified between wireless terminals. A MAC super frame transmitting terminal side may describe an appropriate value in a Duration field of the MPDU.

Figure 38:
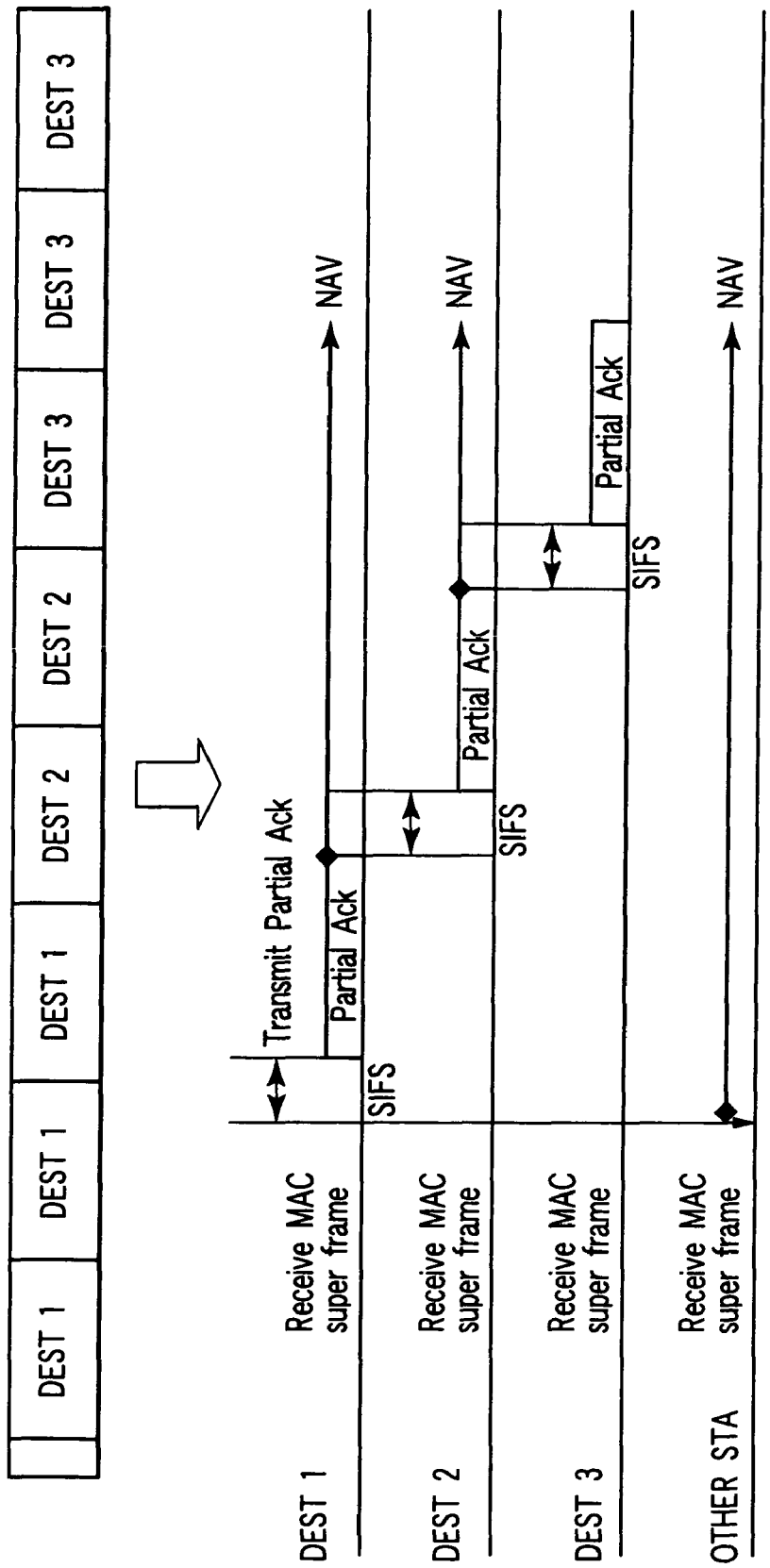
FIG. 38 is a diagram showing an aggregate example of a plurality of destinations according to the ninth embodiment of the present invention.

In a state of FIG. 37 (i.e., state in which only MAC frames to one type of destination are aggregated in the MAC super frame), in general, a long decoding time is considered to be required. In this case, when frames to a plurality of destinations (e.g., frames addressed to DEST2, DEST3) are aggregated as shown in FIG. 38, there is an increasing possibility that a first destination terminal can transmit the ACK after the SIFS interval. This is based on an assumption that a coding process is performed by a symbol unit, and in general, ACK can be transmitted in a less process time as long as a time for decoding the frame (for three MPDUs in the example of FIG. 38) to a first destination is secured in a whole MAC super frame.

Figure 40:
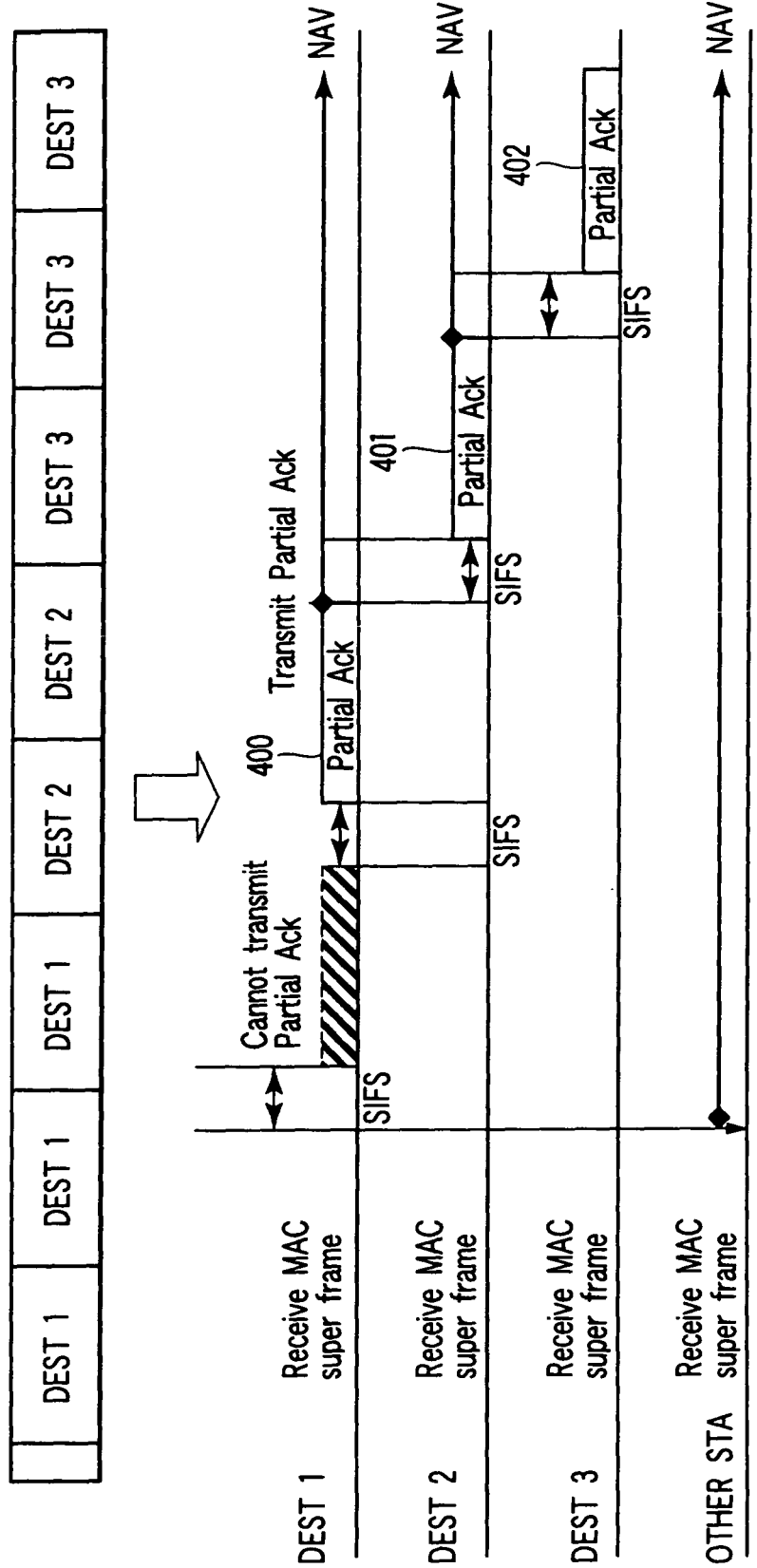
FIG. 40 is a diagram showing another example of ACK retransmission at the time of aggregation of a plurality of destinations according to the ninth embodiment of the present invention.

Here, a case where a first destination cannot transmit any ACK after the SIFS interval, when the MAC frames to a plurality of destinations are aggregated into one physical frame and transmitted is considered. In this situation, the terminal needs to notify another terminal of information indicating that any ACK cannot be transmitted in the SIFS interval beforehand. As shown in FIG. 39, terminals DEST2, DEST3, OTHER STA other than the first aggregated terminal set NAVs 390, 391, 392 more than usual. The NAV set to be slightly larger corresponds to (SIFS+ACK transfer time of first destination). In the example of FIG. 39, since another terminal extends many NAVs beforehand, the first destination is capable of transmitting ACK 393 again in a case where any ACK cannot be returned after the SIFS interval after the MAC super frame has been received. It is to be noted that in the example of FIG. 39, the first destination transmits the ACK after all the other terminals finish transmitting the ACK. However, as shown in FIG. 40, ACKs 400, 401, 402 may be transmitted in order from the first destination.

Tenth Embodiment

A tenth embodiment relates to designation of a transmission timing of ACK. A communication apparatus according to the tenth embodiment aggregates MAC frames to a plurality of destinations into one physical frame to transmit the frame, and includes information designating time to transmit the ACK in a MAC super frame header with respect to each destination terminal.

Instead of calculation of the timing to transmit the ACK on a receiving terminal side of the MAC super frame, the present embodiment is constituted to designate the time to transmit the ACK beforehand on a MAC super frame transmitting side. A frame format in a case where the transmitting side designates the timing to transmit the ACK is shown in FIGS. 41 to 44.

Figure 41:
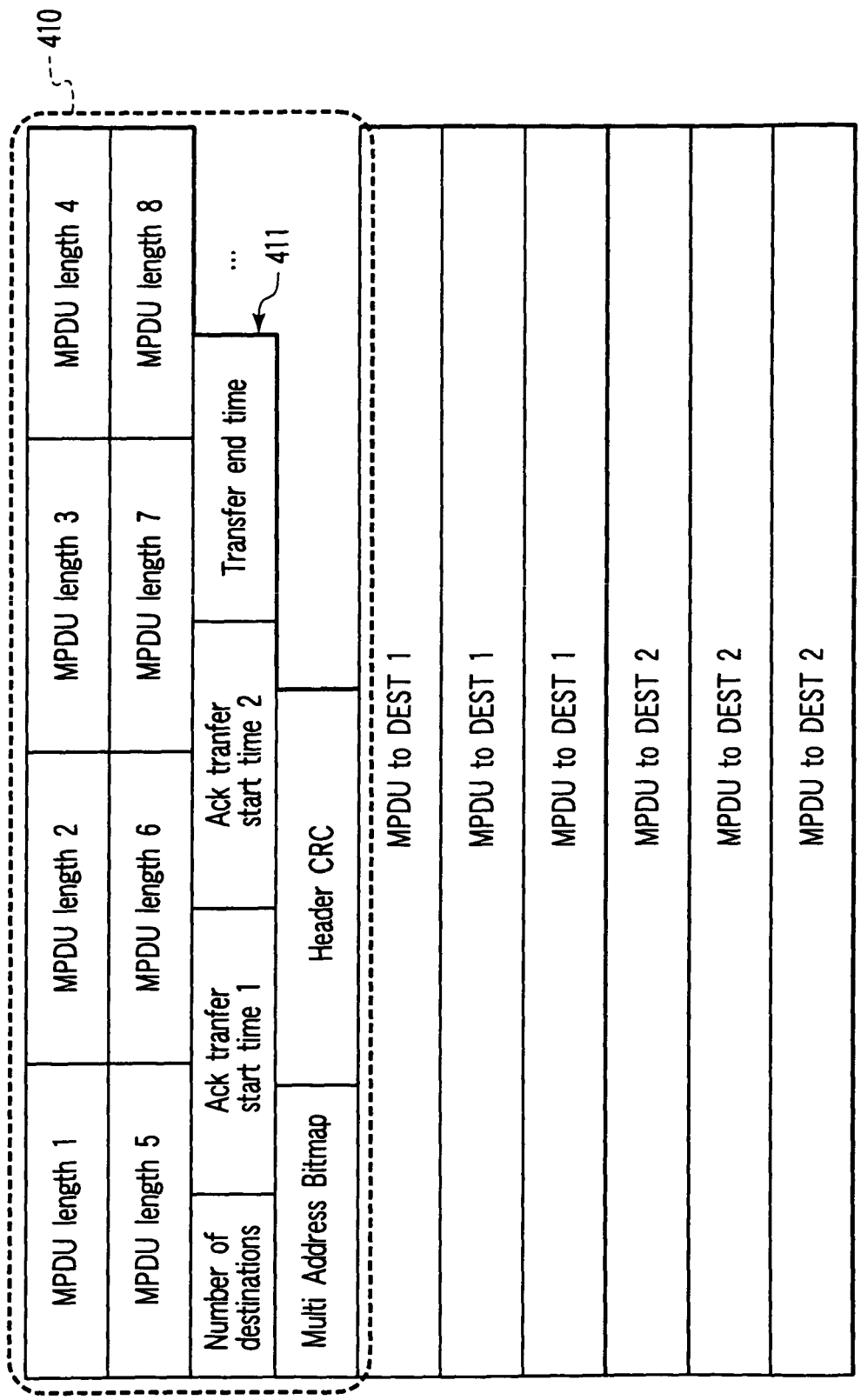
FIG. 41 is a diagram showing a frame format example in a case where a time to transmit ACK is designated on a transmitting side according to a tenth embodiment of the present invention.
Figure 42:
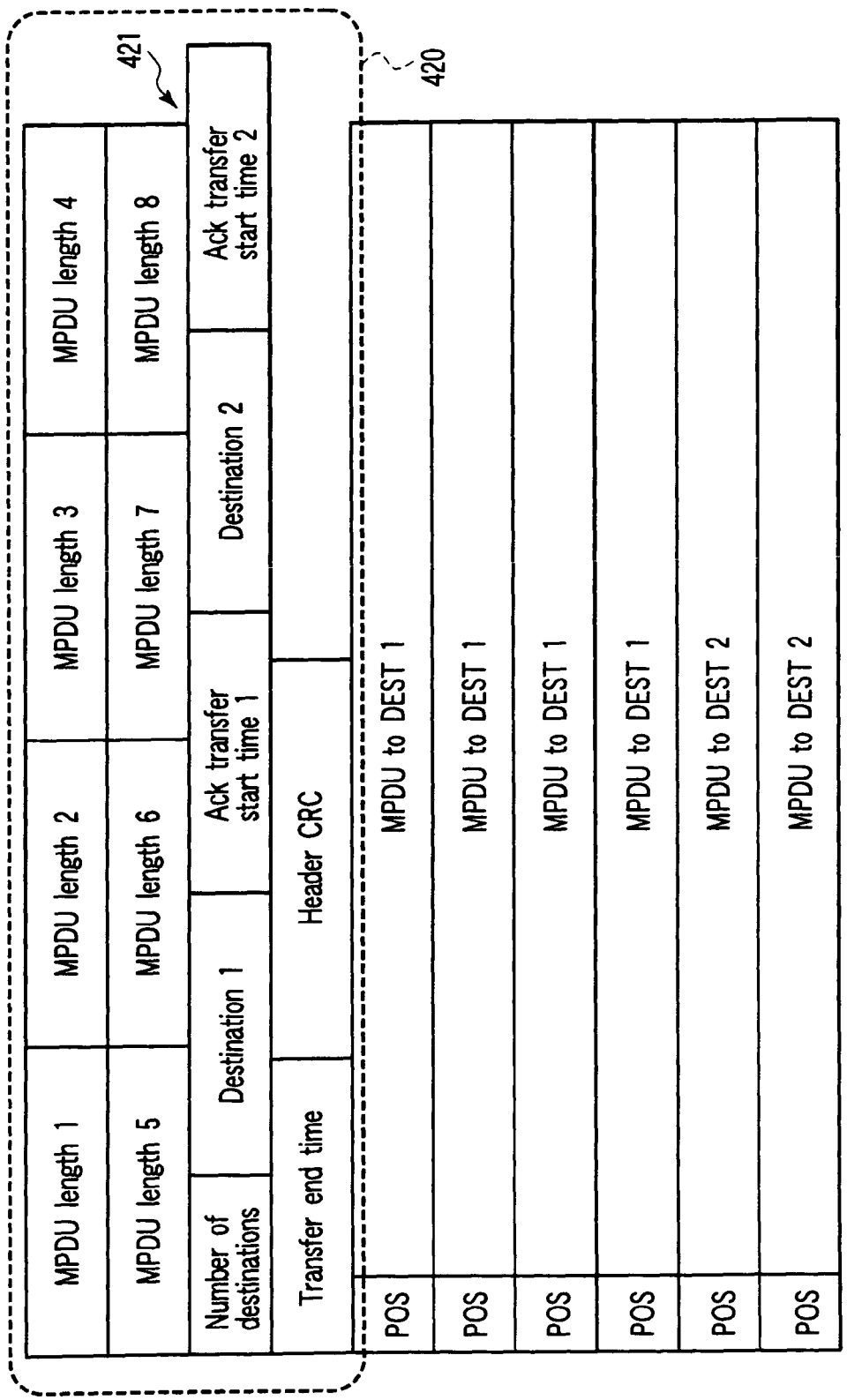
FIG. 42 is a diagram showing one example of the frame format in a case where the time to transmit ACK is designated on the transmitting side according to the tenth embodiment of the present invention.

FIGS. 41 and 42 show examples in which time designation information of the ACK transmission timing is included in MAC super frame headers 410, 420. An ACK transfer start time indicates a timing at which each destination should transmit ACK. Specifically, after receiving a MAC super frame, ACK is transmitted after SIFS+N (μ seconds), and a value of N is described in the ACK transfer start time. In this case, as to ACK Transfer Start Time 1 to a head destination, "0" is designated. Alternatively, a designation method may be performed in which ACK is returned after N μ seconds after a MAC super frame has been received. An ACK transmission timing of and after a second destination is calculated on a transmission side using information indicating a size of Partial Ack, a physical transmission rate, and the ordinal number of the destination. Transfer end time indicates a scheduled time to end transmission of all ACKs. This is information indicating a time, by a μ second unit, required from when the MAC super frame is received until all ACKs are transmitted. It is to be noted that a Destination field of the MAC super frame header 420 of FIG. 41 is not required, if MPDUs are aggregated in order of destinations, but the field is information necessary for another case (a case where the order of aggregated MPDUs is inconsistent).

Figure 43:
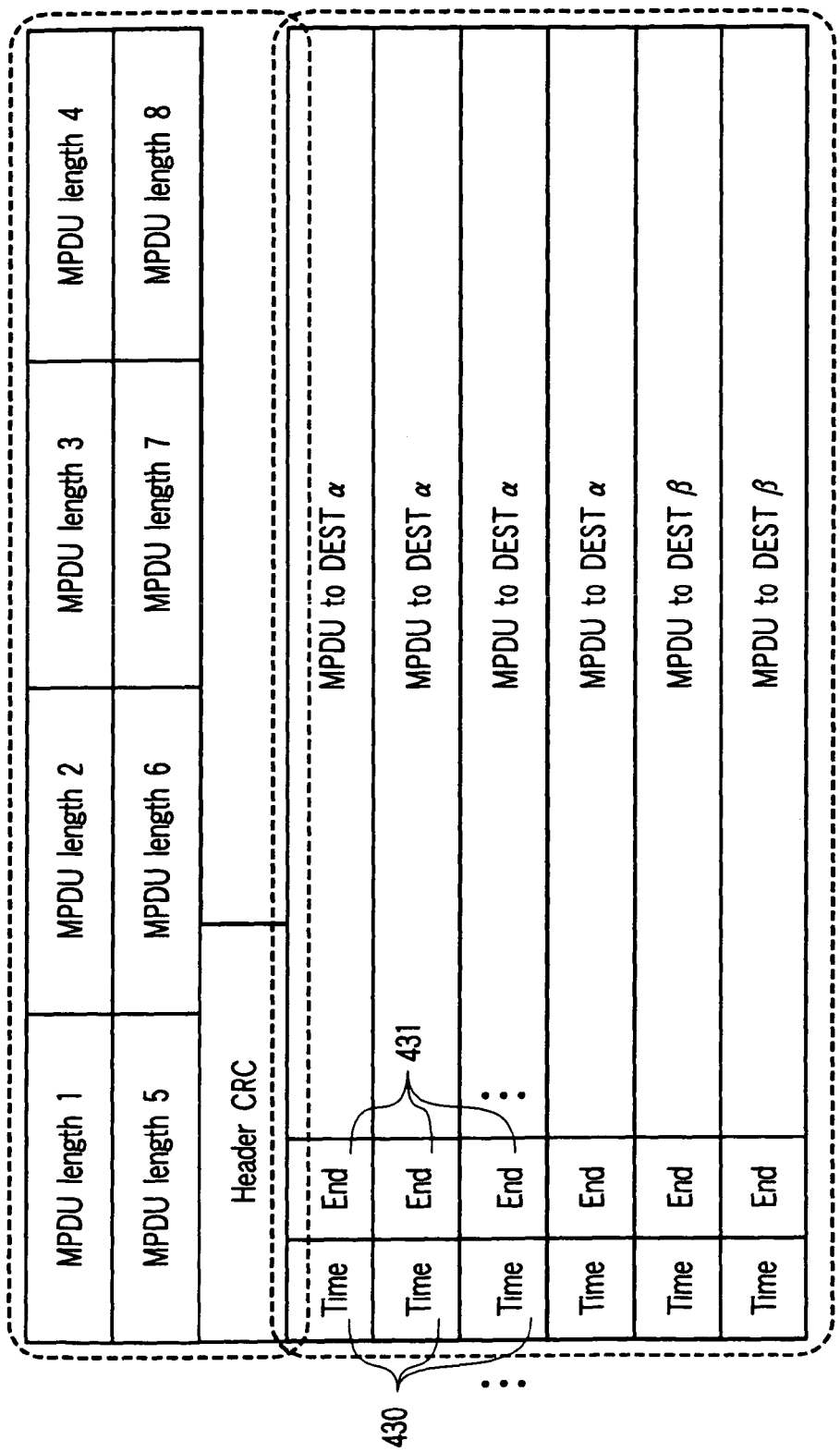
FIG. 43 is a diagram showing another example of the frame format in a case where the time to transmit ACK is designated on the transmitting side according to the tenth embodiment of the present invention.
Figure 44:
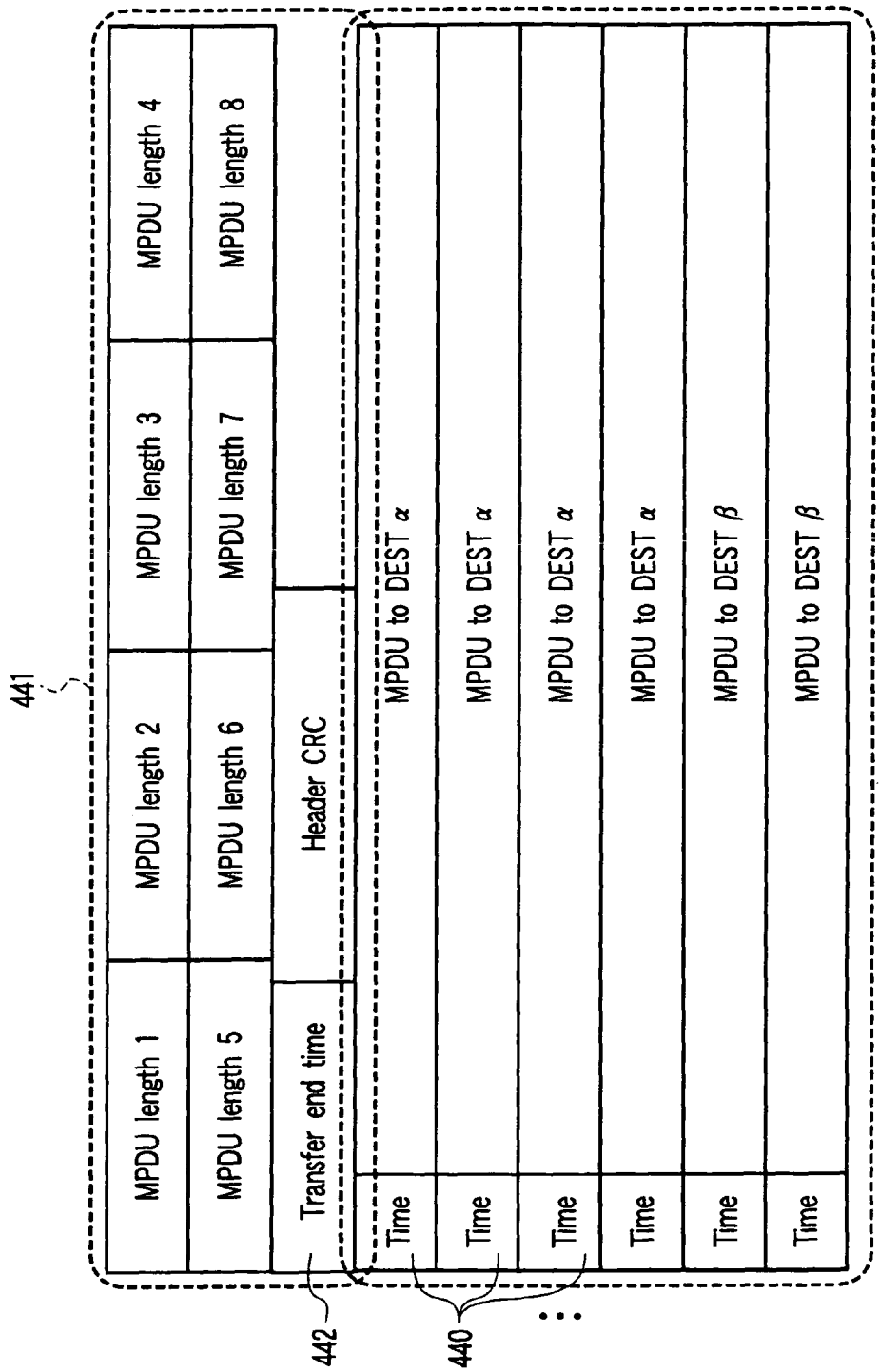
FIG. 44 is a diagram showing another example of the frame format in a case where the time to transmit ACK is designated on the transmitting side according to the tenth embodiment of the present invention.

FIG. 43 shows that an ACK Transfer Start Time 430 and Transfer End Time 431 are added to a front part of MPDUs aggregated in a MAC super frame. In this case, a value of an MPDU Length field increases by field lengths of the ACK Transfer Start Time 430 and the Transfer End Time 431. The FCS is calculated over all the fields of the ACK Transfer Start Time 430 and the ACK Transfer End Time 431 and the MPDU. FIG. 44 shows that an ACK Transfer Start Time 440 is added to a front part of MPDUs aggregated in a MAC super frame, and one Transfer End Time 442 is added to a MAC super frame header 441. In FIG. 43, FCS calculation in a MAC super frame payload is performed with respect to targets including a Time field, End field, MAC header, and MAC frame payload. In FIG. 44, calculation targets of FCS include a Time field, MAC header, and MAC frame payload.

As shown in FIG. 45, a receiving terminal of DEST1 starts transmission of ACK (Partial Ack) 455 at an ACK transfer start time 450, and sets a NAV 453 till a transfer end time 452 after transmitting the ACK. A receiving terminal of DEST2 starts transmission of an ACK (Partial Ack) at an ACK transfer start time 451. A transmission end time of the ACK 456 agrees with the transfer end time 452, and the NAV is not set. Another terminal (OTHER STA) that is not an object of frame reception sets a NAV 454 till the transfer end time 452.

Eleventh Embodiment

A communication apparatus according to an eleventh embodiment bunches MAC frames indicating ACK is required and not required with respect to a plurality of destinations for each priority, aggregates the frames into one physical frame, and transmits the frame. Each destination terminal transmits ACK with a time difference.

Figure 46:
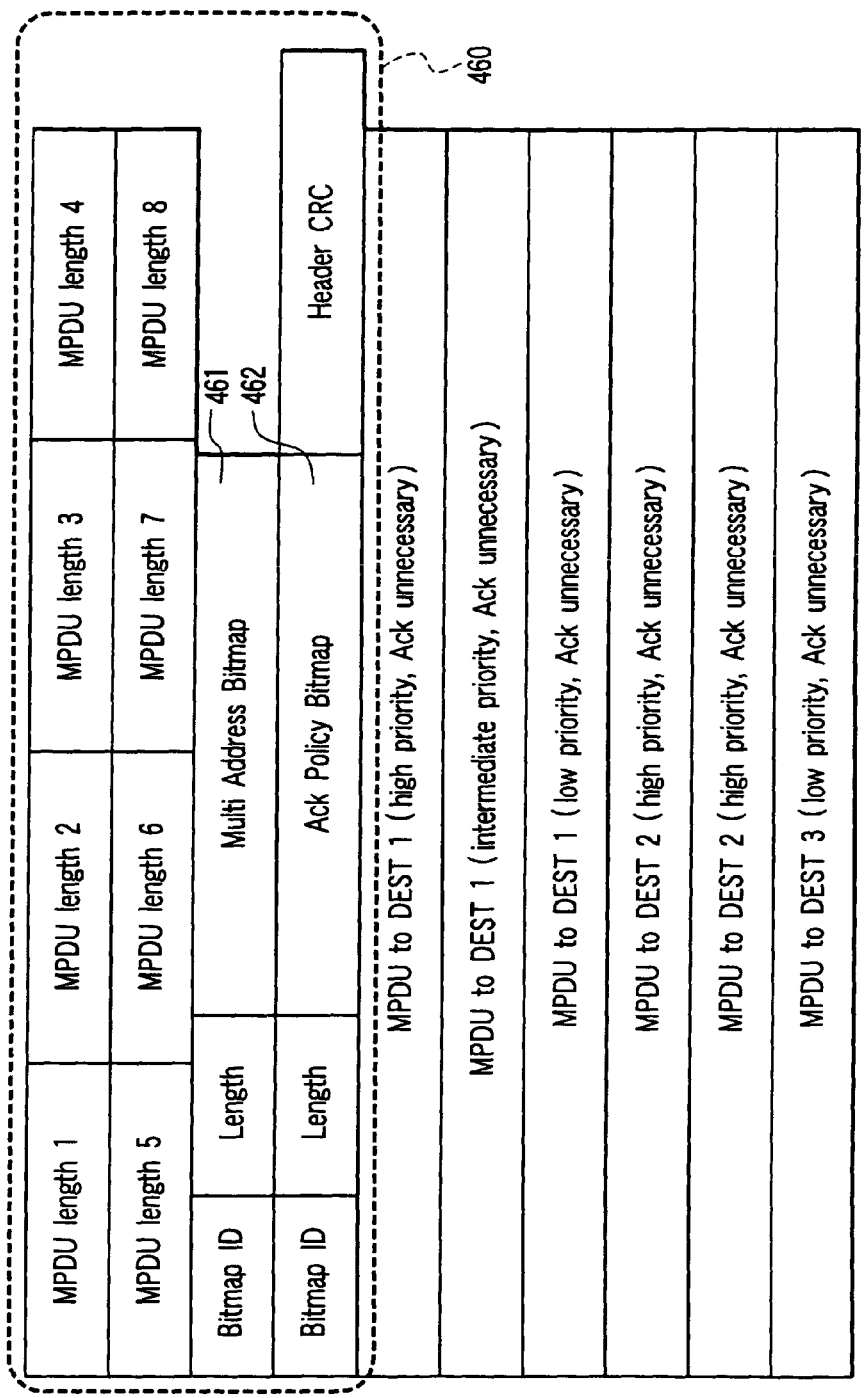
FIG. 46 is a diagram showing one example of a MAC super frame for a plurality of destinations considering QoS according to an eleventh embodiment of the present invention.

As shown in FIG. 46, a MAC super frame header 460 includes both a Multi Address Bitmap 461 and an Ack Policy Bitmap 462. Each receiving terminal can appropriately set NAV based on the Multi Address Bitmap 461, and calculate a transmission timing of the ACK. On the other hand, according to the Ack Policy Bitmap 462, when all MPDUs to a certain destination have Ack Policy "No Acknowledgement", the destination does not transmit any ACK, and an ACK control is executed in such a manner that the subsequent destination terminal transmits the ACK.

Figure 47:
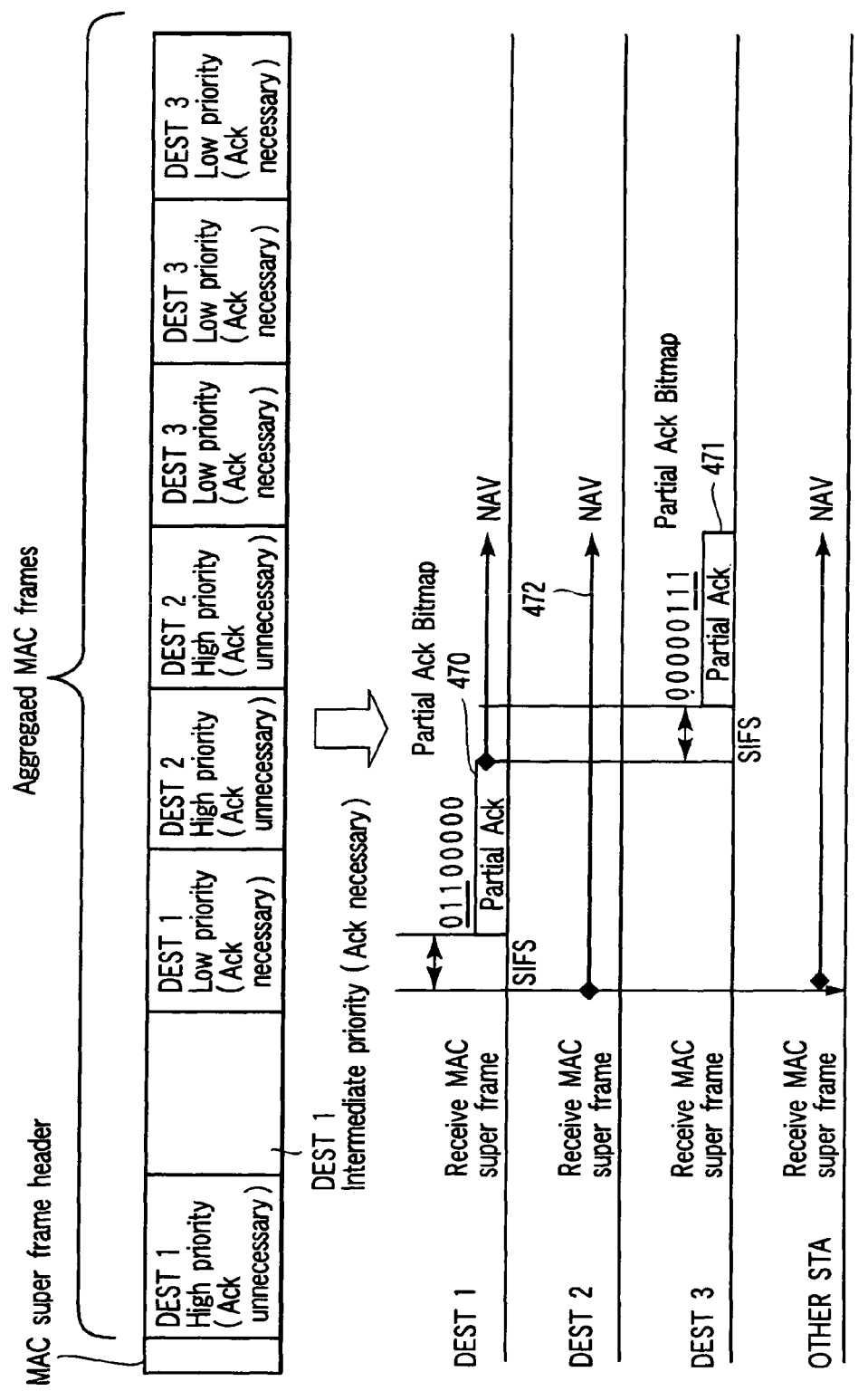
FIG. 47 is a diagram showing a simulcast for a plurality of destinations considering QoS according to the eleventh embodiment of the present invention.

For example, as shown in FIG. 47, since all MPDUs to DEST2 have Ack Policy "No Acknowledgement", DEST3 can transmit an ACK 471 immediately after ending transmission of an ACK 470. A terminal of DEST2 sets a NAV 472 until the transmission of all ACKs ends. It is to be noted that a header constitution of the MAC super frame shown in FIG. 46 is merely one example. When the above-described header formats are appropriately combined, or the ACK transmission timing is designated, the efficiency can be enhanced.

Twelfth Embodiment

Figure 48:
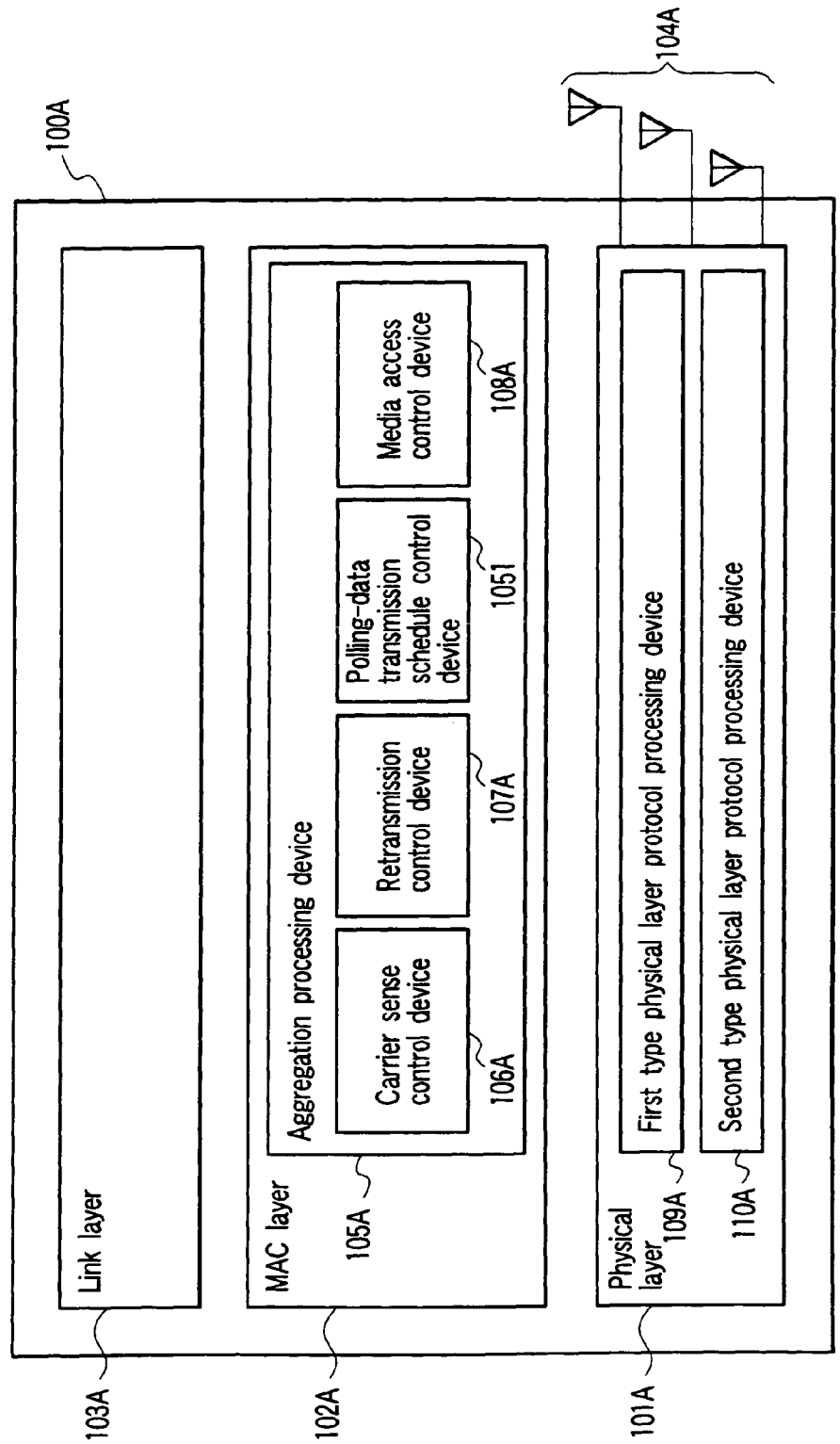
FIG. 48 is a block diagram of a communication apparatus (access point) according to a twelfth embodiment of the present invention.

FIG. 48 is a block diagram showing a constitution of a communication apparatus (access point) according to a twelfth embodiment of the present invention. A communication apparatus 100A is an apparatus configured to communicate with another communication apparatus through a wireless link, and includes processing units 101A, 102A, and 103A, respectively, corresponding to a physical (PHY) layer, MAC layer, and link layer. These processing units are implemented as analog or digital electronic circuits or as firmware or the like to be executed by a CPU incorporated in an LSI in accordance with implementation requirements. An antenna 104A is connected to the physical layer processing unit 101A ("processing unit" will be hereinafter omitted). The MAC layer 102A has an aggregation processing device 105A according to the present invention. The aggregation processing device 105A comprises a carrier sense control device 106A, a media access control device 108A, a polling/data transmission schedule control device 1051, and a retransmission control device 107A. The physical layer 101A is constitute to be capable of handling two types of physical layer protocols. For processing of the respective protocols, the physical layer 101A has a first type physical layer protocol processing device 109A and a second type physical layer protocol processing device 110A. It is to be noted that in the implementation, the first type physical layer protocol processing device 109A and the second type physical layer protocol processing device 110A often share circuits, and therefore they do not necessarily independently exist.

In the embodiment of the present invention, a first type of physical layer protocol is defined by IEEE802.11a, and a second type of physical layer protocol is assumed as a protocol by so-called multiple input multiple output (MIMO) using a plurality of antennas on transmitting and receiving sides. Even when a frequency band is kept to be equal, an increase of a transmission capacity substantially proportional to the number of antennas can be anticipated. Therefore, the MIMO is one of techniques usable to aim at higher throughput of the IEEE802.11. It is assumed that the link layer 103A has a usual link layer function defined by the IEEE802. A technique adopted to enhance a transmission rate is not limited to the MIMO. For example, a method of increasing a frequency occupancy band, or a combination of the method with the MIMO may be used.

Figure 49:
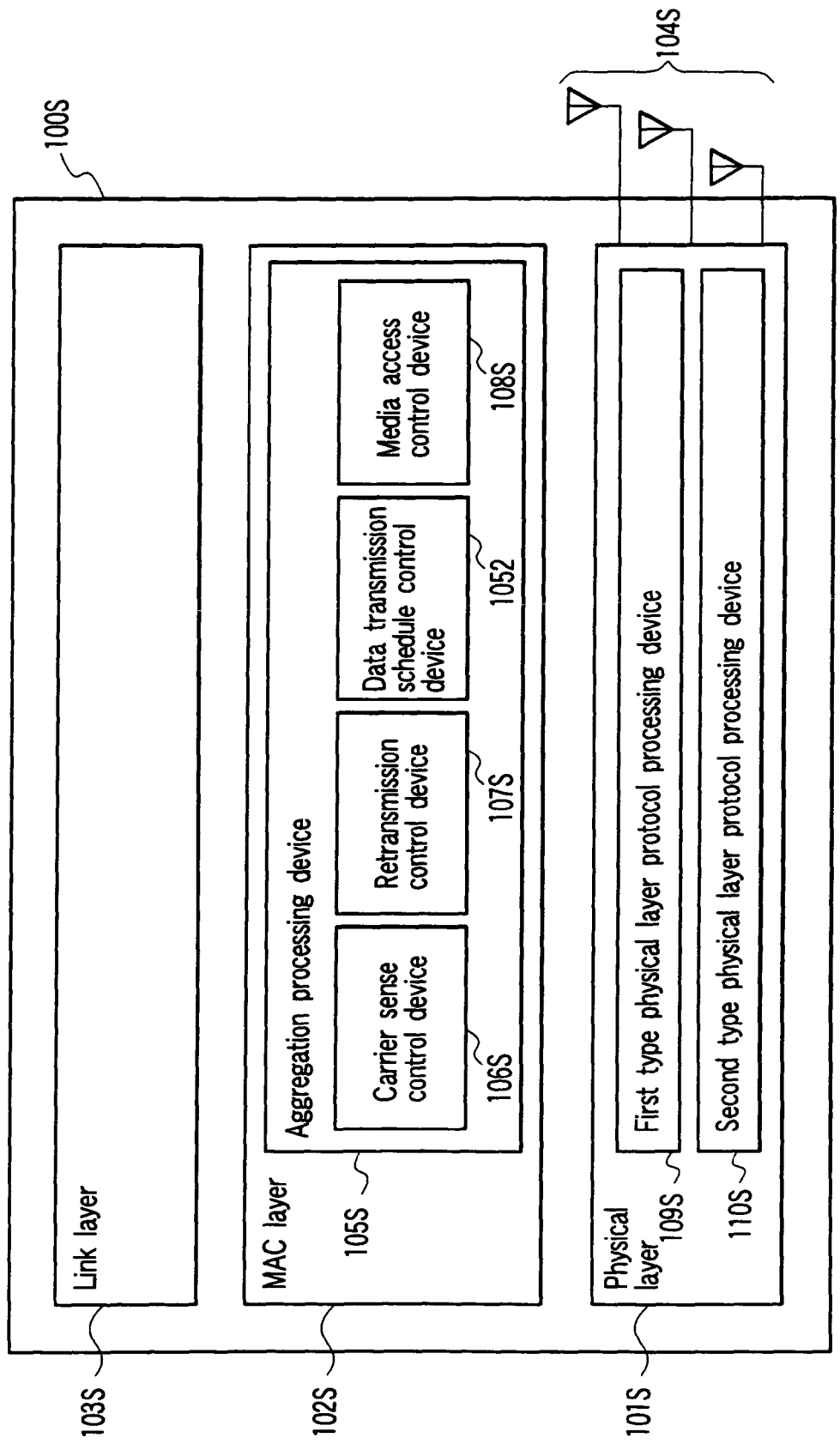
FIG. 49 is a block diagram of a communication apparatus (terminal) according to the twelfth embodiment of the present invention.

FIG. 49 is a block diagram showing a constitution of a communication apparatus (terminal) according to the present embodiment. A large difference from the communication apparatus (access point) 100A shown in FIG. 48 lies in that the MAC layer 102 of the access point 100A has a polling/data transmission schedule control device 1051 capable of performing polling control, whereas a MAC layer 102S of a terminal 100S has a data transmission schedule control device 1052 without any polling control. Other constituting elements are similar to those of the access point 100A, and an end of a reference numeral changes to "S".

Figure 50:
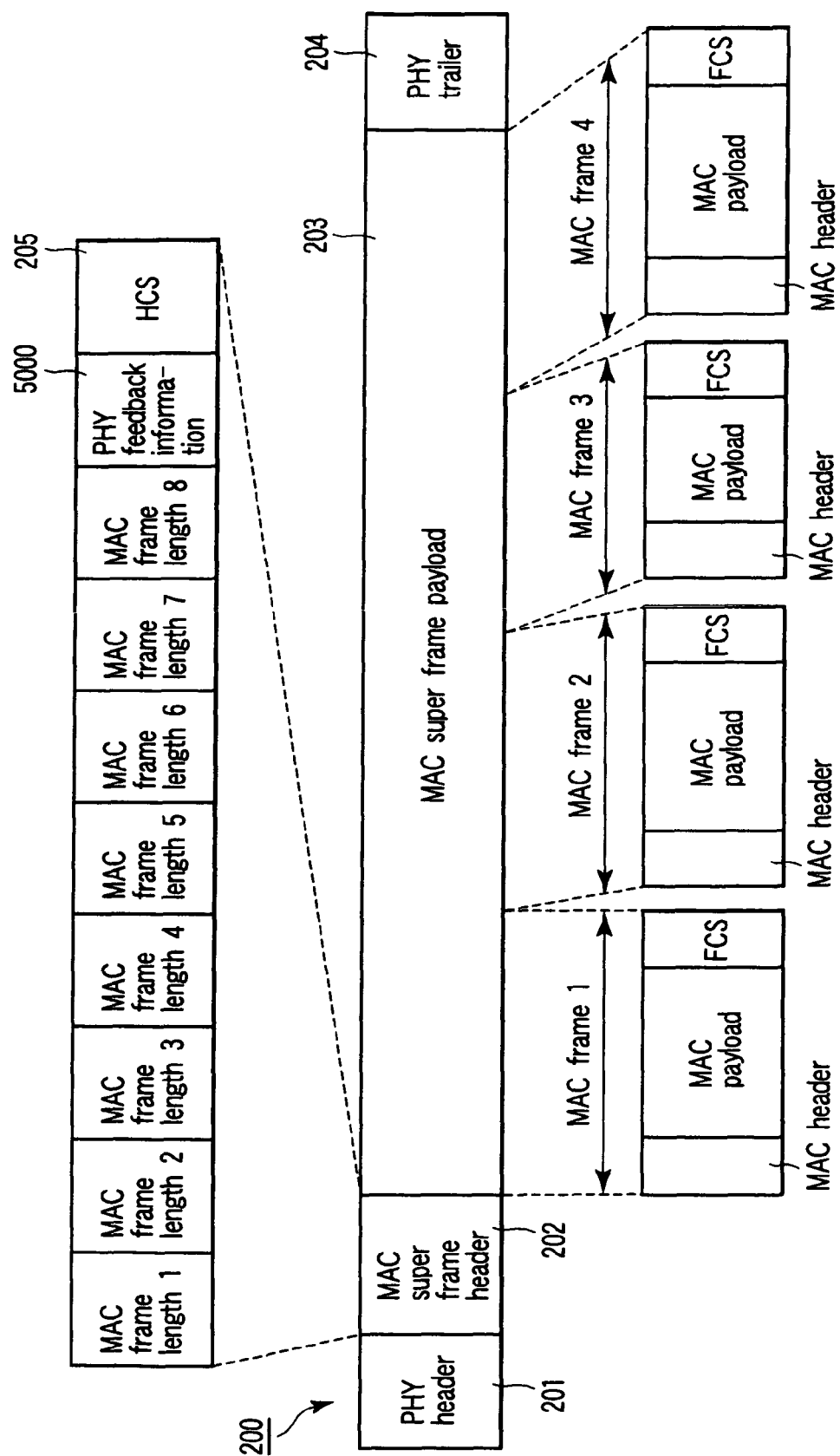
FIG. 50 is a diagram showing one example of a frame format used by the communication apparatus.

FIG. 50 is a diagram showing an example of a frame format for use by the communication apparatus according to the present embodiment. A frame format 200 schematically shows a frame structure associated with a physical layer and MAC layer. More specifically, this format is assumed to be one that conforms to IEEE 802.11 or an extended version thereof. It is to be noted that a frame of IEEE802.11 is roughly classified into three types: a control frame; a management frame; and a data frame. It is supposed in the present invention that the embodiment is applied mainly to the data frame and the control frame, but the application to the management frame is not necessarily excluded. As shown in FIG. 50, the frame format 200 comprises a PHY header 201, MAC super frame header 202, MAC super frame payload 203, and PHY trailer 204. The MAC super frame header 202 and MAC super frame payload 203 correspond to a PHY payload described later.

The PHY header 201 is processed by the physical layer 101 of a receiving communication apparatus (access point, or terminal). That is, the physical layer 101 performs detection of a frame head, carrier sense, timing synchronization establishment, automatic gain control (AGC) of an amplifier, tracking of a transmitting-side carrier frequency (automatic frequency control), transmission channel estimation, and the like. The physical layer 101 also detects the modulation scheme and coding ratio of the PHY payload following the PHY header 201, a transmission rate, and a data length.

FIG. 51 is a diagram showing one example of a format of a first type of PHY frame. This format is the same as that defined by IEEE802.11a. The first type of PHY frame is used when the communication apparatus according to the present invention communicates with the existing communication apparatus, and is processed by the first type physical layer protocol processing device 109 of the physical layer 101 (here, communication by IEEE802.11a is assumed). As shown in FIG. 51, a first type of PHY frame, that is, a first type of PLCP frame comprises a Physical Layer Convergence Protocol (PLCP) 301, a PLCP long preamble 302, a Signal field 303, and a Data field 304. The Signal field 303 corresponds to a PLCP header 305, and has a transmission Rate field 306 and a Data Length field 307 as shown. It is to be noted that, needless to say, the first type of PHY frame is not limited to one defined by the IEEE802.11a.

Figure 52:
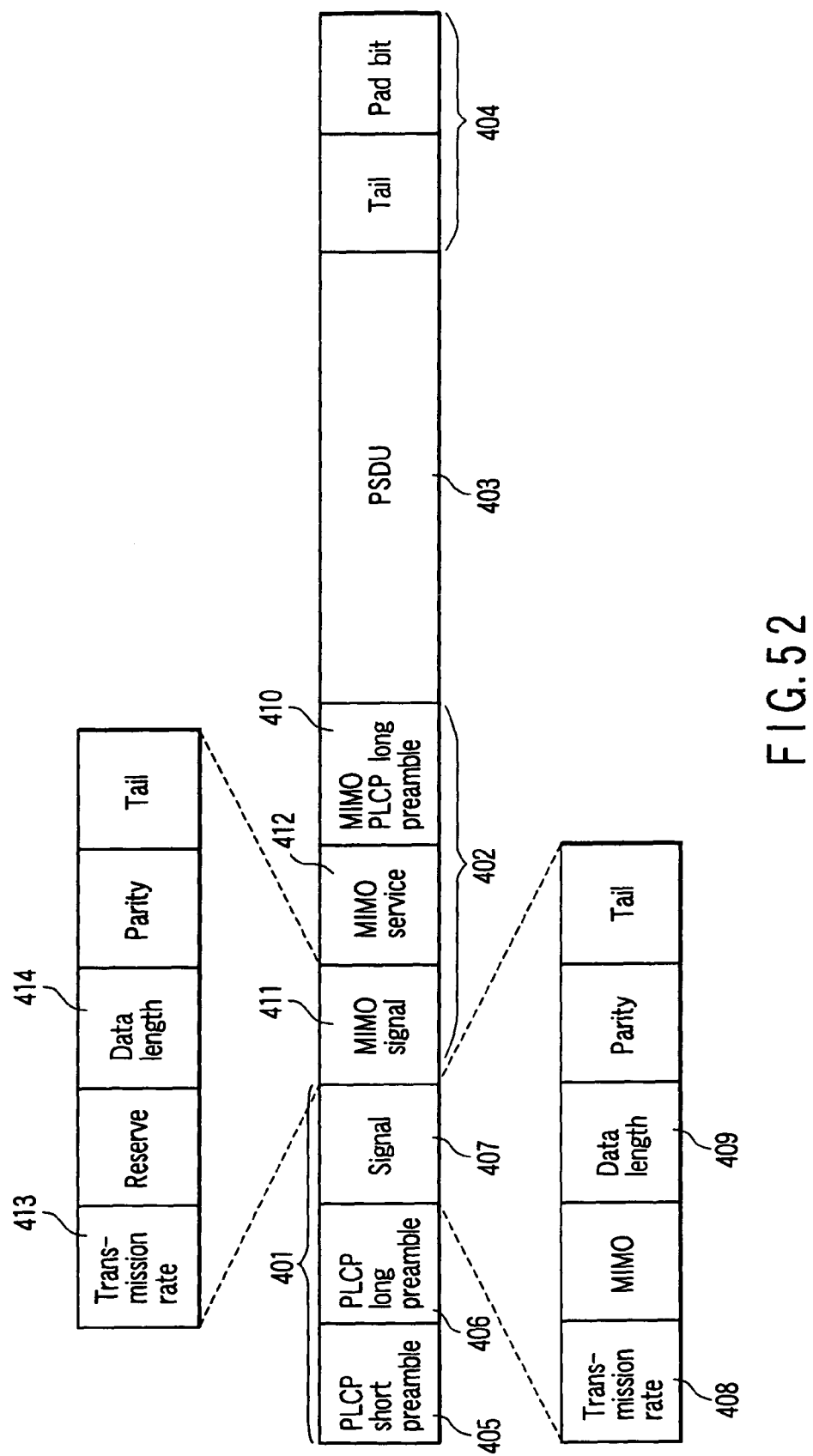
FIG. 52 is a diagram showing one example of a format of a second type of PHY frame.

FIG. 52 is a diagram showing one example of a format of a second type of PHY frame. The second type of PHY frame, that is, a second type of PLCP frame has a first header portion 401 for a first type of physical layer protocol, and a second header portion 402 for the second type of physical layer protocol. The first header portion 401 and the second header portion 402 are arranged along a time series, and correspond to the PHY header 201 shown in FIG. 50.

Moreover, the second type of PHY frame has a PHY payload 403 following the second header portion 402, and Tail and Pad bits 404. The PHY payload 403 corresponds to the MAC super frame header 202 and the MAC super frame payload 203 as shown, and corresponds to a PLCP Service Data Unit (PSDU) in the format of the physical layer. The Tail and Pad bits 404 correspond to the PHY trailer 204 of FIG. 50.

The first header portion 401 for the first type of physical layer protocol comprises a PLCP short preamble 405, a PLCP long preamble 406, and a Signal field 407. The Signal field 407 corresponds to all or part of a PLCP header, and effective values are set at least to a Transmission Rate field 408 and a Data Length field 409 in such a manner as to perform physical carrier sense. In the Signal field 407, information contents, modulation system and the like are the same as those of the PLCP header 305 of the first type of PHY frame shown in FIG. 51.

The second header portion 402 for the second type of physical layer protocol comprises a MIMO. Signal field 411, a PLCP long preamble 410 for MIMO, and a MIMO service field 412. The MIMO signal field 411 has a Transmission rate field 413 and a Data length field 414 as shown, and is referred to in physical carrier sense. The PLCP long preamble 410 for the MIMO is used, when a receiving communication apparatus of MIMO capable of interpreting the second type of physical protocol acquires transmission channel information necessary for a decoding process.

Since the second type of the PHY frame is formed into a format as shown in FIG. 52, the existing communication apparatus operable only in accordance with the first type of physical layer protocol can interpret at least the first Signal field 407, the carrier sense of the physical layer is correctly performed based on the Signal field 407. Therefore, it is possible to share the same physical layer carrier sense information between the existing communication apparatus and the communication apparatus operable in accordance with the second type of physical layer protocol in addition to the first type. It is to be noted that the existing communication apparatus cannot share the carrier sense information of the MAC layer, but this does not raise any problem by the Partial Ack.

Information indicating a media occupying duration (hereinafter referred to as "physical occupying duration") by a PHY payload at a time when the PHY payload is transmitted on a physical medium is utilized as carrier sense information of the physical layer together with signal intensity. On knowing the physical occupying duration of the PHY payload by the physical carrier sense, the receiving communication apparatus interprets that the physical medium is occupied for the duration (PHY busy). It is also interpreted that the physical medium is also occupied for a duration for which the signal intensity exceeds a certain threshold value. The physical occupying duration of the PHY payload can be calculated from the transmission rate (408 or 413) and the data length (409 or 414) of the PHY payload detected in the receiving communication apparatus. Specifically, a value of the Data length field, represented by an octet length, is divided by a value of the Transmission rate field. This also applies to the first type of PHY frame shown in FIG. 51.

It is to be noted that when a maximum data length (4096 octets in IEEE802.11a) of the PHY payload allowed by the first type of physical layer protocol is actually shorter than that of the PHY payload allowed by the second type of physical layer protocol, the Transmission rate field 408 and the Data length field 409 are intentionally falsely set in such a manner that the physical occupying duration of the PHY payload is appropriate. Then, it is possible to share the carrier sense information of the physical layer.

Here, returning to the description with reference to FIG. 50. One MAC super frame is constituted of a single PHY frame including a plurality of MAC frames. In the frame format 200 shown in the drawing, the MAC super frame header 202 has eight MAC frame data length fields 1 to 8 in a fixed manner. It is to be noted that the MAC super frame header 202 is assumed to have a fixed length in the present embodiment. However, when information indicating the number of MAC frames is added, the MAC super frame header 202 may have a variable length.

For example, when four MAC frames 1 to 4 only are included in the MAC super frame payload 203, a value of zero is buried in MAC frame data length fields 5 to 8 corresponding to MAC frames 5 to 8 that do not exist in the same payload 203. Moreover, during transmission control described later, for example, the MAC frames 1 and 3 need to be returned, but MAC frames 2 and 4 do not have to be returned. In this case, a MAC frame data length can be set to zero also in designating MAC frames which are not retransmission targets, like MAC frame data length 1>0, MAC frame data length 2=0, MAC frame data length 3>0, MAC frame data length 4=0.

It is to be noted that to indicate that the MAC frame does not exist, a method other than the method in which the MAC frame data length is set to zero may be used. For example, eight MAC frames at maximum can be included in the MAC super frame payload, MAC frames 1 to 4 exist in the MAC super frame, and MAC frames 5 to 8 do not exist. In this case, the presence of the frames may be indicated by an 8-bit bitmap. This bitmap is a part of a MAC super frame header (not shown).

An HCS 205 is a header check sequence, and is added to the header 202 in such a manner that an error of the MAC super frame header 202 is detectable. When the receiving communication apparatus detects the error of the MAC super frame header 202 by the HCS 205, it is interpreted that all MAC frames included in the MAC super frame payload 203 break.

To prevent buffer overflow in the receiving communication apparatus, the number of MAC frames included in the MAC super frame payload 203 is preferably dynamically limited (sliding window control).

Figure 53:
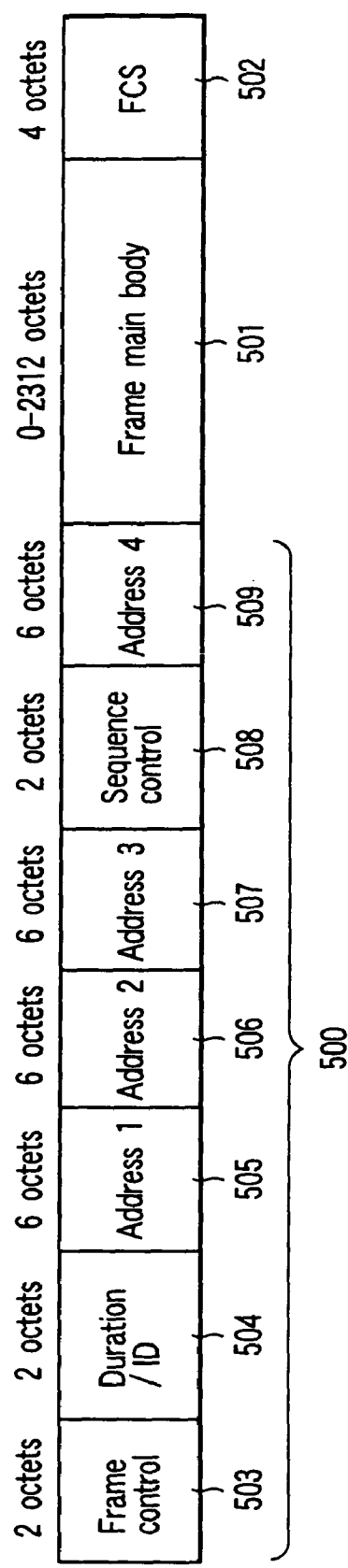
FIG. 53 is a diagram showing one example of a format of a MAC frame.

FIG. 53 is a diagram showing an example of a format of the MAC frame. One MAC frame included in the MAC super frame payload 203 of FIG. 50 comprises a MAC header 500, a frame main body 501, and a frame check sequence (FCS) 502. The MAC header 500 comprises a Frame control field 503, a Duration field 504, Address fields 505 to 507, 509, and a Sequence control field 508. The Frame main body 501 has a variable length in a length range of 0 to 2312 octets, and is a payload of the MAC frame corresponding to a MAC Protocol Data Unit (MPDU).

With the speeding-up of the physical layer by the second type of physical layer protocol (e.g., MIMO in the present embodiment), in the present embodiment, a plurality of MAC frames are included in a PHY frame as a MAC super frame, and accordingly the format is efficiently constituted. Therefore, an overhead of the whole PHY frame attributable to the format, that is, PLCP header, various inter frame spaces (IFS), random backoff and the like are avoided, and substantial throughput of the communication can be enhanced.

Figure 54:
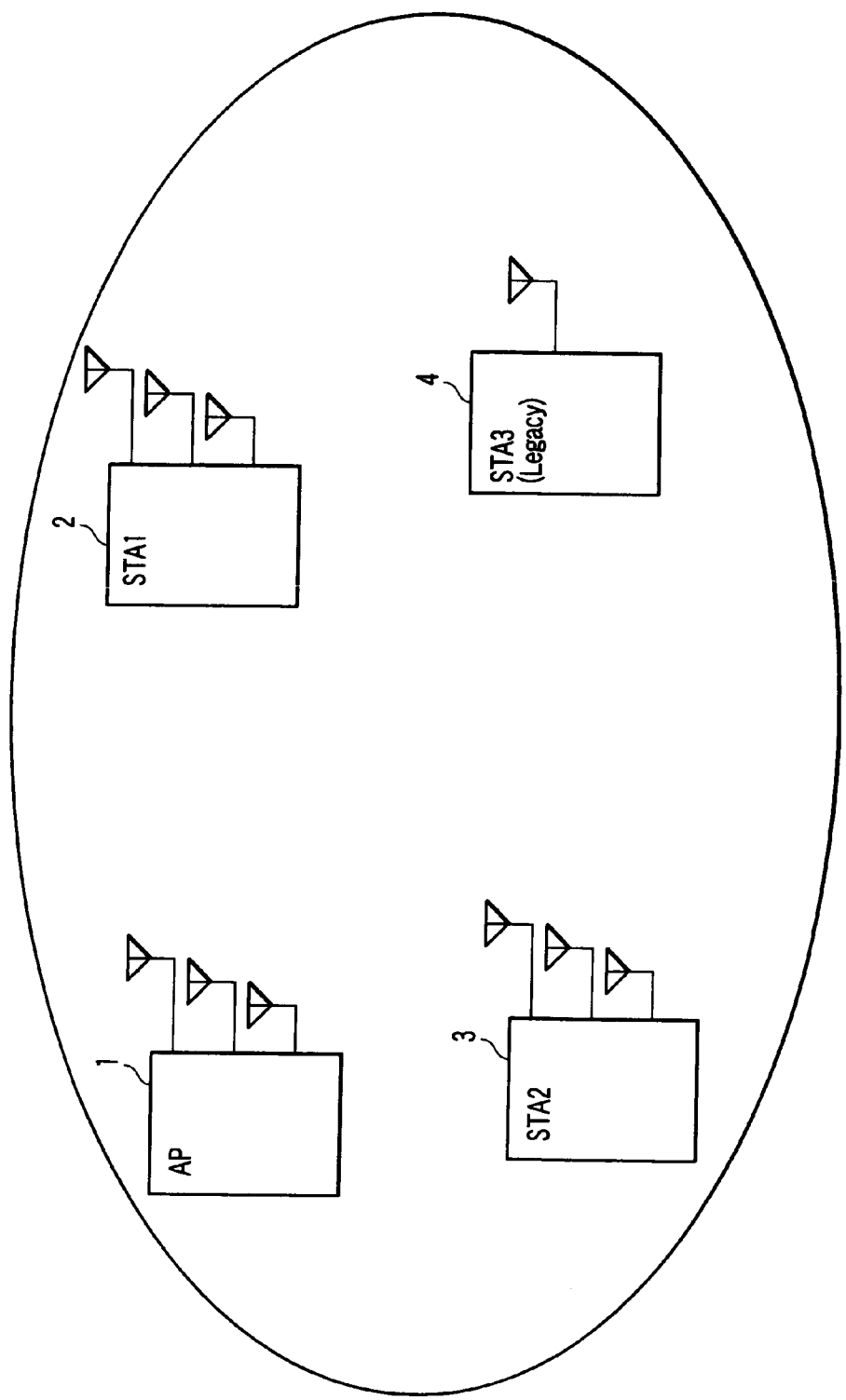
FIG. 54 is a diagram showing one example of a communication system according to the twelfth embodiment of the present invention.

FIG. 54 is a diagram showing one example of a communication system according to the twelfth embodiment of the present invention. In the communication system, a communication apparatus 1 (access point) and communication apparatuses 2 to 4 (terminals) perform communication via a wireless link. The shown communication apparatus 1 has a constitution shown in FIG. 48. The communication apparatuses 2, 3 (terminals) have constitutions shown in FIG. 49. On the other hand, the communication apparatus 4 (legacy terminal) comprises a first type physical layer protocol processing device 109S only, and does not comprise a second type physical layer protocol processing device 110S. Therefore, the apparatus corresponds to the existing communication terminal that does not transmit any MAC super frame.

Figure 55A:
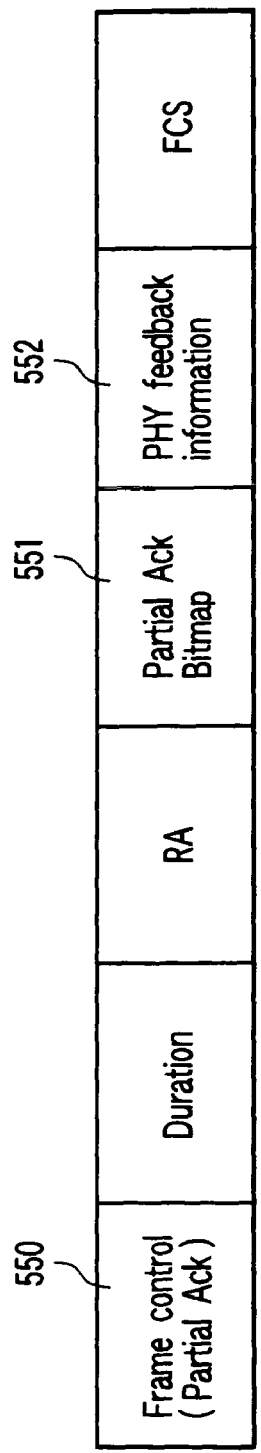
FIG. 55A is a diagram showing a format example of a Partial acknowledgment (Partial Ack) frame.

FIG. 55A shows a format example of a partial acknowledgment (Partial Ack) frame. A value indicating that the frame is Partial Ack enters a type/subtype field of a frame control field 550. A value of an acknowledgment state indicating whether or not a data frame constituting an acknowledgment target is successfully received by a receiving terminal or an access point enters a Partial Ack Bitmap 551. The Partial Ack is used for performing selective repeat retransmission control (so-called selective repeat). PHY feedback information 552 may be included in a Partial Ack frame in order to return information of a physical layer level. Information (bit) which makes possible poll by Partial Ack may be imparted (not shown).

Figure 55B:
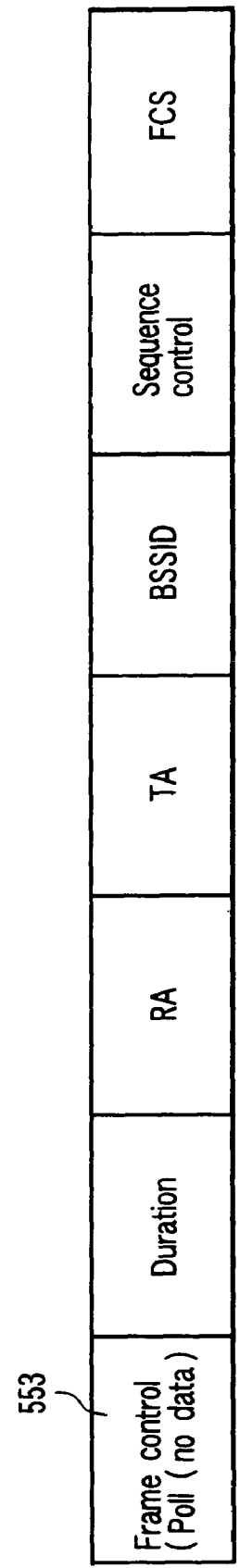
FIG. 55B is a diagram showing a format example of a Poll (no data) frame.

FIG. 55B shows a format example of a Poll (no data) frame. A value indicating that the frame is a Poll frame (referred to as "Poll (no data)") which does not include any data enters a type/subtype field of a frame control field 553. The Poll (no data) frame is used, when the access point assigns transmission rights to the terminal. The access point is assumed to conform to IEEE 802.11e "Medium Access Control (MAC) Quality of Service (QoS) Enhancement" (draft specifications at present), or an extended version thereof, or may not conform. It is to be noted that in IEEE802.11e, the physical access point is distinguished from a logical entity of schedule management called a hybrid coordinator, but the embodiment of the present invention can be implemented without especially distinguishing them.

Figure 56A:
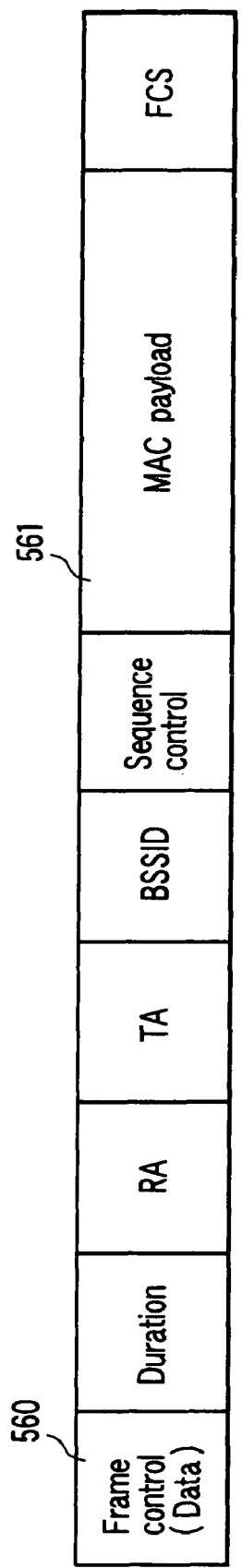
FIG. 56A is a diagram showing a format example of a Data frame.

FIG. 56A shows a format example of a Data frame. A value indicating that the frame is a Data frame enters a type/subtype field of a. Frame control field 560. User data (in general, a link layer requests a MAC layer to transmit the data) enters a MAC payload (or MAC service data unit (MSDU)) 561.

Figure 56B:
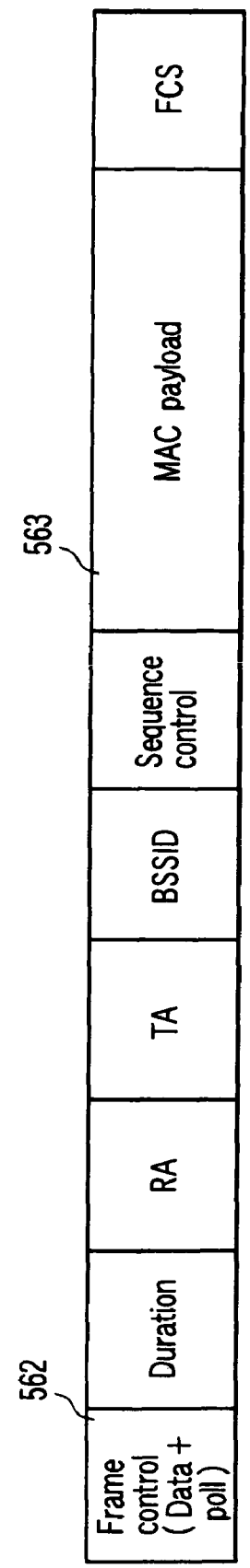
FIG. 56B is a diagram showing a format example of a Data+Poll frame.

FIG. 56B shows a format example of a Data+Poll frame. A value indicating that the frame is a Poll frame (referred to as "Data+Poll") including the Data enters a type/subtype field of the Frame control field. The Data+Poll frame is used in a case where the access point needs to assign transmission rights to the terminal, and the access point transmits user data 562 to the terminal.

These frames (MAC frames) may be transmitted/received as a single MAC frame which is not aggregated, or may be sometimes aggregated into a single physical frame together with other MAC frames, and transmitted/received as the MAC super frame.

It is to be noted that a conventional communication apparatus 4 (legacy terminal) is capable of transmitting/receiving a single MAC frame only, and a communication apparatus 1 (access point) and communication apparatuses 2, 3 (MIMO handling terminals) are assumed to be capable of transmitting/receiving either the single MAC frame or the MAC super frame.

FIG. 57 shows that all MAC frames (MAC frames 1 to 4) of a basic aggregate frame format are data formats in a case where a plurality of MAC frames shown in FIG. 50 are aggregated into a single physical frame. The frame of FIG. 57 is used for mutually transmitting/receiving the user data between the terminal and the access point, or between the terminals.

Figure 58:
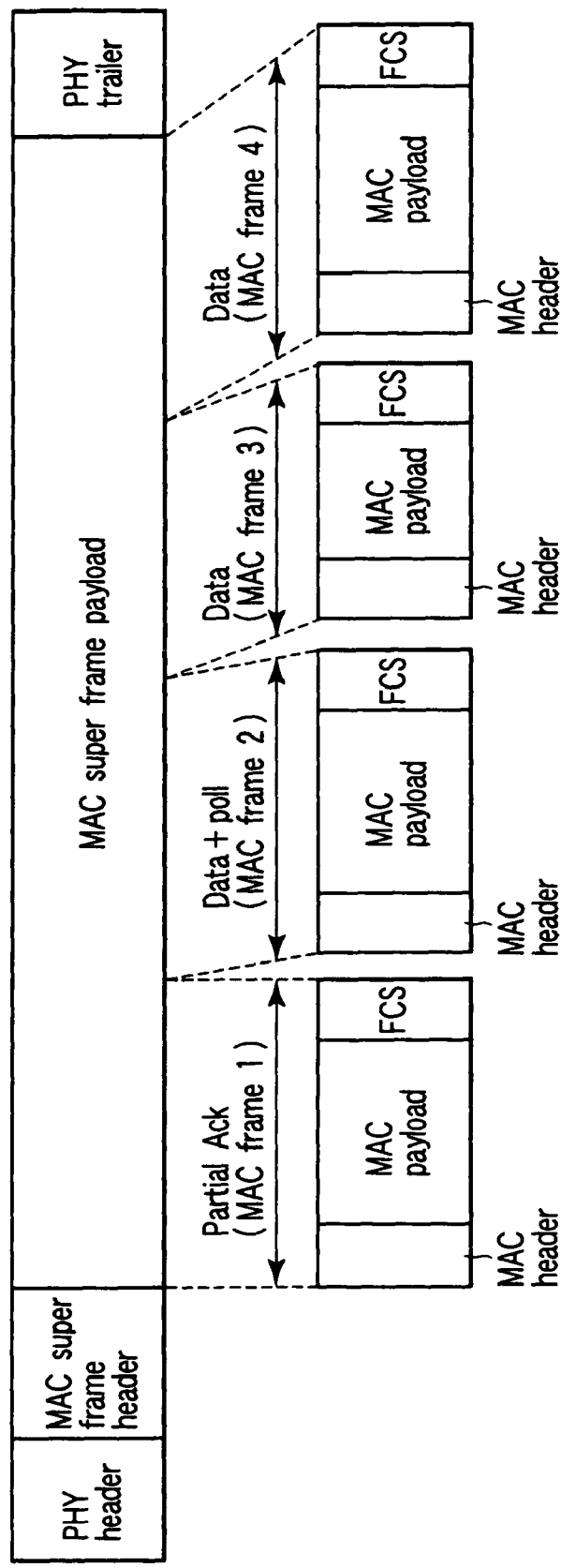
FIG. 58 is a diagram showing one example of a MAC super frame including Partial Ack+[Data+Poll]+Data.

FIG. 58 shows a case where MAC frame 1 of an aggregate frame format is a Partial Ack frame, a MAC frame 2 is a Data+Poll frame, and MAC frames 3, 4 are Data frames. The frame of FIG. 58 is used in a case where an access point performs acknowledgment (Partial Ack) with respect to a terminal, assigns transmission rights to the terminal, and transmits user data to the terminal. Here, the terminal which is an acknowledgment target, the terminal to be given the transmission rights, and the terminal which is a data transmission target are generally the same, but are not prohibited from being different from one another.

Figure 59:
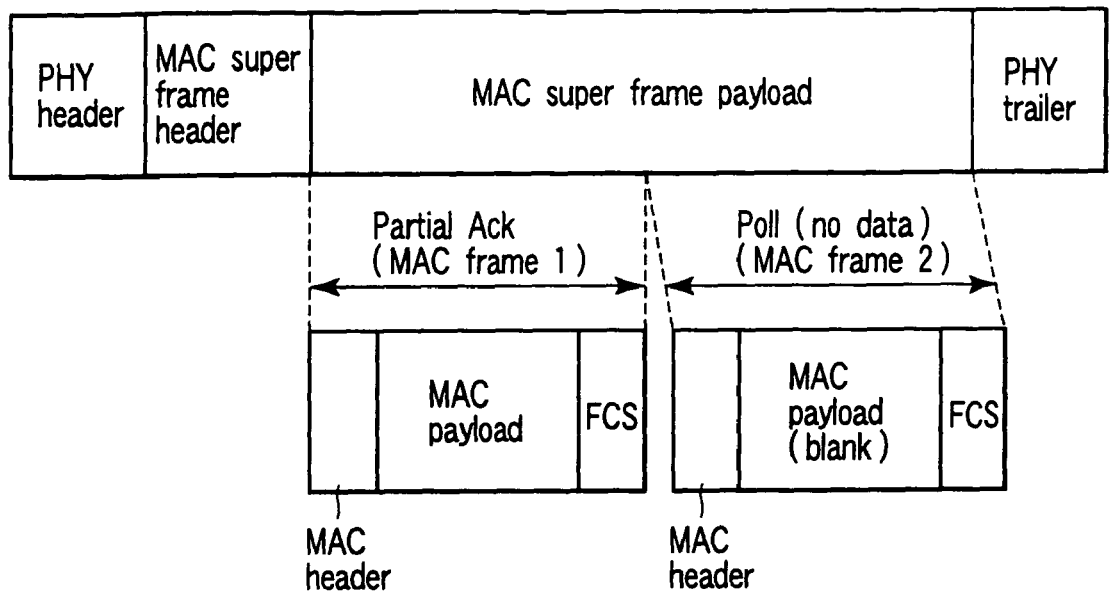
FIG. 59 is a diagram showing one example of a MAC super frame including Partial Ack+[Poll (no data)]

FIG. 59 shows a case where MAC frame 1 of an aggregate frame format is a Partial Ack frame, and MAC frame 2 is a Poll (no data) frame. The frame of FIG. 59 is used in a case where an access point performs acknowledgment with respect to a terminal, and assigns transmission rights to the terminal. Here, the terminal which is an acknowledgment target, and the terminal which assigns the transmission rights are generally the same, but may be different from each other.

Figure 60:
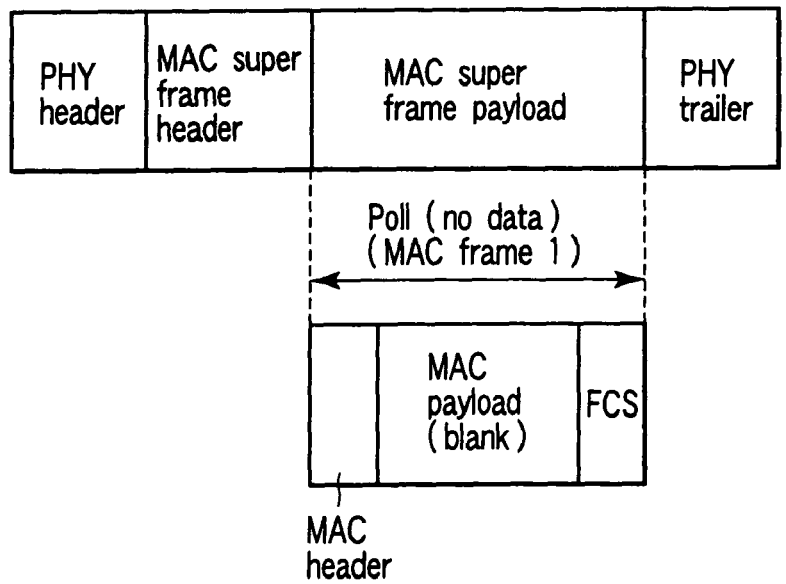
FIG. 60 is a diagram showing one example of a MAC super frame including [Poll (no data)]

FIG. 60 shows a case where MAC frame 1 of an aggregate frame format is a Poll (no data) frame. The frame of FIG. 60 is used in a case where an access point assigns transmission rights to a terminal.

It is to be noted that a combination of a plurality of MAC frames with an aggregate frame is not limited to the above-described method, and other various combinations are possible.

FIG. 61A shows a format example of a QoS Data frame having a QoS control field in a MAC header. A value indicating that the frame is a QoS Data frame enters a type/subtype field of a frame control field 610. User data (in general, a link layer requests a MAC layer to transmit the data) enters a MAC payload (or MAC service data unit (MSDU)) 611.

FIG. 61B shows a format example of a QoS Data+Poll frame having a QoS control field in a MAC header. A value indicating that the frame is a QoS Data+Poll frame enters a type/subtype field of a frame control field 612. The QoS Data+Poll frame is used in a case where an access point needs to assign transmission rights to a terminal, and the access point transmits user data 613 to the terminal.

The QoS Data frame shown in FIG. 61A, and the QoS Data+Poll frame shown in FIG. 61B are QoS extensions of the data frame of FIG. 56A and the Data+Poll frame of FIG. 56B, and the frames are used in conformity to or as an extension of IEEE802.11e.

FIG. 62 shows a case where aggregated MAC frames are Partial Ack, QoS data+poll, 2 QoS data frames. The frame of FIG. 62 is used for mutually transmitting/receiving user data between a terminal and an access point or between terminals. Additionally, the above-described data frames in the aggregate frame formats may be replaced with QoS Data frames, or another combination including the QoS Data frames is also possible.

FIG. 63 shows one example of a frame change sequence in a case where a Point Coordination Function (PCF) defined by IEEE802.11-1999 specifications is used. In the IEEE802.11, a terminal and an access point evenly struggle for media by a Distributed Coordination Function (DCF) of a CSMA/CA base in a contention period 630. In a Contention-Free period 631, an access point (or a logical entity referred to as a point coordinator in the access point) controls all media accesses by polling. The access point periodically transmits a Beacon frame 632. The contention-free period 631 is started by a beacon corresponding to a Contention-Free Repetition Interval (integer times a beacon transmission interval) 633, and ends by a Contention-Free End (CF-End) frame 634 transmitted by the access point, or also ends with elapse of a CF_Max_Duration 635. A terminal other than the access point sets a NAV 636 in the contention-free period 631, and interprets that media are busy at a level of a MAC layer. This inhibits voluntary transmission which is not dependent on polling.

During the CF period (631), the access point can transmit MAC frames such as Poll, Data, Data+Ack., Data+Poll, Data+Ack+Poll. A polled terminal can transmit Data, Data+Ack. and the like. A terminal which is not polled cannot transmit any Data, but can transmit Ack. with respect to the Data transmitted from the access point. The access point operates assuming that the terminal makes a response in SIFS period. When an anticipated response is not returned in the SIFS, the access point may start a frame sequence to be scheduled next after PIFS.

It can be judged by a Capability Information Field included in beacon or probe response frame whether or not the access point has a Point Coordination Function (PCF). In a terminal which desires to be a polling target, its own terminal is capable of receiving the polling with respect to the access point having a polling function, and the terminal transmits an association request frame including the capability information field indicating registration into polling schedule.

A method in which the access point executes a media access control by the polling is extended (HCF controlled channel access: HCCA, hybrid coordination function: HCF) by IEEE802.11e. As shown in FIG. 64, a large difference from the IEEE802.11 lies in that the access point (hybrid coordinator) can start controlled access periods (CAP) 641, 642, 643 and the like for polling control at an arbitrary time in a contention period 640. That is, after confirming an idle state of a medium in a PIFS period, the access point can start an arbitrary frame sequence determined by specifications. A terminal constituting a polling target is given transmission rights of a Transmission Opportunity (TXOP) period designated by a QoS control field of a poll frame. In the TXOP period, the terminal may continuously transmit/receive a plurality of MAC frames at the SIFS interval. When the terminal transmits a null data frame, it may return the transmission rights to the access point before ending given TXOP.

As a further difference in the IEEE802.11e, it is determined that a terminal desiring the polling should request the setting of a traffic stream with respect to the access point. When the traffic stream is set, the access point controls media access by the terminal in such a manner as to satisfy QoS requests such as band and delay. That is, data transmission from the access point to the terminal is scheduled in such a manner that the MSDU meeting designated traffic classifier (TCLAS) is transmitted satisfying designated QoS request. As to the data transmission from the terminal to the access point, the access point polls the terminal in such a manner as to satisfy the designated QoS request.

In the specifications of IEEE802.11-1999, or IEEE802.11e, the MAC frame for use in the polling control, or the MAC frame allowed to be changed by the polling control is a single MAC frame having one-to-one correspondence to the physical frame. This is not a MAC super frame in which a plurality of MAC frames are aggregated into one physical frame. However, when a plurality of MAC frames are aggregated into a single physical frame, accompanying overheads (preamble, physical header, inter frame space (IFS), random backoff etc.) for each physical frame can be reduced, and the transmission efficiency of the MAC layer is enhanced. A polling sequence concerning the aggregated MAC frames will be described hereinafter.

Figure 65:
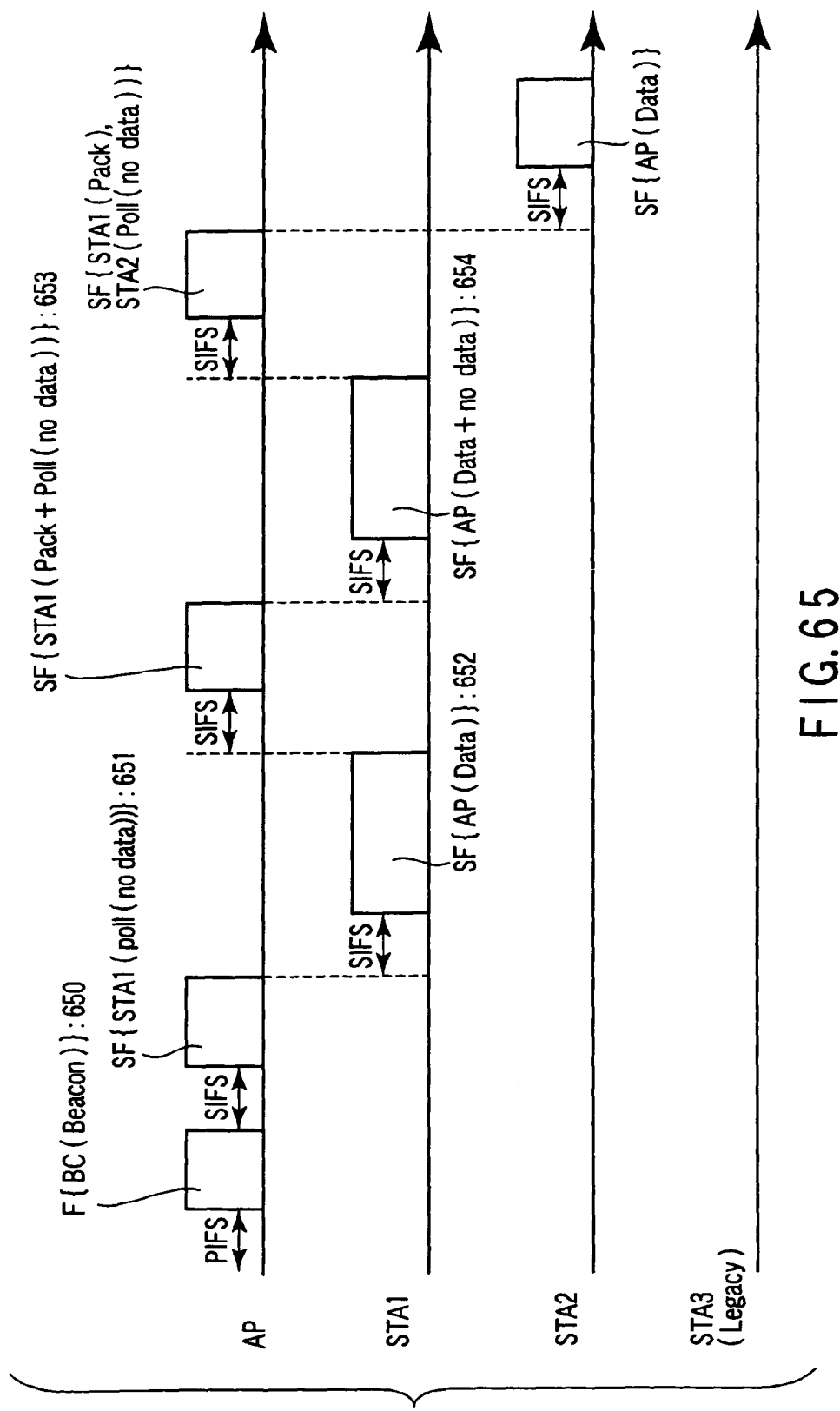
FIG. 65 is a diagram showing a polling sequence example (CFP start by beacon)

FIG. 65 shows one example of a polling sequence in a case where PCF is extended by frame aggregation. A contention-free period is started by a beacon frame 650. A time (timing) to transmit the beacon frame 650 is determined by a polling/data transmission schedule control device 1051 of the access point. Vacancy of a medium is requested for a PIFS period before sending the beacon 650 at the time. This is confirmed by a carrier sense control device 106A. After the confirmation, a media access control device 108A transfers the beacon frame 650 to a physical layer. The beacon frame 650 has to be capable of being received by all communication apparatuses including a communication apparatus 4 (STA3 legacy) assumed to be a terminal conforming to IEEE802.11a. Therefore, the frame is formed as a first type (IEEE802.11a) of physical frame by a first type physical layer protocol processing device 109A which controls transmission/reception of IEEE802.11a, and transmitted.

Here, examples of symbols in a sequence diagram will be described.

F{BC(beacon)}: It represents a beacon MAC frame to a broadcast address, and the frame is transmitted as a single MAC frame which is not a MAC super frame.

SF{STA1(Poll (no data))}: It represents a Poll (no data) MAC frame to STA1, and the frame is transmitted as a MAC super frame.

SF{STA1(pack), STA2 (poll(no data))}: It represents a frame transmitted as a MAC super frame obtained by aggregating a MAC frame of Partial Ack to STA1, and a Poll (no data) MAC frame to STA2.

After elapse of SIFS after the transmission of the beacon frame, the access point transmits a Poll (no data) frame 651 to STA1 to assign transmission rights to STA1. At this time, the assigning of the transmission rights to the STA1 is determined by the polling●data transmission schedule control device 1051 of the access point. In this example, the Poll (no data) frame 651 is transmitted as a MAC super frame ("SF" in the figure is abbreviation of "super frame").

This MAC super frame is formed as a second type of physical frame by the second type physical layer protocol processing device 110A which controls the transmission/reception of MIMO, and transmitted. However, since only one MAC frame is required here, the frame may be transmitted as a usual MAC frame. In this case, the frame may be formed as the physical frame of IEEE802.11a by the first type physical layer protocol processing device 109A which controls the transmission/reception of IEEE802.11a, and transmitted.

When the poll frame 651 is transmitted as the second type of physical frame from the access point, the terminal (STA1) can estimate a state of a MIMO channel between the access point and the terminal by a MIMO PLCP long preamble (FIG. 52). In general, a channel state is detected, and an appropriate control (e.g., power loading, bit loading, and combination of them, in which a power or an information amount is not equally allocated, but is appropriately tilted/distributed to a plurality of streams of MIMO or a plurality of sub-carriers of OFDM) is performed on a transmitting side. It is known that a transmission channel capacity accordingly increases. By a simpler transmission control, for example, information of received power measured by the terminal, an appropriate transmission rate (modulation system, coding ratio, etc.) during the transmission by the terminal may be controlled.

Moreover, a parameter in a case where the access point transmits the frame, for example, information of transmission power or antenna gain is included in PHY feedback information 5000 (see FIG. 50) of the MAC super frame header, and accordingly estimate of the channel state by the terminal can be corrected. That is, a result of channel estimate can be prevented from being wrongly interpreted by a difference of the transmission power or antenna gain between the access point and the terminal. For example, although the transmission power of the access point is larger than that of the terminal, the terminal assumes that the transmission powers are equal to each other. When the terminal estimates the channel, a channel state is wrongly recognized. When a maximum rate interpreted to be possible in the wrongly recognize channel state is selected, and the terminal transmits the frame to the access point, there is high possibility that the access point cannot receive the frame. Therefore, it is useful for appropriate transmission control on the terminal side to include physical layer received state data (channel estimate information, error correction amount, reception power) based on immediately previous transmission from the same terminal to the access point into the PHY feedback information 5000.

Turning back to the description of FIG. 65. The terminal (STA1) which has received the polling from the access point aggregates a plurality of data frames to the access point in a single MAC super frame 652, and transmits the frame. The data frame to be transmitted is selected by a data transmission schedule control device 1052 shown in FIG. 49. When QoS or the like does not have to be noticed, a data frame in the head of a queue may be simply selected as a transmission target in order. When QoS is required, a data frame having high priority, or a data frame brought into a timing to periodically transmit the frame is first selected as a transmission target. The data frames having a plurality of priorities may be included in a single MAC super frame.

On receiving the polling to its own terminal, the media access control device 108S of the terminal shown in FIG. 49 executes a control in such a manner as to transmit the MAC super frame after SIFS. The MAC super frame is constituted to include the data frame selected by the data transmission schedule control device 1052 as described above. The MAC super frame is formed as the second type of physical frame by the second type physical layer protocol processing device 110S which controls the transmission/reception of the MIMO, and transmitted.

On receiving the frame, the access point first receives the physical layer 101A by the second type physical layer protocol processing device 110A (FIG. 48) which controls the transmission/reception of the MIMO, extracts the MAC super frame, and transfers the frame to the MAC layer 102A. In this case, the information of a received state in the physical layer 101A may be forwarded as additional information to the MAC layer 102A.

The retransmission control device 107A of the access point determines by FCS whether or not each data frame included in the MAC super frame is successfully received, and generates a Partial Ack frame including acknowledgment information (Partial Ack Bitmap). Furthermore, the information of the received state in the physical layer 101A may be included in the PHY feedback information of the Partial Ack frame. The polling/data transmission schedule control device 1051 confirms that there is not any data to be transmitted in the terminal (STA1), and judges that the assigning of the transmission rights to the terminal should continue. In this case, the Partial Ack frame and the Poll (no data) frame to the terminal (STA1) are aggregated to generate a MAC super frame 653. The media access control device 108A controls the access to the medium in such a manner as to transmit the MAC super frame 653 generated in this manner after SIFS. This MAC super frame 653 is formed as the second type of physical frame by the second type physical layer protocol processing device 110A which controls the transmission/reception of the MIMO, and transmitted.

On receiving this frame 653, the terminal first receives the physical layer 101S by the second type physical layer protocol processing device 110S (FIG. 49) which controls the transmission/reception of the MIMO, extracts the MAC super frame, and transfers the frame to the MAC layer 102S. In this case, the information of the received state in the physical layer 101S may be forwarded as additional information to the MAC layer 102S.

The Partial Ack and Poll (no data) are included in the MAC super frame 653. Since the terminal (STA1) is polled, the terminal can aggregate a plurality of data frames to the access point into a single MAC super frame, and transmit the frame. The data frame to be transmitted is selected by the retransmission control device 107S and the data transmission schedule control device 1052 shown in FIG. 49. That is, the MAC frame to be retransmitted is identified by the Partial Ack. Furthermore, the data transmission schedule control device 1052 considers priorities of a newly transmitted MAC frame and a MAC frame to be retransmitted, and selects a MAC frame to be actually transmitted. Simply the frame having the high priority may be first transmitted. Alternatively, for example, even when the priority assigned to the MAC frame is low, a remaining time of timeout to discard the MAC frame is short, and then control may be executed in such a manner that the frame is transmitted before the MAC frame having high priority but having an allowance till the timeout time. When data frames having a plurality of priorities are included in the single MAC super frame, there is not any problem.

On receiving the polling to its own terminal, the media access control device 108S of the terminal shown in FIG. 49 executes a control in such a manner as to transmit a MAC super frame 654 after SIFS. The MAC super frame 654 is constituted to include a data frame selected by the data transmission schedule control device 1052 as described above. Furthermore, the information of the received state in the physical layer may be included in the PHY feedback information 5000 of the MAC super frame 654. The MAC super frame 654 is formed as the second type of physical frame by the second type physical layer protocol processing device 110S which controls the transmission/reception of the MIMO, and transmitted.

During the transmission, information on a channel state obtained from the received physical frame, PHY feedback information from the access point included in the received Partial Ack frame, and correct reception ratio obtained from the Partial Ack Bitmap are considered, and transmission control may be performed with respect to modulation system, coding ratio, power bit loading and the like.

In a case where there is a tendency that latter-half MAC frames are not successfully received in the Partial Ack Bitmap, there is a possibility that a time required for the transmission of the MAC super frame is longer than a channel life. Therefore, a maximum length of the MAC super frame to be transmitted may be controlled to be limited. With regard to the physical frame bearing the MAC super frame, information from which the channel can be estimated (known information such as mid-amble) is adaptively added not only to the head of the frame but also to a middle. Accordingly, channel estimate may be corrected before the channel state largely changes.

Another example of a polling sequence will be described hereinafter mainly with respect to a difference respect from an example of FIG. 65.

On receiving a frame requiring a response, the retransmission control device 107A of the access point generates a Partial Ack frame. Here, the polling/data transmission schedule control device 1051 judges that priority should be given to the assigning of the transmission rights to the terminal STA2 rather than to the transmission of the poll and Partial Ack to the terminal STA1. It is assumed that the Partial Ack frame has been formed with respect to STA2 based on the previous frame change with the terminal STA2, and there is not any frame to be transmitted to the terminal STA2. In this case, the Partial Ack frame and Poll (no data) frame to the terminal (STA2) are aggregated to constitute a MAC super frame. The media access control device 108A controls access to the media in such a manner as to transmit the MAC super frame constituted in this manner after the SIFS. The MAC super frame is formed as the second type of physical frame by the second type physical layer protocol processing device 110A which controls the transmission/reception of the MIMO, and transmitted.

The terminal STA2 which has received the MAC super frame selects a data frame to be transmitted, constitutes a MAC super frame, and transmits the frame to the access point after SIFS in the same manner as the above-described method.

Although not shown in FIG. 65, the contention-free period for which the polling control is executed ends, when the access point transmits the CF-End frame 634 as shown in FIG. 63, or by the elapse of the CF_Max_Duration 635, Another sequence example shown in FIG. 66 is different from a polling sequence to start a CF period by a beacon frame as shown in FIG. 65 in that an access point transmits a CTS-self 660 to itself to thereby produce a CAP period. This CAP period ends with the elapse of a time indicated by TXOP. The example is different also in that one MAC super frame 661 of SF{STA1(Pack),STA2(Poll (no data))} transmits a Partial Ack frame to terminal STA1, and also transmits a Poll (no data) frame to terminal STA2. This MAC super frame 661 is effective in a case where all data frames from the terminal STA1 are received by the access point, and the retransmission from the terminal STA1 is not required.

Figure 67:
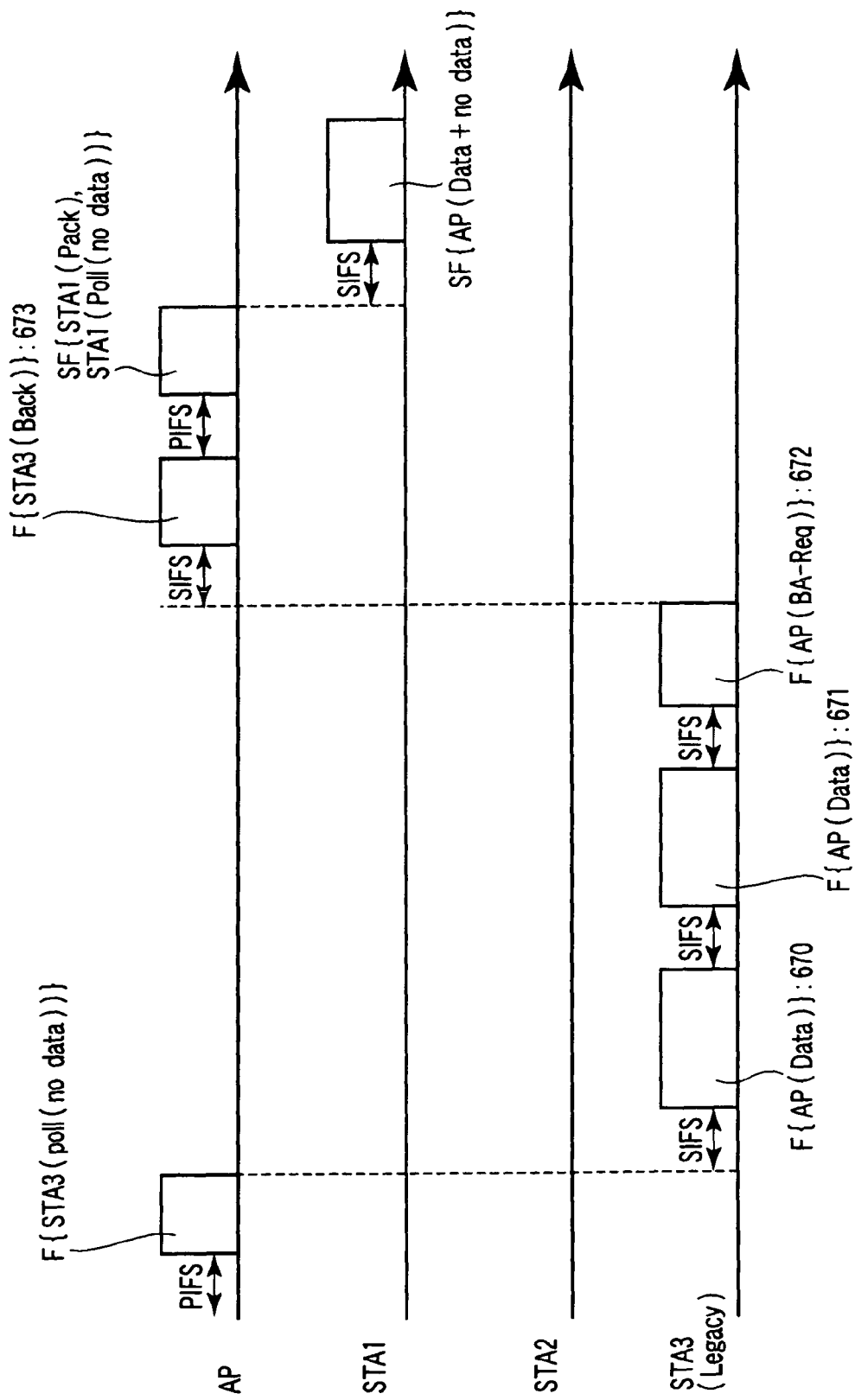
FIG. 67 is a diagram showing a polling sequence example (including legacy STA)

FIG. 67 shows a polling sequence in which an access point performs polling with respect to terminal STA3 (legacy). The terminal STA3 is a legacy terminal on which an only first type of physical layer protocol (e.g., IEEE802.11a) is mounted, and the access point including a polling control frame exchanges the frame with the terminal STA3 in conformity to the first type of physical layer protocol. It is assumed that the terminal STA3 can not handle the MAC super frame, and MAC frames are individually transmitted/received without any aggregation.

In FIG. 67, when the terminal STA3 continuously transmits the MAC frame, a Block Ack frame change procedure defined by IEEE802.11e is followed. That is, QoS data frames 670, 671 are successively burst-transmitted as separate physical frames at a SIFS interval. The acknowledgment is performed by a Block Ack Request frame 672 and a Block Ack frame 673.

Since any MAC super frame is not used (aggregation is inhibited) with respect to a legacy terminal STA3 concerning polling, data, response frame and the like, the access point can coexist and operate in a case where a network has the legacy terminal STA3. It is to be noted that the access point can detect beforehand, by some frame exchange, whether or not a polling target terminal is a legacy terminal that does not correspond to MAC aggregation.

FIG. 68 shows a modification of a sequence example shown in FIG. 65. Not only Poll (no data) that does not have any data but also poll (data) having the data are allowed in a case where a poll frame is transmitted by a MAC super frame.

Figure 69:
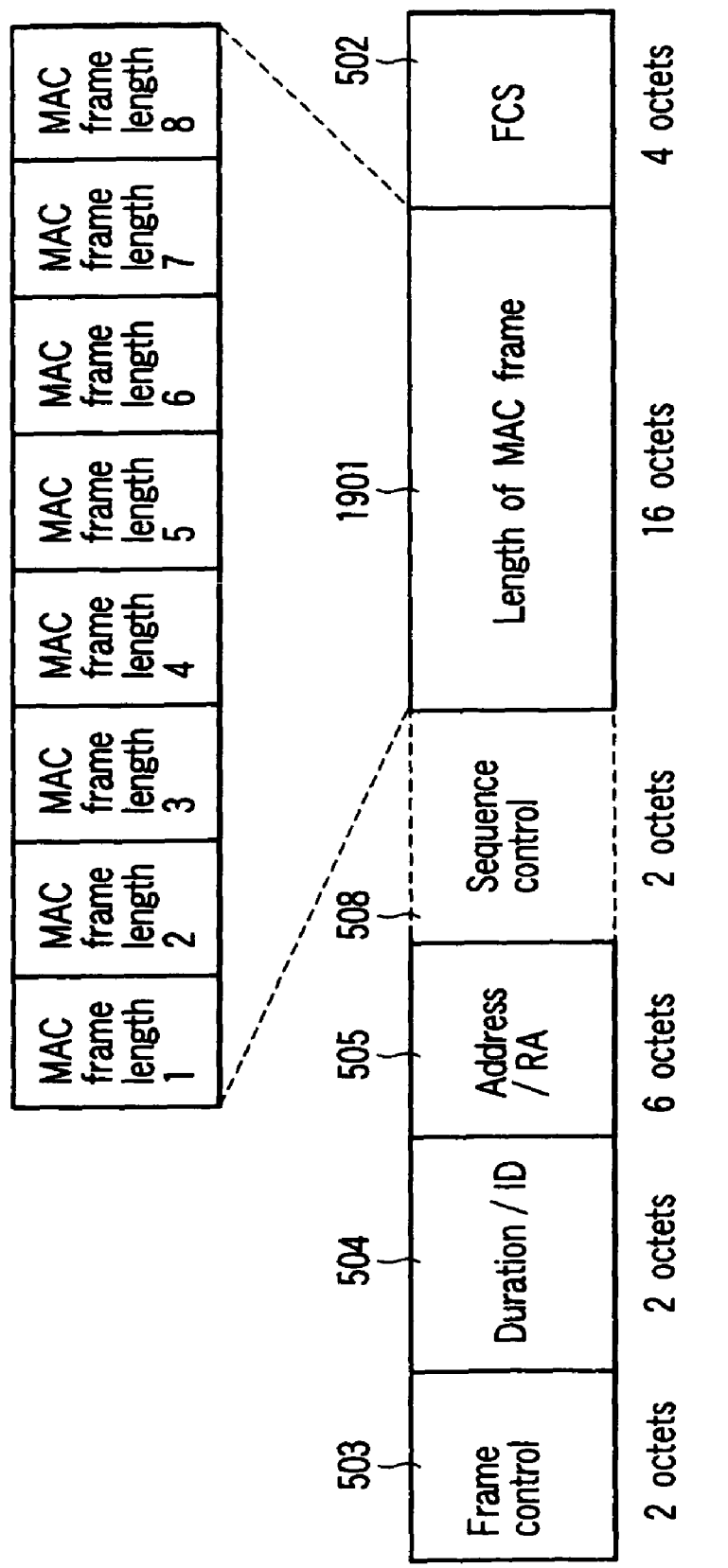
FIG. 69 is a diagram showing a case where a format of a MAC super frame header is the same as that of MPDU;.

The above-described embodiments of the present invention can be modified. This means that the MAC super frame header is formatted in the same manner as in MPDU. FIG. 69 shows one example of a MAC super frame header 1900 having the same format as that of the MPDU. For example, a value indicating the MAC super frame header is newly defined and allocated to a type/sub-type region included in a Frame Control field. In accordance with this value, a MAC layer of a receiving communication apparatus determines whether to perform a process of a MAC super frame or a usual MAC frame. A value of a Duration 504 is set according to a method of calculating a value of another MAC frame Duration included in the MAC super frame. A value of an address 1 field 505 (Receiver Address) is set to be equal to that of address 1 of another MAC frame included in the corresponding MAC super frame. Thus, an address specifying the receiving communication apparatus is set to the address 1 field 505/

Since the MAC super frame header 1900 is not fragmented or retransmitted, a value of a Sequence control field 508 does not have any special meaning. Therefore, when a type of the MAC super frame is assigned as a control frame, this Sequence control field 508 is more preferably omitted.

When the type is defined as management or data, the Sequence control field 508 needs to be disposed, and the value needs to be handled and matched with the retransmission control of the embodiment of the present invention. For example, a sequence number of the MAC frame constituting a retransmission object in a series of retransmission control of the MAC super frame is assumed to take a consecutive value. Therefore, in a case where a discontinuous value is set to the sequence number, a series of retransmission control of the MAC super frame is once ended, and retransmission control by another sequence needs to be started. Therefore, discontinuity of the sequence number is avoided. Alternatively, if the number becomes discontinuous, a series of retransmission control needs to be continued. As one example for solving the problem, when window control at a retransmission time is performed as described in another embodiment of the present invention, a value of a maximum sequence number possibly allocated to the MAC frame which is a retransmission target in a series of retransmission control is known. Therefore, there is a method in which the values are successively allocated in such a manner that the sequence number indicates a value exceeding the maximum value. A continuous value needs to be assigned to the value including the MAC frame which is a retransmission target. However, a method is also possible in which the sequence number of the MAC frame that is the retransmission target is ignored in executing the retransmission control so that the value may be discontinuous.

A length of each MAC frame included in the MAC super frame is set to a portion 1901 corresponding to a payload as shown in FIG. 69. A fragment number for handling fragment may be included in the payload 1901.

An FCS 502 corresponds to an HCS 205 in FIG. 50, and the FCS 502 may be used in the same manner as in usual MPDU. For example, a CRC value calculated with respect to the whole MAC super frame header is set to the FCS 502. In a case where the receiving communication apparatus recognizes, by the FCS 502 accompanying the MAC super frame header 1900, that the MAC super frame header 1900 breaks, the header is handled in the same manner as in a case where an error is detected by the HCS 205. The receiving communication apparatus which has detected the breakage discards the whole MAC super frame.

Thirteenth Embodiment

A thirteenth embodiment removes redundant elements from MAC headers of a plurality of MAC frames included in a single physical frame, and further enhances efficiency.

The MAC header from which the redundant elements have been removed will be referred to as a contracted MAC header. FIG. 70 shows one example of a MAC super frame constitution including a MAC frame having the contracted MAC header. In this example, MAC frame 1 has a usual MAC header, but MAC frames 2, 3, 4 ate constituted to have contracted MAC frames.

FIG. 71 shows one example of a production process of a MAC frame having a contracted MAC header from a MAC frame having a usual MAC header on a transmitting side, and a reproduction process of the MAC frame having the usual MAC header from the MAC frame having the contracted MAC header on the receiving side.

As shown in FIG. 70, it is assumed that a MAC super frame has at least one MAC frame having the usual MAC header.

Figure 73:
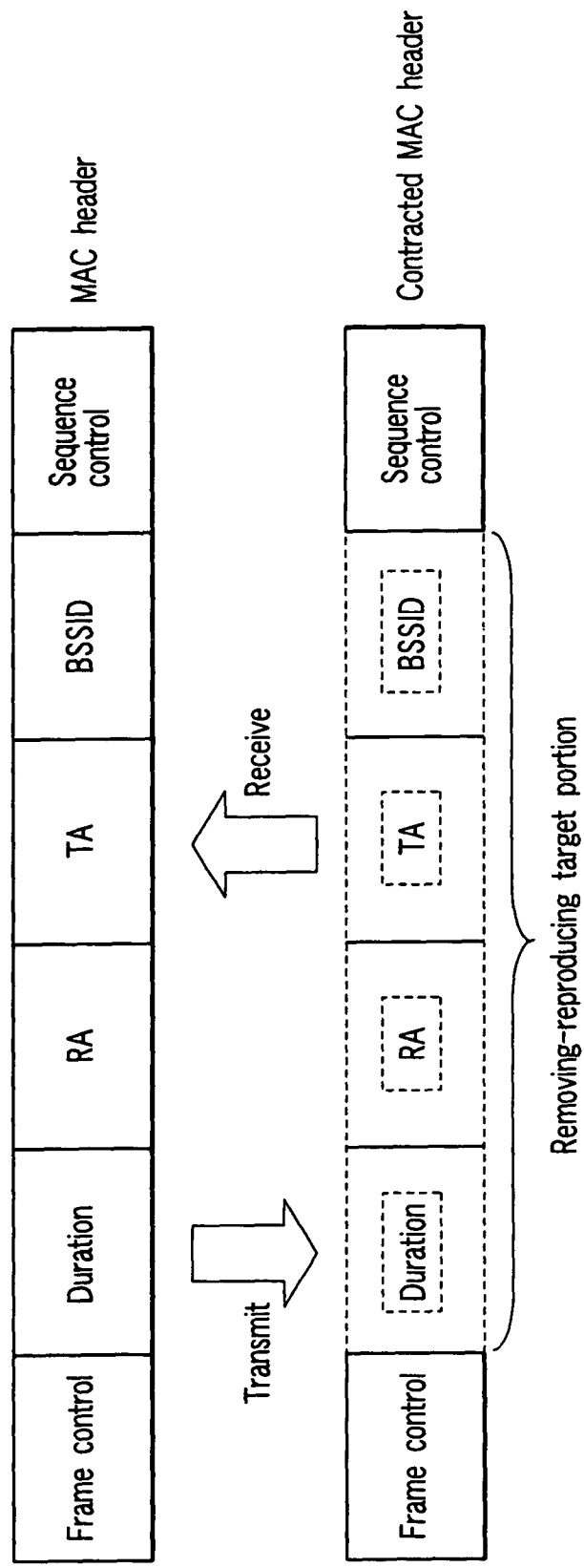
FIG. 73 is a diagram showing a second example of the contracted MAC header according to the thirteenth embodiment of the present invention.

For example, it is assumed that a wired terminal having an address SA aggregates a plurality of MAC frames transmitted to a terminal having an address RA into a single MAC super frame via an access point having an address TA. In this case, the address SA, address TA (BSSID), address RA are common to all the MAC frames, and are included as address information in the MAC header. In a transmitting access point, the addresses SA, TA, RA are left only in the MAC header of the single MAC frame 1, and the addresses SA, TA, RA are omitted from the MAC headers of the other MAC frames 2, 3, 4. Because, the addresses SA, TA, RA of MAC frames 2, 3, 4 are same. Even in this case, it is possible to reproduce the MAC headers of the MAC frames 2, 3, 4 from the MAC header of the MAC frame 1 in a receiving terminal (FIG. 72). This is one example of a transmitting-side process in FIG. 72 "to remove MAC header information included in the MAC super frame and reproducible from another MAC frame", and a receiving-side process "to reproduce MAC header information included in the MAC super frame and reproducible from another MAC frame". A case where a value of a Duration field is equal in the MAC headers of all the MAC frames included in the single MAC super frame is also considered. In this case, in addition to the address, the Duration field is also a removing and reproducing target (FIG. 73).

When it is promised that the MAC frame having the usual MAC header is surely MAC frame 1 of a head, the MAC frame having the usual MAC header is implicitly identified on the transmitting and receiving sides. Alternatively, in a case where MAC frames having a plurality of destinations are included in a single MAC super frame, a transmitting STA may include information indicating the head MAC frame of each destination to the receiving STA in the MAC super frame. This can be indicated, for example, by Bitmap Information (Multi Address Bitmap) included in the MAC frame header. Here, it is assumed that the head MAC frame of each destination has the usual MAC header. Moreover, when a plurality of attributes, for example, QoS attributes (TID, TSID, etc.) are included in the single MAC super frame, the transmitting STA may include information by which the MAC frame whose attributes change can be identified by the receiving STA. Here, the head MAC frame of a MAC frame group having the same attribute is assumed to have the usual MAC header.

Figure 74:
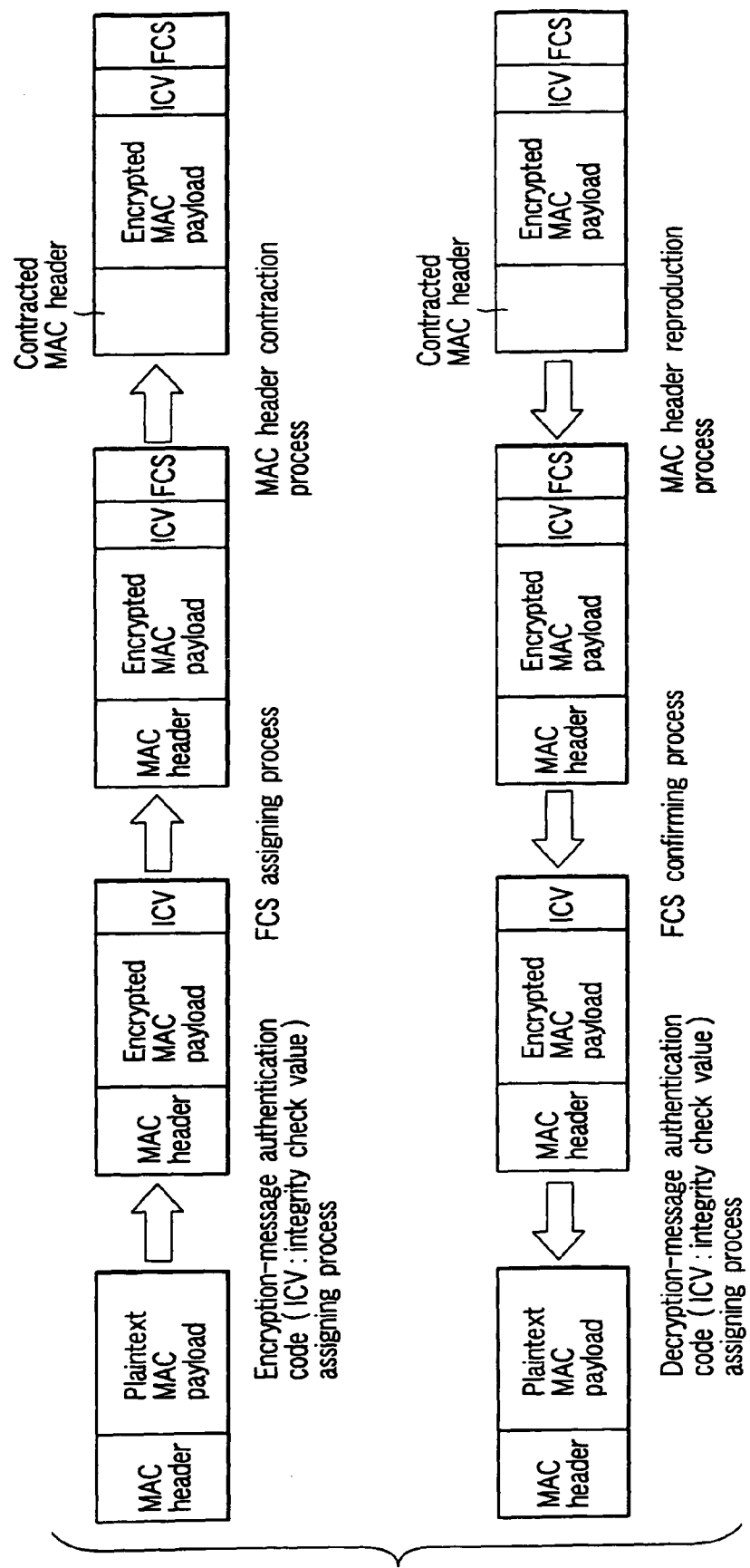
FIG. 74 is a diagram showing one example of generation of the MAC frame having the contracted MAC header, and a reproduction process of the MAC header from the contracted MAC header in a case where a cipher message authentication is included according to the thirteenth embodiment of the present invention.

FIG. 74 shows one example of production of the MAC frame having the contracted MAC header, and a reproduction process of the MAC header from the contracted MAC header in a case where a cipher message authentication is included. In a user data cipher message authentication system (Temporal Key Integrity Protocol: TKIP and CTR(Counter mode) with CBC (cipher-block chaining) MAC Protocol: CCMP) defined in a draft of IEEE802.11i (security enhancement) which defines security extension of IEEE802.11, not only a payload portion of the MAC frame but also a part of MAC header information are targets of security protection. The MAC header is not a target of encryption (secrecy), but a part of information included in the MAC frame (including address information, etc.) is a calculation target of a message authentication code for detecting alteration. Therefore, dependency relation is generated between a security process in the transmitting and receiving STAs and a procedure of a contraction and reproduction process of the MAC header.

In the transmitting STA, first a set of a plaintext MAC header and MAC payload is produced. This is forwarded to an encryption message authentication code (integrity check value: ICV) assigning process. Accordingly, the MAC payload is encrypted, and ICV is assigned to the MAC payload. A FCS is calculated and assigned to the whole of the MAC header and MAC payload (encrypted MAC payload+ICV). Thereafter, a contraction process of the MAC header is performed, and frames are aggregated into the MAC super frame, and transmitted.

In the receiving STA, a reproducing process of the usual MAC header from the first contracted MAC header is performed. Next, FCS is calculated with respect to the whole of the MAC header and MAC payload (encrypted MAC payload+ICV), and is compared with the FCS assigned to the MAC frame. When they agree with each other, successful reception is judged. When they do not agree, breakage is judged. Next, the encrypted MAC payload is decrypted, and ICV is calculated with respect to a part of the MAC header and the MAC frame. When they agree with each other, it is judged that there is not any alteration. When they disagree, it is judged that there is the alteration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A communication apparatus, comprising:
   a generator configured to generate a single first physical frame including a first data with a first traffic identifier for identifying a first priority of the first data and a second data with a second traffic identifier for identifying a second priority of the second data, wherein the first traffic identifier and the second traffic identifier are different from each other;
   a transmitter configured to transmit the first physical frame in a communication period given by a polling frame; and
   a receiver configured to receive a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data,
   wherein
   the receiver is configured to receive a single second physical frame including both the first acknowledgement information and the second acknowledgement information,
   the second physical frame includes a MAC header, the first acknowledgement information, the second acknowledgement information, and a first frame check sequence,
   the first acknowledgement information includes a first starting sequence number and a first bitmap, the first starting sequence number corresponding to the first traffic identifier, the first bitmap indicating at least the first reception state corresponding to the first traffic identifier, and
   the second acknowledgement information includes a second starting sequence number and a second bitmap, the second starting sequence number corresponding to the second traffic identifier, the second bitmap indicating at least the second reception state corresponding to the second traffic identifier.

2. The apparatus according to claim 1,
wherein the first traffic identifier is related with a first delay bound for specifying a first maximum amount of time allowed to transmit the first data, and
the second traffic identifier is related with a second delay bound for specifying a second maximum amount of time allowed to transmit the second data.

3. The apparatus according to claim 1, further comprising a CPU that executes a firmware.

4. The apparatus according to claim 3, wherein the CPU includes at least part of MAC layer function.

5. The apparatus according to claim 1, wherein the generator, transmitter, and receiver are included in a semiconductor device, and
wherein the semiconductor device includes a CPU that executes a firmware.

6. A communication terminal, comprising:
the communication apparatus according to claim 1; and an antenna,
wherein the transmitter transmits the first physical frame by using the antenna and the receiver receives the first acknowledgement information and the second acknowledgement information by using the antenna.

7. A communication apparatus, comprising:
a generator configured to generate a single first physical frame including a first data with a first traffic identifier for identifying a first priority of the first data and a second data with a second traffic identifier for identifying a second priority of the second data, wherein the first traffic identifier and the second traffic identifier are different from each other;
a transmitter configured to transmit the first physical frame in a communication period given by a polling frame; and
a receiver configured to receive a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data,
wherein the transmitter is configured to transmit a first acknowledgement request information and a second acknowledgement request information after transmission of the first physical frame in a communication period given by a polling frame, the first acknowledgement request information being for requesting transmission of the first acknowledgement information, the second acknowledgement request information being for requesting transmission of the second acknowledgement request information,
wherein the transmitter is configured to transmit a single third physical frame after transmission of the first physical frame in a communication period given by a polling frame, the third physical frame including the first acknowledgement request information and the second acknowledgement request information.

8. The apparatus according to claim 7, wherein the third physical frame including a MAC header, the first acknowledgement request information, the second acknowledgement request information, and a second frame check sequence,
the first acknowledgement request information includes a third starting sequence number corresponding to the first traffic identifier, and
the second acknowledgement request information includes a fourth starting sequence number corresponding to the second traffic identifier.

9. A communication apparatus, comprising:
a generator configured to generate a single first physical frame including a first data with a first traffic identifier for identifying a first priority of the first data and a second data with a second traffic identifier for identifying a second priority of the second data, wherein the first traffic identifier and the second traffic identifier are different from each other;
a transmitter configured to transmit the first physical frame in a communication period given by a polling frame; and
a receiver configured to receive a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data,
wherein the first physical frame further includes a first acknowledgement request information and a second acknowledgement request information, the first acknowledgement request information being for requesting transmission of the first acknowledgement information, the second acknowledgement request information being for requesting transmission of the second acknowledgement information.

10. The apparatus according to claim 9,
wherein the first data and the second data are arranged before the first acknowledgement request information and the second acknowledgement request information.

11. The apparatus according to claim 9, wherein the first data is arranged before the second data, if a first priority corresponding to the first traffic identifier is higher than a second priority corresponding to the second traffic identifier.

12. A communication method, comprising:
generating a single first physical frame including a first data with a first traffic identifier for identifying a first priority of the first data and a second data with a second traffic identifier for identifying a second priority of the second data, wherein the first traffic identifier and the second traffic identifier are different from each other;
transmitting the first physical frame in a communication period given by a polling frame; and
receiving a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data; and
receiving a single second physical frame including both the first acknowledgement information and the second acknowledgement information,
wherein
the second physical frame includes a MAC header, the first acknowledgement information, the second acknowledgement information, and a first frame check sequence,
the first acknowledgement information includes a first starting sequence number and a first bitmap, the first starting sequence number corresponding to the first traffic identifier, the first bitmap indicating at least the first reception state corresponding to the first traffic identifier, and the second acknowledgement information includes a second starting sequence number and a second bitmap, the second starting sequence number corresponding to the second traffic identifier, the second bitmap indicating at least the second reception state corresponding to the second traffic identifier.

13. A communication apparatus, comprising:

a receiver configured to receive a first physical frame in a communication period given by a polling frame, the first physical frame including a first data with a first traffic identifier for identifying a first priority of the first data and a second data with a second traffic identifier for identifying a second priority of the second data, wherein the first traffic identifier and the second traffic identifier are different from each other; and a transmitter configured to transmit a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data, wherein the transmitter is configured to transmit a single second physical frame including both the first acknowledgement information and the second acknowledgement information, the second physical frame including a MAC header, the first acknowledgement information, the second acknowledgement information, and a first frame check sequence, the first acknowledgement information includes a first starting sequence number and a first bitmap, the first starting sequence number corresponding to the first traffic identifier, the first bitmap indicating at least the first reception state corresponding to the first traffic identifier, and the second acknowledgement information includes a second starting sequence number and a second bitmap, the second starting sequence number corresponding to the second traffic identifier, the second bitmap indicating at least the second reception state corresponding to the second traffic identifier.

14. A communication apparatus, comprising:

a receiver configured to receive a first physical frame in a communication period given by a polling frame, the first physical frame including a first data with a first traffic identifier for identifying a first priority of the first data and a second data with a second traffic identifier for identifying a second priority of the second data, wherein the first traffic identifier and the second traffic identifier are different from each other; and a transmitter configured to transmit a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data, wherein the receiver is configured to receive a first acknowledgement request information and a second acknowledgement request information after reception of the first physical frame in a communication period given by a polling frame, the first acknowledgement request information being for requesting transmission of the first acknowledgement information, the second acknowledgement request information being for requesting transmission of the second acknowledgement information.

15. The apparatus according to claim 14, further comprising a CPU that executes a firmware.

16. The apparatus according to claim 14, wherein the CPU includes at least part of MAC layer function.

17. The apparatus according to claim 14, wherein the receiver, and the transmitter are included in a semiconductor device, and wherein the semiconductor device includes a CPU that executes a firmware.

18. A communication terminal, comprising:

the communication apparatus according to claim 14; and an antenna, wherein the receiver receives the first physical frame by using the antenna and the transmitter transmits the first acknowledgement information and the second acknowledgement information by using the antenna.

19. A communication apparatus, comprising:

a receiver configured to receive a first physical frame in a communication period given by a polling frame, the first physical frame including a first data with a first traffic identifier for identifying a first priority of the first data and a second data with a second traffic identifier for identifying a second priority of the second data, wherein the first traffic identifier and the second traffic identifier are different from each other; and a transmitter configured to transmit a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data, wherein the receiver is configured to receive a single third physical frame after reception of the first physical frame in a communication period given by a polling frame, the third physical frame including the first acknowledgement request information and the second acknowledgement request information.

20. The apparatus according to claim 19, wherein the third physical frame including a MAC header, the first acknowledgement request information, the second acknowledgement request information, and a second frame check sequence, the first acknowledgement request information includes a third starting sequence number corresponding to the first traffic identifier, and the second acknowledgement request information includes a fourth starting sequence number corresponding to the second traffic identifier.

21. A communication method, comprising:

receiving a first physical frame in a communication period given by a polling frame, the first physical frame including a first data with a first traffic identifier for identifying a first priority of the first data and a second data with a second traffic identifier for identifying a second priority of the second data, wherein the first traffic identifier and the second traffic identifier are different from each other;

transmitting a first acknowledgement information and a second acknowledgement information in a communication period given by a polling frame, the first acknowledgement information corresponding to the first traffic identifier and including a first reception state of at least the first data, the second acknowledgement information corresponding to the second traffic identifier and including a second reception state of at least the second data; and receiving a first acknowledgement request information and a second acknowledgement request information after reception of the first physical frame in a communication period given by a polling frame, the first acknowledgement request information being for requesting transmission of the first acknowledgement information, the second acknowledgement request information being for requesting transmission of the second acknowledgement information.

* * * * *